US012036830B2

(12) United States Patent
Barguet et al.

(10) Patent No.: US 12,036,830 B2
(45) Date of Patent: Jul. 16, 2024

(54) HIGHLY COMPRESSIBLE OPEN REINFORCING CORD

(71) Applicant: COMPAGNIE GENERALE DES ETABLISSEMENTS MICHELIN, Clermont-Ferrand (FR)

(72) Inventors: Henri Barguet, Clermont-Ferrand (FR); Olivier Reix, Clermont-Ferrand (FR); Gael Pataut, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 346 days.

(21) Appl. No.: 17/629,826

(22) PCT Filed: Jul. 22, 2020

(86) PCT No.: PCT/FR2020/051334
§ 371 (c)(1),
(2) Date: Jan. 25, 2022

(87) PCT Pub. No.: WO2021/014096
PCT Pub. Date: Jan. 28, 2021

(65) Prior Publication Data
US 2022/0258535 A1        Aug. 18, 2022

(30) Foreign Application Priority Data

Jul. 25, 2019   (FR) ...................................... 1908425

(51) Int. Cl.
*B60C 9/00*      (2006.01)
*D07B 1/06*      (2006.01)
*D07B 7/02*      (2006.01)

(52) U.S. Cl.
CPC ............ *B60C 9/0007* (2013.01); *D07B 1/062* (2013.01); *D07B 7/02* (2013.01);
(Continued)

(58) Field of Classification Search
None
See application file for complete search history.

(56) References Cited

U.S. PATENT DOCUMENTS

| 1,906,543 A | 5/1933 | Conner |
| 2,000,104 A | 5/1935 | Somerville |

(Continued)

FOREIGN PATENT DOCUMENTS

| CN | 102373632 A | 3/2012 |
| DE | 102011053240 A1 | 3/2013 |

(Continued)

OTHER PUBLICATIONS

International Search Report dated Nov. 2, 2020, in corresponding PCT/FR2020/051334 (5 pages).

*Primary Examiner* — Shawn Mckinnon
(74) *Attorney, Agent, or Firm* — VENABLE LLP

(57) ABSTRACT

A cord (50) comprises a single layer (52) made up of N helically wound metal filamentary elements (54) having an outer diameter D, the metal filamentary elements (54) defining an internal enclosure (58) of the cord of diameter Dv. Each metal filamentary element (54) has a diameter Df and a helix radius of curvature Rf. With this cord (50), D, Dv, Df and Rf being expressed in millimeters: $0.10 \leq Jr \leq 0.25$, $9 \leq Rf/Df \leq 30$, and $1.60 \leq Dv/Df \leq 3.20$, where $Jr = N/(\pi^*(D-Df)) \times (Dh \times Sin(\pi/N) - (Df/Cos(\alpha \times \pi/180)))$ and $\alpha$ is the helix angle, expressed in degrees, of each metal filamentary element (54).

15 Claims, 12 Drawing Sheets

(52) U.S. Cl.
CPC ............... *B60C 2009/0092* (2013.01); *D07B 2201/1076* (2013.01); *D07B 2201/2007* (2013.01); *D07B 2201/2009* (2013.01); *D07B 2205/3021* (2013.01); *D07B 2207/20* (2013.01); *D07B 2207/4018* (2013.01); *D07B 2401/20* (2013.01); *D07B 2501/2046* (2013.01)

(56) References Cited

U.S. PATENT DOCUMENTS

| | | |
|---|---|---|
| 2,556,164 A | 6/1951 | Carleton et al. |
| 3,327,753 A | 6/1967 | Travers |
| 3,789,596 A | 2/1974 | Richley |
| 5,802,830 A | 9/1998 | Kawatani |
| 6,076,344 A | 6/2000 | Doujak |
| 6,109,017 A | 8/2000 | Kawatani |
| 6,151,879 A | 11/2000 | Doujak |
| 6,354,068 B1 | 3/2002 | Onuma et al. |
| 6,681,555 B1 | 1/2004 | Heisel et al. |
| 6,904,744 B2 | 6/2005 | Cauwels et al. |
| 8,359,823 B2 | 1/2013 | Qi |
| 10,364,529 B2 | 7/2019 | Calvet et al. |
| 10,378,128 B2 | 8/2019 | Calvet et al. |
| 10,426,505 B2 | 10/2019 | Matsumoto |
| 10,619,297 B2 | 4/2020 | Calvet et al. |
| 2006/0027310 A1 | 2/2006 | Auclair |
| 2007/0006957 A1 | 1/2007 | Nakajima |
| 2017/0321352 A1 | 11/2017 | Calvet et al. |
| 2017/0321376 A1 | 11/2017 | Calvet et al. |
| 2018/0117970 A1 | 5/2018 | LeClerc et al. |
| 2018/0161053 A1 | 6/2018 | Matsumoto |
| 2018/0171551 A1 | 6/2018 | Calvet et al. |
| 2021/0309050 A1 | 10/2021 | Cornille et al. |
| 2022/0251780 A1 | 8/2022 | Barguet et al. |
| 2022/0402302 A1 | 12/2022 | Reix et al. |
| 2023/0349097 A1 | 11/2023 | Pataut et al. |

FOREIGN PATENT DOCUMENTS

| | | |
|---|---|---|
| EP | 1623819 A1 | 2/2006 |
| EP | 2845620 A1 | 3/2015 |
| EP | 3165670 A1 | 5/2017 |
| EP | 3293306 A1 | 3/2018 |
| FR | 1413102 | 10/1965 |
| WO | 2016/083265 A1 | 6/2016 |
| WO | 2016/083267 A1 | 6/2016 |
| WO | 2016/189073 A1 | 12/2016 |
| WO | 2016/189074 A1 | 12/2016 |
| WO | 2020/021006 A1 | 1/2020 |
| WO | 2020/021007 A1 | 1/2020 |

HIGHLY COMPRESSIBLE OPEN REINFORCING CORD

BACKGROUND

The present invention relates to metal cords that are usable for reinforcing articles such as tyres for vehicles. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape.

A metal cord comprising a single layer of N=5 helically wound metal filamentary elements is known from the prior art. Each metal filamentary element is made up of a steel monofilament and has a diameter equal to 0.38 mm. Each metal filamentary element is wound at a pitch P=6.7 mm and is individually preformed before the final helical assembly step of the metal filamentary elements The metal filamentary elements define an internal enclosure of the cord. The preforming and internal enclosure give the cord, once assembled, relatively significant aeration, in other words a relatively large space between each pair of adjacent metal filamentary elements. Such aeration causes structural elongation As of the cord equal to 2.3%. Such a cord is intended in particular to be used in tyres, for example tyres for a vehicle of the heavy-duty type.

In addition to requiring a step of individually preforming the metal filamentary elements, this prior art cord has relatively low longitudinal compressibility, meaning that the cord buckles under a relatively low longitudinal compressive deformation. Such buckling manifests itself in local bending of the cord, not only causing the rigidity in compression of the cord to drop but also leading to a risk of the metal filamentary elements being damaged under the cycling effects to which for example tyres are subjected.

Another example of a metal cord comprising a single layer of helically wound metal filamentary elements is described in WO2016/166056. In WO2016/166056, a cord 3.26 comprises a single layer of N=3 helically wound metal filamentary elements, each metal filamentary element being made up of a steel monofilament and having a diameter equal to 0.26 mm. Just like the above-described cord 5.38, the cord 3.26 in WO2016/166056 exhibits relatively low longitudinal compressibility.

SUMMARY

The aim of the invention is to propose cords comprising a single layer of N helically wound metal filamentary elements exhibiting excellent longitudinal compressibility, a relatively small diameter compared with the diameters of the metal filamentary elements of which it is made up, and the highest possible reinforcement capability.

DETAILED DESCRIPTION

Cord According to the Invention

To this end, the invention relates to a cord comprising a single layer of N helically wound metal filamentary elements and having an outer diameter D, each metal filamentary element of the layer describing, when the cord extends in a substantially rectilinear direction, a helical path about a main axis substantially parallel to the substantially rectilinear direction, such that, in a section plane substantially perpendicular to the main axis, the distance between the centre of each metal filamentary element of the layer and the main axis is equal to half the helix diameter Dh and is substantially constant and identical for all the metal filamentary elements of the layer, the metal filamentary elements defining an internal enclosure of the cord of diameter Dv, each metal filamentary element having a diameter Df and a helix radius of curvature Rf, in which cord Dh, D, Dv, Df and Rf are expressed in millimetres.

$0.10 \leq Jr \leq 0.25$ $9 \leq Rf/Df \leq 30$, and $1.60 \leq Dv/Df \leq 3.20$.

where $Jr=N/(\pi*(D-Df))\times(Dh\times Sin(\pi/N)-(Df/Cos(\alpha\times\pi/180)))$ and a is the helix angle, expressed in degrees, of each metal filamentary element.

The cord according to the invention exhibits, as demonstrated by the comparative tests described below, excellent longitudinal compressibility and, all other things being equal, a relatively small diameter for the highest possible reinforcement capability.

The inventors behind the invention postulate that, on account of a sufficiently large radius of curvature Rf with respect to the diameter Df of each metal filamentary element, the cord is sufficiently aerated, thereby reducing the risk of buckling, on account of the relatively large spacing of each metal filamentary element from the longitudinal axis of the cord, this spacing allowing the metal filamentary elements, on account of their helix, to adapt to relatively high longitudinal compressive deformations. By contrast, since the radius of curvature Rf of each metal filamentary element of the prior art cord is relatively small with respect to the diameter Df, the metal filamentary elements are closer to the longitudinal axis of the cord and can, on account of their helix, adapt to much lower longitudinal compressive deformations than the cord according to the invention.

Moreover, in the case of too large a radius of curvature Rf of each metal filamentary element, the cord according to the invention would have insufficient longitudinal stiffness in compression to ensure a reinforcing role, for example for tyres.

In addition, in the case of too large an internal enclosure diameter Dv, the cord would have too large a diameter relative to the diameter of the metal filamentary elements. By contrast, in the case of too small an internal enclosure diameter Dv, the cord would have too little space between the metal filamentary elements for the latter to be able to adapt to relatively high longitudinal compressive deformations without buckling.

Lastly, the relative radial clearance Jr is representative of the distance separating each pair of adjacent metal filamentary elements brought to within the length available for positioning the metal filamentary elements on the layer. Thus, the greater Jr, the greater the space separating two adjacent metal filamentary elements relative to the maximum number of metal filamentary elements that the layer could accommodate. Conversely, the smaller Jr, the smaller the space separating two adjacent metal filamentary elements relative to the maximum number of metal filamentary elements that the layer could accommodate. Within the range according to the invention, Jr makes it possible to maximize the number of metal filamentary elements present on the layer and therefore the reinforcing capacity of the cord but not at the expense of the capacity to adapt to longitudinal compressive deformations.

In addition, it should be noted that compared to cords having a relative radial clearance Jr greater than 0.25, the cords according to the invention make it possible to obtain greater moduli of elasticity in extension. To be specific, the reduced relative radial clearance causes, under the effect of an extension stress in the cord, adjacent filamentary elements to come together and make contact quickly. Thus, the cords according to the invention have a longitudinal compressibility that is comparable to or even greater than prior art cords comprising a single layer of metal filamentary elements while having a modulus of elasticity in extension comparable to cords referred to as non-extendable cords, comprising for example two layers of filamentary elements helically wound around each other.

The values of the characteristics Dh, D, Df, Dv, Rf and $\alpha$ and of the other characteristics described below are measured on or determined from cords either directly after they have been manufactured, that is to say before any step of embedding in an elastomeric matrix, or once they have been extracted from an elastomeric matrix, for example from a tyre, and have thus undergone a cleaning step during which any elastomeric matrix is removed from the cord, in particular any material present inside the cord. In order to ensure an original state, the adhesive interface between each metal filamentary element and the elastomeric matrix has to be eliminated, for example by way of an electrochemical process in a bath of sodium carbonate. The effects associated with the shaping step of the method for manufacturing the tyre that are described below, in particular the elongation of the cords, are eliminated by the extraction of the ply and of the cord which, during extraction, substantially regain their characteristics from before the shaping step.

The cord according to the invention comprises a single layer of helically wound metal filamentary elements. In other words, the cord according to the invention comprises one layer, not two or more than two layers, of helically wound metal filamentary elements. The layer is made of metal filamentary elements, that is to say a plurality of metal filamentary elements, not just one metal filamentary element. In one embodiment of the cord, for example when the cord has completed its manufacturing process, the cord according to the invention is made up of the layer of wound metal filamentary elements; in other words, the cord does not comprise any other metal filamentary element than those in the layer.

The cord according to the invention has a single helix. By definition, a single-helix cord is a cord in which the axis of each metal filamentary element of the layer describes a single helix, in contrast to a double-helix cord, in which the axis of each metal filamentary element describes a first helix about the axis of the cord and a second helix about a helix described by the axis of the cord. In other words, when the cord extends in a substantially rectilinear direction, the cord comprises a single layer of metal filamentary elements wound together in a helix, each metal filamentary element of the layer describing a helical path about a main axis substantially parallel to the substantially rectilinear direction, such that, in a section plane substantially perpendicular to the main axis, the distance between the centre of each metal filamentary element of the layer and the main axis is substantially constant and identical for all the metal filamentary elements of the layer. By contrast, when a double-helix cord extends in a substantially rectilinear direction, the distance between the centre of each metal filamentary element of the layer and the substantially rectilinear direction is different for all of the metal filamentary elements of the layer.

The cord according to the invention does not have a central metal core. This is also referred to as a 1×N structure cord or even an open cord. In the cord according to the invention that is defined above, the internal enclosure is empty and thus does not have any filling material, in particular does not have any elastomeric composition. This is thus referred to as a cord without filling material.

The enclosure of the cord according to the invention is delimited by the metal filamentary elements and corresponds to the volume delimited by a theoretical circle that is, on the one hand, radially on the inside of each metal filamentary element and, on the other hand, tangent to each metal filamentary element. The diameter of this theoretical circle is equal to the enclosure diameter Dv.

A filamentary element means an element extending longitudinally along a main axis and having a section perpendicular to the main axis, the largest dimension G of which is relatively small compared with the dimension L along the main axis. The expression relatively small means that L/G is greater than or equal to 100, preferably greater than or equal to 1000. This definition covers both filamentary elements with a circular section and filamentary elements with a non-circular section, for example a polygonal or oblong section. Very preferably, each metal filamentary element has a circular section.

By definition, the term metal means a filamentary element made up mostly (i.e. more than 50% of its weight) or entirely (100% of its weight) of a metal material. Each metal filamentary element is preferably made of steel, more preferably pearlitic or ferritic-pearlitic carbon steel, commonly referred to as carbon steel by a person skilled in the art, or made of stainless steel (by definition steel comprising at least 10.5% chromium).

The structural elongation As, which is a parameter well known to a person skilled in the art, is determined for example by applying the standard ASTM D2969-04 of 2014 to a cord tested so as to obtain a force-elongation curve. As is derived from the curve obtained as the elongation, in %, corresponding to the projection onto the elongation axis of the intersection between the tangent to the structural portion of the force-elongation curve and the tangent to the elastic portion of the force-elongation curve. It will be recalled that a force-elongation curve comprises, in the direction of increasing elongations, a structural portion, an elastic portion and a plastic portion. The structural portion corresponds to a structural elongation of the cord that results from the moving together of the different metal filamentary elements that make up the cord. In some embodiments, the layer of N metal filamentary elements comes apart at the end of the structural portion, due to the relatively small relative radial clearance Jr, causing a one-off increase in the modulus of the cord. The elastic portion corresponds to an elastic elongation that results from the structure of the cord, in particular the angles of the various layers and the diameters of the threads. The plastic portion corresponds to the plastic elongation that results from the plasticity (irreversible deformation beyond the elastic limit) of one or more metal filamentary elements.

The helix angle $\alpha$ is a parameter that is well known to a person skilled in the art and can be determined using the following iterative calculation comprising three iterations and wherein the index i indicates the number of the iteration 1, 2 or 3. Knowing the structural elongation As expressed in %, the helix angle $\alpha(i)$ is such that $\alpha(i)=\text{Arcos}[(100/(100+\text{As})\times\text{Cos}[\text{Arctan}((\pi \times Df)/(P \times \text{Cos}(\alpha(i-1))\times \text{Sin}(\pi/N))]]$, in which formula P is the pitch expressed in millimetres at which each metal filamentary element is wound, N is the number of metal filamentary elements in the layer, Df is the diameter of each metal filamentary element expressed in millimetres, Arcos, Cos and Arctan and Sin denote the arccosine, cosine, arctangent and sine functions, respectively. For the first iteration, that is to say for the calculation of $\alpha(1)$, $\alpha(0)=0$. At the third iteration, $\alpha(3)=\alpha$ is obtained with at least one significant digit after the decimal point when a is expressed in degrees.

The helix diameter Dh, expressed in millimetres, is calculated using the relationship $Dh=P\times Tan(\alpha)/\pi$, in which P is the pitch expressed in millimetres at which each metal filamentary element is wound, $\alpha$ is the helix angle of each metal filamentary element determined above, and Tan is the tangent function. The helix diameter Dh corresponds to the diameter of the theoretical circle passing through the centres of the metal filamentary elements of the layer in a plane perpendicular to the axis of the cord.

The enclosure diameter Dv, expressed in millimetres, is calculated using the relationship $Dv=Dh-Df$, in which Df is the diameter of each metal filamentary element and Dh is the helix diameter, both expressed in millimetres.

The radius of curvature Rf, expressed in millimetres, is calculated using the relationship $Rf=P/(\pi\times Sin(2\alpha))$, in which P is the pitch expressed in millimetres of each metal filamentary element, a is the helix angle of each metal filamentary element, and Sin is the sine function.

The diameter or visible diameter, denoted D, is measured by means of a thickness gauge, the diameter of the contacts of which is at least equal to 1.5 times the winding pitch P of the filamentary elements (the model JD50 from Kaefer may be mentioned for example, which makes it possible to achieve a precision of 1/100 of a millimetre, is equipped with a type a contact, and has a contact pressure of around 0.6 N). The measurement protocol consists of three repetitions of a set of three measurements (carried out perpendicularly to the axis of the cord and under zero tension), wherein the second and third of these measurements are carried out in a direction offset angularly from the previous measurement by one third of a turn, by rotation of the measurement direction about the axis of the cord.

It will be recalled that the pitch at which each metal filamentary element is wound is the length covered by this filamentary element, measured parallel to the axis of the cord in which it is located, after which the filamentary element that has this pitch has made a complete turn about said axis of the cord.

The optional characteristics described below could be combined with one another in so far as such combinations are technically compatible.

In an advantageous embodiment, all the metal filamentary elements have the same diameter Df.

Any range of values denoted by the expression "between a and b" represents the range of values from more than a to less than b (i.e. excluding the limits a and b), whereas any range of values denoted by the expression "from a to b" means the range of values from a up to b (i.e. including the strict limits a and b).

A radial cross section or radial section means here a cross section or a section in a plane that contains the axis of rotation of the tyre.

The expression axial direction means the direction substantially parallel to the axis of rotation of the tyre.

The expression circumferential direction means the direction that is substantially perpendicular both to the axial direction and to a radius of the tyre (in other words, tangent to a circle centred on the axis of rotation of the tyre).

The expression radial direction means the direction along a radius of the tyre, namely any direction that intersects the axis of rotation of the tyre and is substantially perpendicular to that axis.

The median plane (denoted M) is the plane perpendicular to the axis of rotation of the tyre that is situated mid-way between the two beads and passes through the middle of the crown reinforcement.

The equatorial circumferential plane (denoted E) of the tyre is the theoretical plane passing through the equator of the tyre, perpendicular to the median plane and to the radial direction. The equator of the tyre is, in a circumferential section plane (plane perpendicular to the circumferential direction and parallel to the radial and axial directions), the axis that is parallel to the axis of rotation of the tyre and located equidistantly between the radially outermost point of the tread that is intended to be in contact with the ground and the radially innermost point of the tyre that is intended to be in contact with a support, for example a rim, the distance between these two points being equal to H.

The orientation of an angle means the direction, clockwise or anticlockwise, in which it is necessary to rotate from a reference straight line, in this case the circumferential direction of the tyre, defining the angle in order to reach the other straight line defining the angle.

In preferred embodiments, $0.14 \leq Jr \leq 0.25$.

In preferred embodiments, $9 \leq Rf/Df \leq 25$, preferably $9 \leq Rf/Df \leq 22$.

In one embodiment of a cord intended to reinforce a tyre for passenger vehicles, but also for two-wheel vehicles such as motorcycles, and preferably for passenger vehicles, $12 \leq Rf/Df \leq 30$, preferably $12 \leq Rf/Df \leq 25$, more preferably $12 \leq Rf/Df \leq 22$.

In one embodiment of a cord intended to reinforce a tyre for industrial vehicles chosen from vans, heavy-duty vehicles, for example light rail vehicles, buses, heavy road transport vehicles (lorries, tractors, trailers), $9 \leq Rf/Df \leq 15$.

In preferred embodiments, $1.70 \leq Dv/Df \leq 3.20$, preferably $1.70 \leq Dv/Df \leq 3.05$.

In one embodiment of a cord intended to reinforce a tyre for passenger vehicles, but also for two-wheel vehicles such as motorcycles, and preferably for passenger vehicles, $1.70 \leq Dv/Df \leq 3.20$.

In one embodiment of a cord intended to reinforce a tyre for industrial vehicles chosen from vans, heavy-duty vehicles, for example light rail vehicles, buses, heavy road transport vehicles (lorries, tractors, trailers), $1.70 \leq Dv/Df \leq 2.50$.

Advantageously, the helix radius of curvature Rf is such that $4.10 \text{ mm} \leq Rf \leq 5.30 \text{ mm}$.

In one embodiment of a cord intended to reinforce a tyre for passenger vehicles, but also for two-wheel vehicles such as motorcycles, and preferably for passenger vehicles, $4.10 \text{ mm} \leq Rf \leq 4.25 \text{ mm}$.

In one embodiment of a cord intended to reinforce a tyre for industrial vehicles chosen from vans, heavy-duty vehicles, for example light rail vehicles, buses, heavy road transport vehicles (lorries, tractors, trailers), $4.10 \text{ mm} \leq Rf \leq 5.30 \text{ mm}$.

Advantageously, the helix diameter Dh of each metal filamentary element is such that $0.70 \text{ mm} \leq Dh \leq 1.60 \text{ mm}$, preferably $0.75 \text{ mm} \leq Dh \leq 1.60 \text{ mm}$ and more preferably $0.80 \text{ mm} \leq Dh \leq 1.60 \text{ mm}$.

In one embodiment of a cord intended to reinforce a tyre for passenger vehicles, but also for two-wheel vehicles such as motorcycles, and preferably for passenger vehicles, 0.70 mm≤Dh≤0.90 mm, preferably 0.75 mm≤Dh≤0.90 mm, more preferably 0.80 mm≤Dh≤0.90 mm.

In one embodiment of a cord intended to reinforce a tyre for industrial vehicles chosen from vans, heavy-duty vehicles, for example light rail vehicles, buses, heavy road transport vehicles (lorries, tractors, trailers), 0.85 mm≤Dh≤1.60 mm, preferably 1.15 mm≤Dh≤1.60 mm, more preferably 1.20 mm≤Dh≤1.60 mm.

Advantageously, Df is such that 0.10 mm≤Df≤0.50 mm, preferably 0.15 mm≤Df≤0.50 mm, more preferably 0.15 mm≤Df≤0.45 mm.

In one embodiment of a cord intended to reinforce a tyre for passenger vehicles, but also for two-wheel vehicles such as motorcycles, and preferably for passenger vehicles, 0.15 mm≤Df≤0.35 mm.

In one embodiment of a cord intended to reinforce a tyre for industrial vehicles chosen from vans, heavy-duty vehicles, for example light rail vehicles, buses, heavy road transport vehicles (lorries, tractors, trailers), 0.22 mm≤Df≤0.50 mm, preferably 0.22 mm≤Df≤0.45 mm, more preferably 0.30 mm≤Df≤0.45 mm.

Advantageously, Dv is such that Dv 0.50 mm, and more preferably 0.50 mm≤Dv≤1.20 mm.

In one embodiment of a cord intended to reinforce a tyre for passenger vehicles, but also for two-wheel vehicles such as motorcycles, and preferably for passenger vehicles, 0.50 mm≤Dv≤0.70 mm and preferably 0.50 mm≤Dv≤0.65 mm.

In one embodiment of a cord intended to reinforce a tyre for industrial vehicles chosen from vans, heavy-duty vehicles, for example light rail vehicles, buses, heavy road transport vehicles (lorries, tractors, trailers), 0.50 mm≤Dv≤1.20 mm and preferably 0.65 mm≤Dv≤1.20 mm.

Advantageously, each metal filamentary element is wound at a pitch P such that 3 mm≤P≤15 mm, preferably 3 mm≤P≤13 mm, more preferably 7 mm≤P≤11 mm.

In one embodiment of a cord intended to reinforce a tyre for passenger vehicles, but also for two-wheel vehicles such as motorcycles, and preferably for passenger vehicles, 7 mm≤P≤8.5 mm.

In one embodiment of a cord intended to reinforce a tyre for industrial vehicles chosen from vans, heavy-duty vehicles, for example light rail vehicles, buses, heavy road transport vehicles (lorries, tractors, trailers), 7.5 mm≤P≤11 mm.

Advantageously, D is such that D≤2.10 mm, preferably 0.90 mm≤D≤2.10 mm, 0.95 mm≤D≤2.05 mm.

In one embodiment of a cord intended to reinforce a tyre for passenger vehicles, but also for two-wheel vehicles such as motorcycles, and preferably for passenger vehicles, 0.95 mm≤D≤1.20 mm.

In one embodiment of a cord intended to reinforce a tyre for industrial vehicles chosen from vans, heavy-duty vehicles, for example light rail vehicles, buses, heavy road transport vehicles (lorries, tractors, trailers), 1.15 mm≤D≤2.10 mm, preferably 1.15 mm≤D≤2.05 mm.

In one embodiment, each metal filamentary element comprises a single metal monofilament. Here, each metal filamentary element is advantageously made up of a metal monofilament. In a variant of this embodiment, the metal monofilament is directly coated with a layer of a metal coating comprising copper, zinc, tin, cobalt or an alloy of these metals, for example brass or bronze. In this variant, each metal filamentary element is then made up of the metal monofilament, made for example of steel, forming a core, which is directly coated with the metal coating layer.

In this embodiment, each metal elementary monofilament is, as described above, preferably made of steel, and has a mechanical strength ranging from 1000 MPa to 5000 MPa. Such mechanical strengths correspond to the steel grades commonly encountered in the field of tyres, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths potentially allowing improved reinforcement of the matrix in which the cord is intended to be embedded and lightening of the matrix reinforced in this way.

Advantageously, with the layer being made up of N helically wound metal filamentary elements, N ranges from 3 to 18, preferably from 5 to 12, more preferably from 6 to 9.

Advantageously, the ratio K of the pitch P to the diameter Df of each metal filamentary element, P and Df being expressed in millimetres, is such that 19≤K≤44, preferably 20≤K≤40, more preferably 23≤K≤39.

In one embodiment of a cord intended to reinforce a tyre for passenger vehicles, but also for two-wheel vehicles such as motorcycles, and preferably for passenger vehicles, 23≤K≤40 and preferably 25≤K≤39.

In one embodiment of a cord intended to reinforce a tyre for industrial vehicles chosen from vans, heavy-duty vehicles, for example light rail vehicles, buses, heavy road transport vehicles (lorries, tractors, trailers), 19≤K≤35 and preferably 23≤K≤30.

Advantageously, the helix angle α of each metal filamentary element is such that 13°≤α≤30°, preferably 17°≤α≤26°.

In the case of values of the ratio K that are too high or in the case of values of the helix angle that are too low, the longitudinal compressibility of the cord is reduced. In the case of values of the ratio K that are too low or in the case of values of the helix angle that are too high, the longitudinal stiffness of the cord and thus its reinforcement capability are reduced. By virtue of the invention, it is nevertheless possible to use relatively high values of the angle α thanks to the relatively small relative radial clearance Jr and therefore to the presence of a relatively high number of metal filamentary elements on the layer.

In one embodiment of a cord intended to reinforce a tyre for passenger vehicles, but also for two-wheel vehicles such as motorcycles, and preferably for passenger vehicles, 13°≤α≤19.5° and preferably 17°≤α≤19.5°.

In one embodiment of a cord intended to reinforce a tyre for industrial vehicles chosen from vans, heavy-duty vehicles, for example light rail vehicles, buses, heavy road transport vehicles (lorries, tractors, trailers), 18.5°≤α≤30° and preferably 18.5°≤α≤26°.

Advantageously, the cord has a structural elongation As such that As≥1.5%, preferably 1.5%≤As≤5.0%, more preferably 1.9%≤As≤4.5%, the structural elongation As being determined by applying the standard ASTM D2969-04 of 2014 to the cord so as to obtain a force-elongation curve, the structural elongation As being equal to the elongation, in %, corresponding to the projection onto the elongation axis of the intersection between the tangent to the structural portion of the force-elongation curve and the tangent to the elastic portion of the force-elongation curve.

Without filling material, the cord according to the invention has a bi-modular force-elongation curve. Thus, as described above, the force-elongation curve has a structural portion characterized in particular by a modulus of elasticity in extension of this structural portion and, furthermore, an elastic portion characterized in particular by a modulus of elasticity in extension of this elastic portion.

Very advantageously, the cord has a modulus of elasticity in extension of the structural portion of less than or equal to 15 GPa, preferably ranging from 2 GPa to 15 GPa. Thus, the cord has a relatively low modulus which is equivalent to that of prior art extendable or elastic cords having a moderate structural elongation ranging from 1% to 2.5%.

Very advantageously, the cord has a modulus of elasticity in extension of the elastic portion of greater than or equal to 50 GPa, preferably ranging from 50 GPa to 180 GPa. Thus, the cord has a relatively high modulus which is equivalent to that of prior art non-extendable cords having, unlike the advantageous cords of the invention, a relatively low As of less than 1%.

In one embodiment in which, for example, a moderate rigidity in bending is sought, the cords have relatively low moduli, the modulus of elasticity in extension of the elastic portion then ranging from 80 to 130 GPa. In another embodiment, in which the cords have higher moduli, the modulus of elasticity in extension of the elastic portion ranges from 130 to 180 GPa.

The modulus of elasticity in extension of the structural portion of the cord is measured by applying the standard ASTM D2969-04 of 2014 to a cord tested so as to obtain a stress-elongation curve. The modulus of elasticity in extension of the structural portion on the curve obtained is deduced as the slope of the structural portion of the stress-elongation curve.

The modulus of elasticity in extension of the elastic portion of the cord is measured by applying the standard ASTM D2969-04 of 2014 to a cord tested so as to obtain a stress-elongation curve. The modulus of elasticity in extension on the curve obtained is deduced as the slope of the elastic portion of the stress-elongation curve.

Very advantageously, the cord, once embedded in a crosslinked standard elastomeric matrix having a modulus in extension at 10% elongation ranging from 5 MPa to 10 MPa, has a modulus of elasticity in extension greater than or equal to 100 GPa, preferably ranging from 100 GPa to 180 GPa, more preferably from 110 GPa to 180 GPa and even more preferably from 120 GPa to 180 GPa, the modulus of elasticity in extension at 10% elongation being determined according to the standard ASTM D2969-04 of 2014.

In an embodiment in which the cords have relatively low moduli, the modulus of elasticity in extension ranges from 100 GPa to 130 GPa. In another embodiment in which the cords have higher moduli, the modulus of elasticity in extension ranges from 130 GPa to 180 GPa.

The modulus of elasticity in extension of the cord embedded in the elastomeric matrix is measured by applying the standard ASTM D2969-04 of 2014 to this cord embedded in the crosslinked standard elastomeric matrix tested so as to obtain a stress-elongation curve. The modulus of elasticity in extension on the curve obtained is deduced as the slope of the elastic portion of the stress-elongation curve.

The nominal secant modulus in extension at 10% elongation or modulus in extension at 10% elongation is measured in second elongation (i.e. after an accommodation cycle at the degree of extension intended for the measurement itself). These tensile tests make it possible to determine the elasticity stresses and the properties at break. They are performed in accordance with the French standard NF T 46-002 of September 1988. The nominal secant modulus in extension (or apparent stresses, in MPa) are measured in second elongation (i.e. after an accommodation cycle at the degree of extension intended for the measurement itself) at 10% elongation (denoted MA 10) at 23° C.±2° C., and under normal hygrometry conditions. The standard elastomeric matrix is obtained by curing at 160° C. for 15 minutes of an elastomeric composition based on natural rubber, carbon black and the usual additives. In this case, the elastomeric composition comprises 100 phr of natural rubber, 50 phr of carbon black 300 series, 1.5 of N-1,3-dimethylbutyl-N-phenyl-para-phenylenediamine, 1 phr of a salt of cobalt, and a crosslinking system comprising 0.9 phr of stearic acid, 6 phr of insoluble molecular sulphur, 0.8 phr of N,N'-dicyclohexyl-2-benzothiazole-sulphenamide and 7.5 phr of ZnO and exhibiting at the end of the curing step a nominal secant modulus in extension at 10% elongation equal to 6 MPa.

Advantageously, on account of the method used, each metal filamentary element is devoid of preforming marks. Such preforming marks include in particular flats. The preforming marks also include cracks extending in section planes substantially perpendicular to the main axis along which each metal filamentary element extends. Such cracks extend, in a section plane substantially perpendicular to the main axis, from a radially external surface of each metal filamentary element radially towards the inside of each metal filamentary element. As described above, such cracks are initiated by the mechanical preforming tools on account of the bending loads, that is to say perpendicularly to the main axis of each metal filamentary element, making them highly detrimental to endurance. By contrast, in the method employed, the metal filamentary elements are preformed collectively and simultaneously on a transitory core, and the preforming loads are exerted in torsion and therefore not perpendicularly to the main axis of each metal filamentary element. Any cracks created do not extend radially from the radially external surface of each metal filamentary element radially towards the inside of each metal filamentary element but along the radially external surface of each metal filamentary element, making them less detrimental to endurance.

Method for Manufacturing the Cord According to the Invention

A method for manufacturing the cord as defined above comprises:
 a step of supplying a transitory assembly comprising at least one layer made up of M'>1 metal filamentary elements helically wound around a transitory core,
 a step of separating the transitory assembly into at least:
  a first split assembly comprising at least one layer made up of M1'≥1 helically wound metal filamentary element(s), the M1' metal filamentary element(s) originating from the layer made up of M'>1 metal filamentary elements of the transitory assembly,
  a second split assembly comprising at least one layer made up of M2'≥1 helically wound metal filamentary elements, the M2' metal filamentary elements originating from the layer made up of M'>1 metal filamentary elements of the transitory assembly,
  the transitory core or one or more ensembles comprising the transitory core,
 the method comprising a step of reassembling at least the first split assembly with the second split assembly to form the layer consisting of N helically wound metal filamentary elements.

At the end of the step of separating the transitory assembly, in one variant, the first assembly, the second assembly and the transitory core are obtained, the transitory core being isolated from any other metal filamentary element originating from the layer made up of M'>1 metal filamentary elements. In other words, at the end of the step of separating the transitory assembly, in this variant, the first assembly, the second assembly and an ensemble made up of the transitory core are obtained.

In another variant, at the end of the step of separating the transitory assembly, the first assembly, the second assembly and an ensemble comprising the transitory core are obtained, the ensemble comprising the transitory core also comprising one or more metal filamentary elements originating from the layer made up of M'>1 metal filamentary elements of the transitory assembly. In other words, in this variant, at the end of the step of separating the transitory assembly, in this variant, the first assembly, the second assembly and an ensemble made up of the transitory core, and one or more metal filamentary elements originating from the layer made up of M'>1 metal filamentary elements, are obtained.

In yet another variant, at the end of the step of separating the transitory assembly, the first assembly, the second assembly and several ensembles each comprising a portion of the transitory core are obtained, each ensemble comprising a portion of the transitory core also comprising one or more metal filamentary elements originating from the layer made up of M'>1 metal filamentary elements of the transitory assembly. Thus, the ensembles comprise the entire transitory core, and the portions of the transitory core of the ensembles form the transitory core in its entirety. In other words, in this variant, the first assembly, the second assembly and several ensembles each made up of a portion of the transitory core, and one or more metal filamentary elements originating from the layer made up of M'>1 metal filamentary elements of the transitory assembly, are obtained, the portions of the transitory core constituting the transitory core.

By virtue of the reassembly step of the method, it is possible, for given geometric characteristics, to increase the linear density of the cord according to the invention compared to the prior art method in which the number of metal filamentary elements is necessarily limited, while allowing the extraction of the transitory core. Conversely, for a given linear density, it is possible to obtain a greater range of geometric characteristics than with the method of the prior art.

The reassembly step is such that N=M1'+M2'. During this reassembly step, the M1' helically wound metal filamentary element(s) forming the layer of the first split assembly are reassembled with the M2' helically wound metal filamentary elements forming the layer of the second split assembly. Reassembling the metal filamentary elements of these two layers makes it possible to obtain the layer of the cord according to the invention.

In the method for manufacturing the cord according to the invention, as each M1' and M2' metal filamentary element originates from the same layer of the transitory assembly, the reassembly step makes it possible to form the cord according to the invention in which the N metal filamentary elements have the same geometric properties and therefore form a homogeneous layer of metal filamentary elements. Thus, in order to make it possible to obtain a cord in which the metal filamentary elements have identical geometric characteristics, the supply step, the separation step and the reassembly step are carried out in such a way that all the N metal filamentary elements have the same diameter Df, are helically wound at the same pitch P and have the same helix diameter Dh.

Furthermore, as described above, according to the various embodiments, the separation step and the reassembly step are carried out in such a way that M'≥M1'+M2'=N.

The transitory assembly of the method for manufacturing the cord according to the invention consists of the layer made up of the M' metal filamentary elements and the transitory core, the M' metal filamentary elements being helically wound around the transitory core.

The method for manufacturing the cord according to the invention is advantageously a continuous or process-line method. Thus, there is no step of intermediate storage of the various assemblies and ensembles generated during the method between the step of supplying the transitory assembly and the step of reassembling the cord according to the invention.

In the method, a step of splitting an initial object into several final objects means that, during this splitting step, the initial object is divided into the final objects and only these final objects so that the entirety of the initial object goes on to form part of the final objects. In addition, in a splitting step, the initial object is divided into the final objects simultaneously, which is to say that the final objects are separated off at the one same splitting point. In particular, in the case of an initial object that is split into at least three final objects, the three final objects are, during a splitting step, separated from one another simultaneously and at the one same point.

In the method, a step of separating an initial object into several final objects means that, in order to obtain these final objects, at least one splitting step is required. Thus, in order to obtain the final objects, the separation step comprises a step of splitting the initial object into the final objects or else comprises a step of splitting the initial object into intermediate objects, followed by one or more successive steps of splitting the intermediate objects into the final objects. Furthermore, in a separation step, the initial object does not necessarily go on in its entirety to form the final objects, since ensembles or assemblies may have been extracted from the method during one or more splitting steps and so not used in later splitting steps. Finally, a separation step may comprise one or more steps of reassembling several intermediate objects originating from a splitting step of the separation step in order to obtain other intermediate objects or else final objects.

Whether during a separation step or during a splitting step, final objects are physically separated from one another, which is to say not in contact with one another downstream of the step and upstream of any step of reassembling two or more of these final objects.

The cord according to the invention has a single helix. By definition, a single-helix assembly is an assembly in which the axis of each metal filamentary element describes a single helix, in contrast to a double-helix assembly, in which the axis of each metal filamentary element describes a first helix about the axis of the assembly and a second helix about a helix described by the axis of the assembly.

In other words, when the assembly extends in a substantially rectilinear direction, the assembly comprising one or more layers of helically wound filamentary elements, each metal filamentary element of the or each layer describes a helical path about the substantially rectilinear direction, such that the distance between the centre of each metal filamentary element of a given layer and the axis of the substantially rectilinear direction is substantially constant and identical for all the metal filamentary elements of each given layer. By contrast, when a double-helix assembly extends in a substantially rectilinear direction, the distance between the centre of each metal filamentary element of a given layer and the substantially rectilinear direction is different for all of the metal filamentary elements of the given layer.

In a first embodiment for partial reassembly of the M' metal filamentary elements, the separation step and the reassembly step are performed such that M1'+M2'<M'.

In first and second variants of the first embodiment, the step of separating the transitory assembly into at least the first split assembly, the second split assembly and the transitory core or one or more ensembles comprising the transitory core comprises, upstream of the reassembly step:
  a step of separating the transitory assembly into:
    a precursor ensemble comprising at least one layer made up of M1">1 helically wound metal filamentary elements, the M1" metal filamentary elements originating from the layer made up of M'>1 metal filamentary elements of the transitory assembly,
    the second split assembly, and
    the transitory core or one or more ensembles comprising the transitory core, preferably the transitory core
  a step of separating the precursor ensemble into:
    a main ensemble comprising at least one layer made up of M3≥1 helically wound metal filamentary element(s), the M3≥1 metal filamentary element(s) originating from the layer made up of the M1">1 metal filamentary elements of the precursor ensemble, the main ensemble forming the first split assembly, and
    an additional ensemble comprising at least one layer made up of M3'≥1 helically wound metal filamentary element(s), the M3'≥1 metal filamentary element(s) originating from the layer made up of the M1">1 metal filamentary elements of the precursor ensemble.

In these first and second variants of the first embodiment, M'>M1"+M2', M1"≥M3+M3' and M1'=M3.

In one embodiment for manufacturing a cord according to the invention, the precursor ensemble consists of a layer made up of the M1" helically wound metal filamentary elements, the main ensemble consists of a layer made up of the M3 helically wound metal filamentary element(s) and the additional ensemble consists of a layer made up of the M3' helically wound metal filamentary element(s).

In these first and second variant embodiments, the step of separating the transitory assembly into the precursor ensemble, the second split assembly and the transitory core or one or more ensembles comprising the transitory core, preferably the transitory core, takes place upstream of the step of separating the precursor ensemble into the main and additional ensembles.

Advantageously, the step of separating the precursor ensemble into the main ensemble forming the first split assembly and the additional ensemble comprises a step of splitting the precursor ensemble into:
  the main ensemble forming the first split assembly, and
  the additional ensemble.

Thus, advantageously, M1"=M3+M3' and M3=M1'.

In a first variant of the first embodiment in which the transitory core is separated from the first split assembly, the step of separating the transitory assembly into the precursor ensemble, the second split assembly and the transitory core or one or more ensembles comprising the transitory core, preferably the transitory core, comprises:
  a step of separating the transitory assembly into:
    a split ensemble comprising at least one layer made up of M4'>1 metal filamentary elements helically wound around the transitory core, the M4' metal filamentary elements originating from the layer made up of M' metal filamentary elements of the transitory assembly, and
    the second split assembly,
  a step of separating the split ensemble into:
    the precursor ensemble, and
    the transitory core or one or more ensembles comprising the transitory core, preferably the transitory core.

Thus, in the first variant of the first embodiment, advantageously, M'≥M4'+M2' and M4'>M1".

In this first variant, the split ensemble consists of the layer made up of the M4' metal filamentary elements and the transitory core, the M4' metal filamentary elements being helically wound around the transitory core.

In this first variant, the step of separating the split ensemble into the precursor ensemble and the transitory core or one or more ensembles comprising the transitory core, preferably the transitory core, takes place upstream of the step of separating the precursor ensemble into the main and additional ensembles.

Advantageously, in this first variant, the step of separating the transitory assembly into the split ensemble and the second split assembly comprises a step of splitting the transitory assembly into:
  the split ensemble, and
  the second split assembly.

Thus, advantageously, M'=M4'+M2'.

Advantageously, in this first variant, the step of separating the split ensemble into the precursor ensemble and the transitory core or one or more ensembles comprising the transitory core, preferably the transitory core, comprises a step of splitting the spilt ensemble into:
  the precursor ensemble, and
  the transitory core or one or more ensembles comprising the transitory core, preferably the transitory core.

Thus, advantageously, M4'=M1" in the case of a step of splitting the split ensemble into the precursor ensemble and the transitory core.

In a second variant of the first embodiment in which the transitory core is separated from the second split assembly, the step of separating the transitory assembly into the precursor ensemble, the second split assembly and the transitory core or one or more ensembles comprising the transitory core, preferably the transitory core, comprises:
  a step of separating the transitory assembly into:
    a split ensemble comprising at least one layer made up of M4'>1 metal filamentary elements helically wound around the transitory core, the M4' metal filamentary elements originating from the layer made up of M'>1 metal filamentary elements of the transitory assembly, and
    the precursor ensemble, and
  a step of separating the split ensemble into:
    the second split assembly, and
    the transitory core or one or more ensembles comprising the transitory core, preferably the transitory core.

Thus, in the second variant of the first embodiment, advantageously, M'≥M4'+M1" and M4'≥M2'.

As in the first variant, in this second variant, the split ensemble consists of the layer made up of the M4' metal filamentary elements and the transitory core, the M4' metal filamentary elements being helically wound around the transitory core.

In this second variant, the step of separating the transitory assembly into the split ensemble and the precursor ensemble takes place upstream of the step of separating the split ensemble into the second split assembly and the transitory core or one or more ensembles comprising the transitory core, preferably the transitory core.

Advantageously, in this second variant, the step of separating the transitory assembly into the split ensemble and the precursor ensemble comprises a step of splitting the transitory assembly into:
the split ensemble, and
the precursor ensemble.
Thus, advantageously, M'=M4'+M1".

Advantageously, in this second variant, the step of separating the split ensemble into the second split assembly and the transitory core or one or more ensembles comprising the transitory core, preferably the transitory core, comprises a step of splitting the spilt ensemble into:
the second split assembly, and
the transitory core or one or more ensembles comprising the transitory core, preferably the transitory core.

Thus, advantageously, M4'=M2' in the case of a step of splitting the split ensemble into the second split assembly and the transitory core.

In a third variant of the first embodiment in which the transitory core is separated from the first split assembly, the step of separating the transitory assembly into at least the first split assembly, the second split assembly and the transitory core or one or more ensembles comprising the transitory core, comprises, upstream of the reassembly step:
a step of separating the transitory assembly into:
a split ensemble comprising at least one layer made up of M4'>1 metal filamentary elements helically wound around the transitory core, the M4' metal filamentary elements originating from the layer made up of M' metal filamentary elements of the transitory assembly, and
the second split assembly.
a step of separating the split ensemble into:
the first split assembly, and
the transitory core or one or more ensembles comprising the transitory core, preferably the transitory core.

In this third variant of the first embodiment, M'≥M4'+M2' and M4'>M1'.

As in the first and second variants, in this third variant, the split ensemble consists of the layer made up of the M4' metal filamentary elements and the transitory core, the M4' metal filamentary elements being helically wound around the transitory core.

In this third variant, the step of separating the transitory assembly into the split ensemble and the second split assembly takes place upstream of the step of separating the split ensemble into the first split assembly and the transitory core or one or more ensembles comprising the transitory core, preferably the transitory core.

Advantageously, in this third variant, the step of separating the transitory assembly into the split ensemble and the second split assembly comprises a step of splitting the transitory assembly into:
the split ensemble, and
the second split assembly.
Thus, advantageously, M'=M4'+M2'.

Advantageously, the step of separating the split ensemble into the first split assembly and the transitory core or one or more ensembles comprising the transitory core, preferably the transitory core, comprises a step of separating the spilt ensemble into:
a main ensemble comprising at least one layer made up of M3≥1 helically wound metal filamentary element(s), the M3≥1 metal filamentary element(s) originating from the layer made up of the M4'>1 metal filamentary elements of the split ensemble, the main ensemble forming the first split assembly,
an additional ensemble comprising at least one layer made up of M3'≥1 helically wound metal filamentary element(s), the M3'≥1 metal filamentary element(s) originating from the layer made up of the M4'>1 metal filamentary elements of the split ensemble, and
the transitory core or one or more ensembles comprising the transitory core, preferably the transitory core.

Thus, in the third variant of the first embodiment, advantageously M4'≥M3+M3' and M3=M1'.

In one embodiment, the main ensemble consists of a layer made up of the M3 helically wound metal filamentary element(s) and the additional ensemble consists of a layer made up of the M3' helically wound metal filamentary element(s).

Advantageously, the step of separating the split ensemble into the main ensemble forming the first split assembly, the additional ensemble and the transitory core or one or more ensembles comprising the transitory core, preferably the transitory core, comprises:
a step of separating the split ensemble into:
the main ensemble forming the first split assembly,
a derived ensemble comprising at least one layer made up of M5'≥1 metal filamentary element(s) helically wound around the transitory core, the M5'≥1 metal filamentary element(s) originating from the layer made up of the M4'>1 metal filamentary elements of the split ensemble,
a step of separating the derived ensemble into:
the additional ensemble,
the transitory core or one or more ensembles comprising the transitory core, preferably the transitory core.

Thus, in the third variant of the first embodiment, advantageously M4'≥M3+M5', M3=M1' and M5'≥M3'.

Preferably, the derived ensemble consists of the layer made up of the M5'≥1 wound metal filamentary element(s) and the transitory core, the M5' metal filamentary element(s) being helically wound around the transitory core.

In this third variant, the step of separating the split ensemble into the main ensemble and the derived ensemble takes place upstream of the step of separating the derived ensemble into the additional ensemble and the transitory core or one or more ensembles comprising the transitory core, preferably the transitory core.

Advantageously, in this third variant, the step of separating the split ensemble into the main ensemble forming the first split assembly and the derived ensemble comprises a step of splitting the split ensemble into:
the main ensemble forming the first split assembly, and
the derived ensemble.
Thus, advantageously, M4'=M3+M5' and M3=M1'.

Advantageously, in this third variant, the step of separating the derived ensemble into the additional ensemble and the transitory core or one or more ensembles comprising the transitory core, preferably the transitory core, comprises a step of splitting the derived ensemble into:
the additional ensemble, and
the transitory core or one or more ensembles comprising the transitory core, preferably the transitory core.

Thus, advantageously, M5'=M3' in the case of a step of splitting the derived ensemble into the additional ensemble and the transitory core.

In a fourth variant of the first embodiment in which the first split assembly, the second split assembly and the transitory core are separated simultaneously, the step of separating the transitory assembly into at least the first split assembly, the second split assembly and the transitory core or one or more ensembles comprising the transitory core, comprises, upstream of the reassembly step, a step of splitting the transitory assembly into:
- the first split assembly,
- the second split assembly,
- the transitory core or one or more ensembles comprising the transitory core, preferably the transitory core, and
- a split ensemble comprising at least one layer made up of M4'≥1 helically wound metal filamentary element(s), the M4' metal filamentary element(s) originating from the layer made up of M' metal filamentary elements of the transitory assembly.

Preferably, in one embodiment for manufacturing a final assembly made up of a layer of metal filamentary elements, the split ensemble consists of the layer made up of the M4' metal filamentary element(s).

In a configuration of the first embodiment in which the transitory core is separated into two parts each with the first and second split assemblies, the step of separating the transitory assembly into at least the first split assembly, the second split assembly and the transitory core or one or more ensembles comprising the transitory core, comprises, upstream of the reassembly step:
- a step of separating the transitory assembly into:
  - a first split ensemble comprising at least one layer made up of M6'>1 metal filamentary elements helically wound around a first part of the transitory core, the M6'>1 metal filamentary elements originating from the layer made up of the M' metal filamentary elements of the transitory assembly, and
  - a second split ensemble comprising at least one layer made up of M7'>1 metal filamentary elements helically wound around a second part of the transitory core, the M7'>1 metal filamentary elements originating from the layer made up of the M' metal filamentary elements of the transitory assembly,
- the first part of the transitory core and the second part of the transitory core constituting, prior to the step of separating the transitory assembly, the transitory core,
- a step of separating the first split ensemble into:
  - the first split assembly,
  - the first part of the transitory core or one or more ensembles comprising the first part of the transitory core, preferably the first part of the transitory core
- a step of separating the second split ensemble into:
  - the second split assembly, and
  - the second part of the transitory core or one or more ensembles comprising the second part of the transitory core, preferably the second part of the transitory core.

In this configuration of the first embodiment, M'≥M6'+M7', M6'>M1' and M7'≥M2'.

In this configuration of the first embodiment, the first split ensemble consists of the layer made up of the M6' metal filamentary elements and the first part of the transitory core, the M6' metal filamentary elements being helically wound around the first part of the transitory core.

Likewise, in this configuration of the first embodiment, the second split ensemble consists of the layer made up of the M7' metal filamentary elements and the second part of the transitory core, the M7' metal filamentary elements being helically wound around the second part of the transitory core.

In this configuration of the first embodiment, the step of separating the transitory assembly into the first split ensemble and the second split ensemble takes place upstream of the step of separating the first split ensemble into the first split assembly and the first part of the transitory core or one or more ensembles comprising the first part of the transitory core, preferably the first part of the transitory core.

In this configuration of the first embodiment, the step of separating the transitory assembly into the first split ensemble and the second split ensemble takes place upstream of the step of separating the second split ensemble into the second split assembly and the second part of the transitory core or one or more ensembles comprising the second part of the transitory core, preferably the second part of the transitory core.

Advantageously, in this configuration of the first embodiment, the step of separating the transitory assembly into the first split ensemble and the second split ensemble comprises a step of splitting the transitory assembly into:
- the first split ensemble, and
- the second split ensemble.

Thus, advantageously, M'=M6'+M7'.

Advantageously, in this configuration of the first embodiment, the step of separating the second split ensemble into the second split assembly and the second part of the transitory core or one or more ensembles comprising the second part of the transitory core, preferably the second part of the transitory core comprises a step of splitting the second split ensemble into:
- the second split assembly, and
- the second part of the transitory core or one or more ensembles comprising the second part of the transitory core, preferably the second part of the transitory core.

Thus, advantageously, M7'=M2'.

Advantageously, in this configuration of the first embodiment in which the transitory core is separated into two parts each with the first and second split assemblies, the step of separating the first split ensemble into the first split assembly and the first part of the transitory core or one or more ensembles comprising the first part of the transitory core, preferably the first part of the transitory core, comprises a step of separating the first split ensemble into:
- a main ensemble comprising at least one layer made up of M3≥1 helically wound metal filamentary element(s), the M3≥1 metal filamentary element(s) originating from the layer made up of the M6'>1 metal filamentary elements of the first split ensemble, the main ensemble forming the first split assembly,
- an additional ensemble comprising at least one layer made up of M3'≥1 helically wound metal filamentary element(s), the M3'≥1 metal filamentary element(s) originating from the layer made up of the M6'>1 metal filamentary elements of the first split ensemble, and
- the first part of the transitory core or one or more ensembles comprising the first part of the transitory core, preferably the first part of the transitory core.

In this configuration of the first embodiment in which the transitory core is separated into two parts each with the first and second split assemblies, advantageously, M6'≥M3+M3' and M3=M1'.

In one embodiment, the main ensemble consists of a layer made up of the M3 helically wound metal filamentary element(s) and the additional ensemble consists of a layer made up of the M3' helically wound metal filamentary element(s).

In a first variant of this configuration of the first embodiment in which the transitory core is separated into two parts each with the first and second split assemblies, the step of separating the first split ensemble into the main ensemble forming the first split assembly, the additional ensemble and the first part of the transitory core or one or more ensembles comprising the first part of the transitory core, preferably the first part of the transitory core, comprises:
  a step of separating the first split ensemble into:
    a precursor ensemble comprising at least one layer made up of M1">1 helically wound metal filamentary elements, the M1" metal filamentary elements originating from the layer made up of M6'>1 metal filamentary elements of the first split ensemble,
    the first part of the transitory core or one or more ensembles comprising the first part of the transitory core, preferably the first part of the transitory core,
  a step of separating the precursor ensemble into:
    the main ensemble forming the first split assembly and the additional ensemble.

In this first variant of the configuration of the first embodiment in which the transitory core is separated into two parts each with the first and second split assemblies, M6'≥M1", M1"≥M3+M3' and M3=M1'.

In one embodiment, the precursor ensemble consists of a layer made up of the M1" helically wound metal filamentary elements.

In this first variant of this configuration of the first embodiment, the step of separating the first split ensemble into the precursor ensemble and the first part of the transitory core or one or more ensembles comprising the first part of the transitory core, preferably the first part of the transitory core, takes place upstream of the step of separating the precursor ensemble into the main ensemble forming the first split assembly and the additional ensemble.

Advantageously, in this first variant of this configuration of the first embodiment, the step of separating the first split ensemble into the precursor ensemble and the first part of the transitory core or one or more ensembles comprising the first part of the transitory core, preferably the first part of the transitory core comprises a step of splitting the first split ensemble into:
  the precursor ensemble, and
  the first part of the transitory core or one or more ensembles comprising the first part of the transitory core, preferably the first part of the transitory core.

Thus, advantageously, M6'=M1" in the case of a step of splitting the first split ensemble into the precursor ensemble and the first part of the transitory core.

Advantageously, in this first variant of this configuration of the first embodiment, the step of separating the precursor ensemble into the main ensemble forming the first split assembly and the additional ensemble comprises a step of splitting the precursor ensemble into:
  the main ensemble forming the first split assembly, and
  the additional ensemble.

Thus, advantageously, M1"=M3+M3' and M3=M1'.

In a second variant of this configuration of the first embodiment in which the transitory core is separated into two parts each with the first and second split assemblies, the step of separating the first split ensemble into the main ensemble forming the first split assembly, the additional ensemble and the first part of the transitory core or one or more ensembles comprising the first part of the transitory core, preferably the first part of the transitory core, comprises:
  a step of separating the first split ensemble into:
    the main ensemble forming the first split assembly,
    a derived ensemble comprising at least one layer made up of M5'≥1 metal filamentary element(s) helically wound around the first part of the transitory core, the M5'≥1 metal filamentary element(s) originating from the layer made up of the M6'>1 metal filamentary elements of the first split ensemble,
  a step of separating the derived ensemble into:
    the additional ensemble,
    the first part of the transitory core or one or more ensembles comprising the transitory core, preferably the first part of the transitory core.

In this second variant of the configuration of the first embodiment in which the transitory core is separated into two parts each with the first and second split assemblies, M6'≥M3+M5', M5'≥M3' and M3=M1'.

In this second variant of this configuration of the first embodiment, the derived ensemble consists of the layer made up of the M5'≥1 metal filamentary element(s) and the first part of the transitory core, the M5'≥1 metal filamentary element(s) being helically wound around the first part of the transitory core.

In this second variant of this configuration of the first embodiment, the step of separating the first split ensemble into the main ensemble and the derived ensemble takes place upstream of the step of separating the derived ensemble into the additional ensemble and the first part of the transitory core or one or more ensembles comprising the first part of the transitory core, preferably the first part of the transitory core.

Advantageously, in this second variant of this configuration of the first embodiment, the step of separating the first split ensemble into the main ensemble forming the first split assembly and the derived ensemble comprises a step of splitting the first split ensemble into:
  the main ensemble forming the first split assembly, and
  the derived ensemble.

Thus, advantageously, M6'=M3+M5' and M3=M1'.

Advantageously, in this second variant of this configuration of the first embodiment, the step of separating the derived ensemble into the additional ensemble and the first part of the transitory core or one or more ensembles comprising the transitory core, preferably the first part of the transitory core, comprises a step of splitting the derived ensemble into:
  the additional ensemble, and
  the first part of the transitory core or one or more ensembles comprising the transitory core, preferably the first part of the transitory core.

Thus, advantageously, M5'=M3' in the case of a step of splitting the derived ensemble into the additional ensemble and the first part of the transitory core.

In another configuration of the first embodiment in which the transitory core is separated into two parts, the step of separating the transitory assembly into at least the first split assembly, the second split assembly and the transitory core or one or more ensembles comprising the transitory core comprises, upstream of the reassembly step, a step of splitting the transitory assembly into:
  the first split assembly,
  the second split assembly,
  a first part of the transitory core,
  a second part of the transitory core.
the first part of the transitory core and the second part of the transitory core constituting, prior to the step of separating the transitory assembly, the transitory core,
  a split ensemble comprising at least one layer made up of M4'≥1 helically wound metal filamentary element(s), the M4' metal filamentary element(s) originating from the layer made up of M' metal filamentary elements of the transitory assembly.

Preferably, in one embodiment for manufacturing a final assembly made up of a layer of metal filamentary elements, the split ensemble consists of the layer made up of the M4' metal filamentary element(s).

In a second embodiment for total reassembly of the M' metal filamentary elements, the separation step and the reassembly step are performed such that M1'+M2'=M'.

In a first variant of the second embodiment in which the transitory core is separated from the first split assembly, the step of separating the transitory assembly into at least the first split assembly, the second split assembly and the transitory core or one or more ensembles comprising the transitory core, comprises, upstream of the reassembly step:
  a step of separating the transitory assembly into:
    a split ensemble comprising at least one layer made up of M4'≥1 metal filamentary element(s) helically wound around the transitory core, the M4'≥1 metal filamentary element(s) originating from the layer made up of the M'>1 metal filamentary elements of the transitory assembly and
    the second split assembly,
  a step of separating the split ensemble into:
    the first split assembly, and
    the transitory core.

In this first variant of the second embodiment, M'=M4'+M2' and M4'=M1'.

In this first variant of the second embodiment, the split ensemble consists of the layer made up of the M4' metal filamentary elements(s) and the transitory core, the M4' metal filamentary elements(s) being helically wound around the transitory core.

In this first variant of the second embodiment, the step of separating the transitory assembly into the split ensemble and the second split assembly takes place upstream of the step of separating the split ensemble into the first split assembly and the transitory core or one or more ensembles comprising the transitory core, preferably the transitory core.

Advantageously, in this first variant of the second embodiment, the step of separating the transitory assembly into the split ensemble and the second split assembly comprises a step of splitting the transitory assembly into:
  the split ensemble and
  the second split assembly.

Advantageously, in this first variant of the second embodiment, the step of separating the split ensemble into the first split assembly and the transitory core or one or more ensembles comprising the transitory core, preferably the transitory core, comprises a step of splitting the spilt ensemble into:
  the first split assembly, and
  the transitory core.

In a second variant of the second embodiment in which the transitory core is separated from the second split assembly, the step of separating the transitory assembly into at least the first split assembly, the second split assembly and the transitory core or one or more ensembles comprising the transitory core, comprises, upstream of the reassembly step:
  a step of separating the transitory assembly into:
    a split ensemble comprising at least one layer made up of M4'>1 metal filamentary elements helically wound around the transitory core, the M4'>1 metal filamentary elements originating from the layer made up of the M'>1 metal filamentary elements of the transitory assembly, and
    the first split assembly
  a step of separating the split ensemble into:
    the second split assembly, and
    the transitory core.

In this second variant of the second embodiment, M'=M4'+M1' and M4'=M2'.

As in the first variant, in this second variant of the second embodiment, the split ensemble consists of the layer made up of the M4' metal filamentary elements and the transitory core, the metal filamentary elements being helically wound around the transitory core.

In this second variant of the second embodiment, the step of separating the transitory assembly into the split ensemble and the first split assembly takes place upstream of the step of separating the split ensemble into the second split assembly and the transitory core or one or more ensembles comprising the transitory core, preferably the transitory core.

Advantageously, in this second variant of the second embodiment, the step of separating the transitory assembly into the split ensemble and the first split assembly comprises a step of splitting the transitory assembly into:
  the split ensemble, and
  the first split assembly.

Advantageously, in this second variant of the second embodiment, the step of separating the split ensemble into the second split assembly and the transitory core or one or more ensembles comprising the transitory core, preferably the transitory core, comprises a step of splitting the spilt ensemble into:
  the second split assembly, and
  the transitory core or one or more ensembles comprising the transitory core, preferably the transitory core.

In a third variant of the second embodiment in which the transitory core is separated into two parts each with the first and second split assemblies, the step of separating the transitory assembly into at least the first split assembly, the second split assembly and the transitory core or one or more ensembles comprising the transitory core, comprises, upstream of the reassembly step:
  a step of separating the transitory assembly into:
    a first split ensemble comprising at least one layer made up of M6'≥1 metal filamentary element(s) helically wound around a first part of the transitory core, the M6'≥1 metal filamentary element(s) originating from the layer made up of the M' metal filamentary elements of the transitory assembly, and
    a second split ensemble comprising at least one layer made up of M7'>1 metal filamentary elements helically wound around a second part of the transitory core, the M7'>1 metal filamentary elements originating from the layer made up of the M' metal filamentary elements of the transitory assembly,
  the first part of the transitory core and the second part of the transitory core constituting, prior to the step of separating the transitory assembly, the transitory core
  a step of separating the first split ensemble into:
    the first split assembly, and
    the first part of the transitory core,
  a step of separating the second split ensemble into:
    the second split assembly, and
    the second part of the transitory core.

In this third variant of the second embodiment, M'=M6'+M7', M6'=M1' and M7'=M2'.

In this third variant of the second embodiment, the first split ensemble consists of the layer made up of the M6' metal filamentary elements(s) and the first part of the transitory core, the M6' metal filamentary elements(s) being helically wound around the first part of the transitory core.

Likewise, in this third variant, the second split ensemble consists of the layer made up of the M7' metal filamentary elements and the second part of the transitory core, the M7 metal filamentary elements being helically wound around the second part of the transitory core.

In this third variant of the second embodiment, the step of separating the transitory assembly into the first split ensemble and the second split ensemble takes place upstream of the step of separating the first split ensemble into the first split assembly and the first part of the transitory core.

In this configuration of the second embodiment, the step of separating the transitory assembly into the first split ensemble and the second split ensemble takes place upstream of the step of separating the second split ensemble into the second split assembly and the second part of the transitory core.

Advantageously, in this third variant of the second embodiment, the step of separating the transitory assembly into the first split ensemble and the second split ensemble comprises a step of splitting the transitory assembly into:
  the first split ensemble, and
  the second split ensemble.

Advantageously, in this third variant of the second embodiment, the step of separating the first split ensemble into the first split assembly and the first part of the transitory core comprises a step of splitting the first split ensemble into:
  the first split assembly, and
  the first part of the transitory core.

Advantageously, in this third variant of the second embodiment, the step of separating the second split ensemble into the second split assembly and the second part of the transitory core comprises a step of splitting the second split ensemble into:
  the second split assembly, and
  the second part of the transitory core.

In a fourth variant of the second embodiment in which the first split assembly, the second split assembly and the transitory core are separated simultaneously, the step of separating the transitory assembly into at least the first split assembly, the second split assembly and the transitory core or one or more ensembles comprising the transitory core, comprises, upstream of the reassembly step, a step of splitting the transitory assembly into:
  the first split assembly,
  the second split assembly, and
  the transitory core.

In fifth variant of the second embodiment in which the transitory core is separated into two parts, the step of separating the transitory assembly into at least the first split assembly, the second split assembly and the transitory core or one or more ensembles comprising the transitory core comprises, upstream of the reassembly step, a step of splitting the transitory assembly into:
  the first split assembly,
  the second split assembly,
  a first part of the transitory core,
  a second part of the transitory core.
the first part of the transitory core and the second part of the transitory core constituting, prior to the step of separating the transitory assembly, the transitory core.

Advantageously, M' ranges from 4 to 18, and preferably from 6 to 9.

Advantageously, to facilitate the extraction of the transitory core in the embodiments in which the transitory core is separated from the first split assembly:
  M1'=1 or 2 in instances in which M'=4 or M'=5 and
  M1'≤0.75×M' and preferably M1'≤0.70×M' in instances in which M'≥6.

Advantageously, and similarly, to facilitate the extraction of the transitory core in the embodiments in which the transitory core is separated from the second split assembly:
  M2'=1 or 2 in instances in which M'=4 or M'=5 and
  M2'≤0.75×M' and preferably M2'≤0.70×M' in instances in which M'≥6.

Advantageously, and similarly, to facilitate the extraction of the transitory core in the embodiments in which the transitory core is separated into two parts each with the first and second split assemblies:
  M1'=1, 2 or 3 and M2'=1, 2 or 3 in instances in which M'=4 or M'=5 and
  M1'≤0.75×M' in instances in which M'≥6.
  M2'≤0.75×M' in instances in which M'≥6.

To further facilitate the extraction of the transitory core in the embodiments in which the transitory core is separated into two parts each with the first and second assemblies in instances in which M'≥6, M1'≤0.70×M' and M2'≤0.70×M'.

Highly preferably, the step of supplying the transitory assembly comprises a step of assembling, by twisting, the M'>1 metal filamentary elements helically wound around the transitory core.

Advantageously, the step of supplying the transitory assembly comprises a step of twist-balancing the transitory assembly. Thus, since the twist-balancing step is performed on the transitory assembly comprising the M' metal filamentary elements and the transitory core, the twist-balancing step is implicitly performed upstream of the step of separation into the first and second split assemblies. This avoids the need to manage the residual twist imposed during the step of assembling the transitory assembly in the path followed by the various assemblies downstream of the assembly step, notably through the guide means, for example the pulleys.

Advantageously, the method comprises a step of twist-balancing the cord according to the invention downstream of the reassembly step.

Advantageously, the method comprises a step of maintaining the rotation of the cord according to the invention about its respective direction of travel. This step of maintaining the rotation is performed downstream of the step of separating the transitory assembly and upstream of the step of twist-balancing the cord according to the invention.

As a preference, the method does not have steps of individually preforming each of the metal filamentary elements. In the methods of the prior art employing steps of individually preforming each of the metal filamentary elements, these elements receive a shape imposed by preforming tools, for example rollers, these tools creating defects on the surface of the metal filamentary elements. These defects notably lower the endurance of the metal filamentary elements and therefore of the cord according to the invention.

An installation for manufacturing a cord according to the invention comprises:
  means for supplying a transitory assembly comprising at least one layer made up of M'>1 metal filamentary elements helically wound around a transitory core,
  means for separating the transitory assembly into at least:
    a first split assembly comprising at least one layer made up of M1'≥1 helically wound metal filamentary element(s), the M1' metal filamentary element(s) originating from the layer made up of M'>1 metal filamentary elements of the transitory assembly, a second split assembly comprising at least one layer made up of M2'≥1 helically wound metal filamentary elements, the M2' metal filamentary elements originating from the layer made up of M'>1 metal filamentary elements of the transitory assembly, the transitory core or one or more ensembles comprising the transitory core, the installation comprising means for reassembling at least the first split assembly with the second split assembly to form the layer consisting of N helically wound metal filamentary elements.

In order to obtain an assembly in which the metal filamentary elements have identical geometric characteristics, the supply means, the separation means and the reassembly means are arranged in such a way that all the N metal filamentary elements have the same diameter Df, are helically wound at the same pitch P and have the same helix diameter Dh.

Furthermore, as described above, according to the various embodiments, the separation means and the reassembly means are arranged in such a way that M'≥M1'+M2'=N.

In the installation, means for splitting an initial object into several final objects mean that, by implementing these splitting means, the initial object is divided into the final objects and only these final objects so that the entirety of the initial object goes on to form part of the final objects. In addition, by using splitting means, the initial object is divided into the final objects simultaneously, which is to say that the final objects are separated off at the one same splitting point. In particular, in the case of an initial object that is split into at least three final objects, the three final objects are, using splitting means, separated from one another simultaneously and at the one same point.

In the installation, means for separating an initial object into several final objects mean that, in order to obtain these final objects, at least splitting means are required. Thus, in order to obtain the final objects, the separation means comprise means for splitting the initial object into the final objects or else comprise means for splitting the initial object into intermediate objects, and means for splitting the intermediate objects into the final objects. In the use of the separation means, the initial object does not necessarily go on in its entirety to form the final objects, as ensembles or assemblies may have been extracted from the method during the passage through the splitting means and so not used in the passage through later splitting means. Finally, separation means may comprise one or more means for reassembling several intermediate objects originating from splitting means of the separation means in order to obtain other intermediate objects or else the final objects.

In a first embodiment for partial reassembly of the M' metal filamentary elements, the separation means and the reassembly means are arranged such that M1'+M2'<M'.

In first and second variants of the first embodiment, the means for separating the transitory assembly into at least the first split assembly, the second split assembly and the transitory core or one or more ensembles comprising the transitory core comprise, upstream of the reassembly means:

means for separating the transitory assembly into:
a precursor ensemble comprising at least one layer made up of M1''>1 helically wound metal filamentary elements, the M1'' metal filamentary elements originating from the layer made up of M'>1 metal filamentary elements of the transitory assembly, the second split assembly, and
the transitory core or one or more ensembles comprising the transitory core, preferably the transitory core
means for separating the precursor ensemble into:
a main ensemble comprising at least one layer made up of M3≥1 helically wound metal filamentary element(s), the M3≥1 metal filamentary element(s) originating from the layer made up of the M1''>1 metal filamentary elements of the precursor ensemble, the main ensemble forming the first split assembly, and
an additional ensemble comprising at least one layer made up of M3'≥1 helically wound metal filamentary element(s), the M3'≥1 metal filamentary element(s) originating from the layer made up of the M1''>1 metal filamentary elements of the precursor ensemble.

In this first embodiment, the means for separating the transitory assembly into the precursor ensemble, the second split assembly and the transitory core or one or more ensembles comprising the transitory core, preferably the transitory core, are arranged upstream of the means for separating the precursor ensemble into the main and additional ensembles.

Advantageously, the means for separating the precursor ensemble into the main ensemble forming the first split assembly and the additional ensemble comprise means for splitting the precursor ensemble into:
the main ensemble forming the first split assembly, and
the additional ensemble.

In a first variant of the first embodiment in which the transitory core is separated from the first split assembly, the means for separating the transitory assembly into the precursor ensemble, the second split assembly and the transitory core or one or more ensembles comprising the transitory core, preferably the transitory core, comprise:

means for separating the transitory assembly into:
a split ensemble comprising at least one layer made up of M4'>1 metal filamentary elements helically wound around the transitory core, the M4' metal filamentary elements originating from the layer made up of M' metal filamentary elements of the transitory assembly, and
the second split assembly,
means for separating the split ensemble into:
the precursor ensemble, and
the transitory core or one or more ensembles comprising the transitory core, preferably the transitory core.

In this first variant, the means for separating the split ensemble into the precursor ensemble and the transitory core or one or more ensembles comprising the transitory core, preferably the transitory core, are arranged upstream of the means for separating the precursor ensemble into the main and additional ensembles.

Advantageously, in this first variant, the means for separating the transitory assembly into the split ensemble and the second split assembly comprise means for splitting the transitory assembly into:
the split ensemble, and
the second split assembly.

Advantageously, in this first variant, the means for separating the split ensemble into the precursor ensemble and the transitory core or one or more ensembles comprising the transitory core, preferably the transitory core, comprise means for splitting the split ensemble into:
the precursor ensemble, and
the transitory core or one or more ensembles comprising the transitory core, preferably the transitory core.

In a second variant of the first embodiment in which the transitory core is separated from the second split assembly, the means for separating the transitory assembly into the precursor ensemble, the second split assembly and the transitory core or one or more ensembles comprising the transitory core, preferably the transitory core, comprise:

means for separating the transitory assembly into:
a split ensemble comprising at least one layer made up of M4'>1 metal filamentary elements helically wound around the transitory core, the M4' metal filamentary elements originating from the layer made up of M'>1 metal filamentary elements of the transitory assembly, and
the precursor ensemble, and
means for separating the split ensemble into:
the second split assembly, and
the transitory core or one or more ensembles comprising the transitory core, preferably the transitory core.

In this second variant, the means for separating the transitory assembly into the split ensemble and the precursor ensemble are arranged upstream of the means for separating the split ensemble into the second split assembly and the transitory core or one or more ensembles comprising the transitory core, preferably the transitory core.

Advantageously, in this second variant, the means for separating the transitory assembly into the split ensemble and the precursor ensemble comprise means for splitting the transitory assembly into:
the split ensemble, and
the precursor ensemble.

Advantageously, in this second variant, the means for separating the split ensemble into the second split assembly and the transitory core or one or more ensembles comprising the transitory core, preferably the transitory core, comprise means for splitting the split ensemble into:
the second split assembly, and
the transitory core or one or more ensembles comprising the transitory core, preferably the transitory core.

In a third variant of the first embodiment in which the transitory core is separated from the first split assembly, the means for separating the transitory assembly into at least the first split assembly, the second split assembly and the transitory core or one or more ensembles comprising the transitory core, comprises, upstream of the reassembly means:

means for separating the transitory assembly into:
a split ensemble comprising at least one layer made up of M4'>1 metal filamentary elements helically wound around the transitory core, the M4' metal filamentary elements originating from the layer made up of M' metal filamentary elements of the transitory assembly, and
the second split assembly,
means for separating the split ensemble into:
the first split assembly, and
the transitory core or one or more ensembles comprising the transitory core, preferably the transitory core.

In this third variant, the means for separating the transitory assembly into the split ensemble and the second split assembly are arranged upstream of the means for separating the split ensemble into the first split assembly and the transitory core or one or more ensembles comprising the transitory core, preferably the transitory core.

Advantageously, in this third variant, the means for separating the transitory assembly into the split ensemble and the second split assembly comprise means for splitting the transitory assembly into:
the split ensemble, and
the second split assembly.

Advantageously, the means for separating the split ensemble into the first split assembly and the transitory core or one or more ensembles comprising the transitory core, preferably the transitory core, comprise means for separating the split ensemble into:
a main ensemble comprising at least one layer made up of M3≥1 helically wound metal filamentary element(s), the M3≥1 metal filamentary element(s) originating from the layer made up of the M4'>1 metal filamentary elements of the split ensemble, the main ensemble forming the first split assembly,
an additional ensemble comprising at least one layer made up of M3'≥1 helically wound metal filamentary element(s), the M3'≥1 metal filamentary element(s) originating from the layer made up of the M4'>1 metal filamentary elements of the split ensemble, and
the transitory core or one or more ensembles comprising the transitory core, preferably the transitory core.

Advantageously, the means for separating the split ensemble into the main ensemble forming the first split assembly, the additional ensemble and the transitory core or one or more ensembles comprising the transitory core, preferably the transitory core, comprise:
means for separating the split ensemble into:
the main ensemble forming the first split assembly,
a derived ensemble comprising at least one layer made up of M5'≥1 metal filamentary element(s) helically wound around a transitory core, the M5'≥1 metal filamentary element(s) originating from the layer made up of the M4'>1 metal filamentary elements of the split ensemble,
means for separating the derived ensemble into:
the additional ensemble,
the transitory core or one or more ensembles comprising the transitory core, preferably the transitory core.

In this third variant, the means for separating the split ensemble into the main ensemble and the derived ensemble are arranged upstream of the means for separating the derived ensemble into the additional ensemble and the transitory core or one or more ensembles comprising the transitory core, preferably the transitory core.

Advantageously, in this third variant, the means for separating the split ensemble into the main ensemble forming the first split assembly and the derived ensemble comprise means for splitting the split ensemble into:
the main ensemble forming the first split assembly, and
the derived ensemble.

Advantageously, in this third variant, the means for separating the derived ensemble into the additional ensemble and the transitory core or one or more ensembles comprising the transitory core, preferably the transitory core, comprise means for splitting the derived ensemble into:
the additional ensemble, and
the transitory core or one or more ensembles comprising the transitory core, preferably the transitory core.

In a fourth variant of the first embodiment in which the first split assembly, the second split assembly and the transitory core are separated simultaneously, the means for separating the transitory assembly into at least the first split assembly, the second split assembly and the transitory core or one or more ensembles comprising the transitory core, comprise, upstream of the reassembly means, means for splitting the transitory assembly into:
the first split assembly,
the second split assembly, the transitory core or one or more ensembles comprising the transitory core, preferably the transitory core, and a split ensemble comprising at least one layer made up of M4'≥1 helically wound metal filamentary element(s), the M4' metal filamentary element(s) originating from the layer made up of M' metal filamentary elements of the transitory assembly.

In a configuration of the first embodiment in which the transitory core is separated into two parts each with the first and second split assemblies, the means for separating the transitory assembly into at least the first split assembly, the second split assembly and the transitory core or one or more ensembles comprising the transitory core, comprise, upstream of the reassembly means:

means for separating the transitory assembly into:
a first split ensemble comprising at least one layer made up of M6'>1 metal filamentary elements helically wound around a first part of the transitory core, the M6'>1 metal filamentary elements originating from the layer made up of the M' metal filamentary elements of the transitory assembly, and
a second split ensemble comprising at least one layer made up of M7'>1 metal filamentary elements helically wound around a second part of the transitory core, the M7'>1 metal filamentary elements originating from the layer made up of the M' metal filamentary elements of the transitory assembly, the first part of the transitory core and the second part of the transitory core constituting, upstream of the means for separating the transitory assembly, the transitory core means for separating the first split ensemble into:
the first split assembly,
the first part of the transitory core or one or more ensembles comprising the first part of the transitory core, preferably the first part of the transitory core means for separating the second split ensemble into:
the second split assembly, and
the second part of the transitory core or one or more ensembles comprising the second part of the transitory core, preferably the second part of the transitory core.

In this configuration of the first embodiment, the means for separating the transitory assembly into the first split ensemble and the second split ensemble are arranged upstream of the means for separating the first split ensemble into the first split assembly and the first part of the transitory core or one or more ensembles comprising the first part of the transitory core, preferably the first part of the transitory core.

In this configuration of the first embodiment, the means for separating the transitory assembly into the first split ensemble and the second split ensemble are arranged upstream of the means for separating the second split ensemble into the second split assembly and the second part of the transitory core or one or more ensembles comprising the second part of the transitory core, preferably the second part of the transitory core.

Advantageously, in this configuration of the first embodiment, the means for separating the transitory assembly into the first split ensemble and the second split ensemble comprise means for splitting the transitory assembly into:
the first split ensemble, and
the second split ensemble.

Advantageously, in this configuration of the first embodiment, the means for separating the second split ensemble into the second split assembly and the second part of the transitory core or one or more ensembles comprising the second part of the transitory core, preferably the second part of the transitory core comprise means for splitting the second split ensemble into:
the second split assembly, and
the second part of the transitory core or one or more ensembles comprising the second part of the transitory core, preferably the second part of the transitory core.

Advantageously, in this configuration of the first embodiment in which the transitory core is separated into two parts each with the first and second split assemblies, the means for separating the first split ensemble into the first split assembly and the first part of the transitory core or one or more ensembles comprising the first part of the transitory core, preferably the first part of the transitory core, comprise means for separating the first split ensemble into:
a main ensemble comprising at least one layer made up of M3≥1 helically wound metal filamentary element(s), the M3≥1 metal filamentary element(s) originating from the layer made up of the M6'>1 metal filamentary elements of the first split ensemble, the main ensemble forming the first split assembly,
an additional ensemble comprising at least one layer made up of M3'≥1 helically wound metal filamentary element(s), the M3'≥1 metal filamentary element(s) originating from the layer made up of the M6'>1 metal filamentary elements of the first split ensemble, and
the first part of the transitory core or one or more ensembles comprising the first part of the transitory core, preferably the first part of the transitory core.

In a first variant of this configuration of the first embodiment in which the transitory core is separated into two parts each with the first and second split assemblies, the means for separating the first split ensemble into the main ensemble forming the first split assembly, the additional ensemble and the first part of the transitory core or one or more ensembles comprising the first part of the transitory core, preferably the first part of the transitory core, comprise:
means for separating the first split ensemble into:
a precursor ensemble comprising at least one layer made up of M1">1 helically wound metal filamentary elements, the M1" metal filamentary elements originating from the layer made up of M6'>1 metal filamentary elements of the first split ensemble,
the first part of the transitory core or one or more ensembles comprising the first part of the transitory core, preferably the first part of the transitory core,
means for separating the precursor ensemble into:
the main ensemble forming the first split assembly and the additional ensemble.

In this first variant of this configuration of the first embodiment, the means for separating the first split ensemble into the precursor ensemble and the first part of the transitory core or one or more ensembles comprising the first part of the transitory core, preferably the first part of the transitory core, are arranged upstream of the means for separating the precursor ensemble into the main ensemble forming the first split assembly and the additional ensemble.

Advantageously, in this first variant of this configuration of the first embodiment, the means for separating the first split ensemble into the precursor ensemble and the first part of the transitory core or one or more ensembles comprising the first part of the transitory core, preferably the first part of the transitory core comprise means for splitting the first split ensemble into:

the precursor ensemble, and
the first part of the transitory core or one or more ensembles comprising the first part of the transitory core, preferably the first part of the transitory core.

Advantageously, in this first variant of this configuration of the first embodiment, the means for separating the precursor ensemble into the main ensemble forming the first split assembly and the additional ensemble comprise means for splitting the precursor ensemble into:
the main ensemble forming the first split assembly, and
the additional ensemble.

In a second variant of this configuration of the first embodiment in which the transitory core is separated into two parts each with the first and second split assemblies, the means for separating the first split ensemble into the main ensemble forming the first split assembly, the additional ensemble and the first part of the transitory core or one or more ensembles comprising the first part of the transitory core, preferably the first part of the transitory core, comprise:
means for separating the first split ensemble into:
the main ensemble forming the first split assembly,
a derived ensemble comprising at least one layer made up of $M5' \geq 1$ metal filamentary element(s) helically wound around the first part of the transitory core, the $M5' \geq 1$ metal filamentary element(s) originating from the layer made up of the $M6' > 1$ metal filamentary elements of the first split ensemble,
means for separating the derived ensemble into:
the additional ensemble,
the first part of the transitory core or one or more ensembles comprising the transitory core, preferably the first part of the transitory core.

In this second variant of this configuration of the first embodiment, the means for separating the first split ensemble into the main ensemble and the derived ensemble are arranged upstream of the means for separating the derived ensemble into the additional ensemble and the first part of the transitory core or one or more ensembles comprising the first part of the transitory core, preferably the first part of the transitory core.

Advantageously, in this second variant of this configuration of the first embodiment, means for separating the first split ensemble into the main ensemble forming the first split assembly and the derived ensemble comprise means for splitting the first split ensemble into:
the main ensemble forming the first split assembly, and
the derived ensemble.

Advantageously, in this second variant of this configuration of the first embodiment, the means for separating the derived ensemble into the additional ensemble and the first part of the transitory core or one or more ensembles comprising the transitory core, preferably the first part of the transitory core, comprise means for splitting the derived ensemble into:
the additional ensemble, and
the first part of the transitory core or one or more ensembles comprising the transitory core, preferably the first part of the transitory core.

In another configuration of the first embodiment in which the transitory core is separated into two parts, the means for separating the transitory assembly into at least the first split assembly, the second split assembly and the transitory core or one or more ensembles comprising the transitory core comprises, upstream of the reassembly means, means for splitting the transitory assembly into:
the first split assembly,
the second split assembly,
a first part of the transitory core,
a second part of the transitory core.

the first part of the transitory core and the second part of the transitory core constituting, prior to the step of separating the transitory assembly, the transitory core,
a split ensemble comprising at least one layer made up of $M4' \geq 1$ helically wound metal filamentary element(s), the $M4'$ metal filamentary element(s) originating from the layer made up of $M'$ metal filamentary elements of the transitory assembly.

In a second embodiment for total reassembly of the $M'$ metal filamentary elements, the separation means and the reassembly means are arranged such that $M1'+M2'=M'$.

In a first variant of the second embodiment in which the transitory core is separated from the first split assembly, the means for separating the transitory assembly into at least the first split assembly, the second split assembly and the transitory core or one or more ensembles comprising the transitory core, comprise, upstream of the reassembly means:
means for separating the transitory assembly into:
a split ensemble comprising at least one layer made up of $M4' \geq 1$ metal filamentary element(s) helically wound around the transitory core, the $M4' \geq 1$ metal filamentary element(s) originating from the layer made up of the $M' > 1$ metal filamentary elements of the transitory assembly and
the second split assembly,
means for separating the split ensemble into:
the first split assembly, and
the transitory core.

In this first variant of the second embodiment, the means for separating the transitory assembly into the split ensemble and the second split assembly are arranged upstream of the means for separating the split ensemble into the first split assembly and the transitory core.

Advantageously, in this first variant of the second embodiment, the means for separating the transitory assembly into the split ensemble and the second split assembly comprise means for splitting the transitory assembly into the split ensemble and the second split assembly.

Advantageously, in this first variant of the second embodiment, the means for separating the split ensemble into the first split assembly and the transitory core comprise means for splitting the split ensemble into:
the first split assembly, and
the transitory core.

In a second variant of the second embodiment in which the transitory core is separated from the second split assembly, the means for separating the transitory assembly into at least the first split assembly, the second split assembly and the transitory core or one or more ensembles comprising the transitory core, comprise, upstream of the reassembly means:
means for separating the transitory assembly into:
a split ensemble comprising at least one layer made up of $M4' > 1$ metal filamentary elements helically wound around the transitory core, the $M4' > 1$ metal filamentary elements originating from the layer made up of the $M' > 1$ metal filamentary elements of the transitory assembly, and
the first split assembly
means for separating the split ensemble into:
the second split assembly, and
the transitory core.

In this second variant of the second embodiment, the means for separating the transitory assembly into the split ensemble and the first split assembly are arranged upstream of the means for separating the split ensemble into the second split assembly and the transitory core.

Advantageously, in this second variant of the second embodiment, the means for separating the transitory assembly into the split ensemble and the first split assembly comprise means for splitting the transitory assembly into:
  the split ensemble, and
  the first split assembly.

Advantageously, in this second variant of the second embodiment, the means for separating the split ensemble into the second split assembly and the transitory core comprise means for splitting the split ensemble into:
  the second split assembly, and
  the transitory core.

In a third variant of the second embodiment in which the transitory core is separated into two parts each with the first and second split assemblies, the means for separating the transitory assembly into at least the first split assembly, the second split assembly and the transitory core or one or more ensembles comprising the transitory core, comprise, upstream of the reassembly means:
  means for separating the transitory assembly into:
    a first split ensemble comprising at least one layer made up of M6'≥1 metal filamentary element(s) helically wound around a first part of the transitory core, the M6'≥1 metal filamentary element(s) originating from the layer made up of the M' metal filamentary elements of the transitory assembly, and
    a second split ensemble comprising at least one layer made up of M7'>1 metal filamentary elements helically wound around a second part of the transitory core, the M7'>1 metal filamentary elements originating from the layer made up of the M' metal filamentary elements of the transitory assembly,
the first part of the transitory core and the second part of the transitory core constituting, upstream of the means for separating the transitory assembly, the transitory core
  means for separating the first split ensemble into:
    the first split assembly, and
    the first part of the transitory core,
  means for separating the second split ensemble into:
    the second split assembly, and
    the second part of the transitory core.

In this third variant of the second embodiment, the means for separating the transitory assembly into the first split ensemble and the second split ensemble are arranged upstream of the means for separating the first split ensemble into the first split assembly and the first part of the transitory core.

In this configuration of the second embodiment, the means for separating the transitory assembly into the first split ensemble and the second split ensemble are arranged upstream of the means for separating the second split ensemble into the second split assembly and the second part of the transitory core.

Advantageously, in this third variant of the second embodiment, the means for separating the transitory assembly into the first split ensemble and the second split ensemble comprise means for splitting the transitory assembly into the first split ensemble and the second split ensemble.

Advantageously, in this third variant of the second embodiment, the means for separating the first split ensemble into the first split assembly and the first part of the transitory core comprise means for splitting the first split ensemble into:
  the first split assembly, and
  the first part of the transitory core.

Advantageously, in this third variant of the second embodiment, the means for separating the second split ensemble into the second split assembly and the second part of the transitory core comprise means for splitting the second split ensemble into:
  the second split assembly, and
  the second part of the transitory core.

In a fourth variant of the second embodiment in which the first split assembly, the second split assembly and the transitory core are separated simultaneously, the means for separating the transitory assembly into at least the first split assembly, the second split assembly and the transitory core or one or more ensembles comprising the transitory core, comprise, upstream of the reassembly means, means for splitting the transitory assembly into:
  the first split assembly,
  the second split assembly, and
  the transitory core.

In fifth variant of the second embodiment in which the transitory core is separated into two parts, the means for separating the transitory assembly into at least the first split assembly, the second split assembly and the transitory core or one or more ensembles comprising the transitory core comprise, upstream of the reassembly means, means for splitting the transitory assembly into:
  the first split assembly,
  the second split assembly,
  a first part of the transitory core,
  a second part of the transitory core.
the first part of the transitory core and the second part of the transitory core constituting, prior to the step of separating the transitory assembly, the transitory core.

Highly preferably, the means for supplying the transitory assembly comprise means for assembling, by twisting, the M'>1 metal filamentary elements helically wound around the transitory core.

Advantageously, the means for supplying the transitory assembly comprise means for twist-balancing the transitory assembly.

It is also possible to envisage a step of separating, respectively means for separating, the transitory assembly into more than the first and second split assemblies, for example three or even four split assemblies. In these embodiments, the reassembly step, respectively the reassembly means, may allow the reassembly of more than the first and second split assemblies, for example the reassembly of three or even four split assemblies.

Other Subjects of the Invention

A further subject of the invention is the use of such a cord for reinforcing semifinished products or articles comprising an elastomeric matrix in which the cord is embedded.

Such semi-finished products or articles are pipes, belts, conveyor belts, tracks, tyres for vehicles, both in the uncured state (that is to say before crosslinking or vulcanization) and in the cured state (after crosslinking or vulcanization). In preferred embodiments, such semi-finished products or articles take the form of a ply.

A further subject of the invention is a semifinished product or article comprising an elastomeric matrix in which at least one cord as defined above is embedded.

A further subject of the invention is the use of a cord as defined above for reinforcing a tyre comprising the cord.

Lastly, another subject of the invention is a tyre comprising a cord as defined above embedded in an elastomeric matrix, in other words a tyre comprising a reinforcing filamentary element obtained by embedding a cord as defined above in an elastomeric matrix. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape.

Within the tyre according to the invention, the cord is embedded in the elastomeric matrix. Thus, within the tyre, the cord comprises a filling material for the internal enclosure that is based on an elastomeric composition and is situated in the internal enclosure of the filled cord. The filling material is in this case based on the same elastomeric composition as that on which the elastomeric matrix in which the cord is embedded is based.

The values of the characteristics D, Df, Dv, Rf and a and of the other characteristics described above are measured on or determined from plies and cords extracted from a tyre. The characteristics of the cord that are described above ensure that, upon completion of the method for manufacturing the tyre, given the shaping step, the tyre will have the advantages described above.

An elastomeric matrix means a matrix with elastomeric behaviour resulting from the crosslinking of an elastomeric composition. The elastomeric matrix is thus based on the elastomeric composition. Just like the elastomeric matrix, the filling material is based on an elastomeric composition, in this case the same composition as that of the matrix in which the cord is embedded.

The expression "based on" should be understood as meaning that the composition comprises the compound and/or the product of the in situ reaction of the various constituents used, some of these constituents being able to react and/or being intended to react with one another, at least partially, during the various phases of manufacture of the composition; the composition thus being able to be in the fully or partially crosslinked state or in the non-crosslinked state.

An elastomeric composition is understood as meaning that the composition comprises at least one elastomer and at least one other component. Preferably, the composition comprising at least one elastomer and at least one other component comprises an elastomer, a crosslinking system and a filler. The compositions used for these plies are conventional compositions for the skim coating of filamentary reinforcing elements and comprise a diene elastomer, for example natural rubber, a reinforcing filler, for example carbon black and/or silica, a crosslinking system, for example a vulcanizing system, preferably comprising sulphur, stearic acid and zinc oxide, and optionally a vulcanization accelerant and/or retarder and/or various additives. The adhesion between the filamentary reinforcing elements and the matrix in which they are embedded is ensured for example by an ordinary adhesive composition, for example an adhesive of the RFL type or an equivalent adhesive.

The secant modulus in tension of a ply for a force equal to 15% of the force at break is denoted $MA_{15}$ and expressed in daN/mm. The modulus $MA_{15}$ is calculated on the basis of a force-elongation curve obtained by applying the standard ASTM D2969-04 of 2014 to a cord of the ply. The secant modulus in tension of the cord is calculated by determining the gradient of the straight line drawn between the points (0,0) and the point of the curve having an ordinate value equal to 15% of the force at break. The modulus $MA_{15}$ is determined by multiplying the secant modulus in tension of the cord by the density of cords per mm of ply. It will be recalled that the density d of filamentary reinforcing elements in a ply is the number of filamentary reinforcing elements present in the ply in a direction perpendicular to the direction in which the filamentary reinforcing elements extend in the ply. The density d can also be determined from the laying pitch p expressed in mm, the laying pitch being equal to the axis-to-axis distance between two consecutive filamentary reinforcing elements in the direction perpendicular to the direction in which the reinforcing elements extend in the ply. The relationship between d and p is $d=100/p$.

The force at break of a cord is measured according to the standard ASTM D2969-04 of 2014. The force at break of a ply is calculated on the basis of a force-elongation curve obtained by applying the standard ASTM D2969-04 of 2014 to a cord of the ply. The force at break of the ply is determined by multiplying the force at break of the cord by the density of cords per unit width of the ply, this density being as defined above.

The optional characteristics described below could be combined with one another in so far as such combinations are technically compatible.

The tyres of the invention may be intended for passenger motor vehicles (comprising in particular 4×4 vehicles and SUVs (Sport Utility Vehicles)), but also for two-wheel vehicles such as motorcycles, or for industrial vehicles chosen from vans, heavy-duty vehicles—i.e. light rail vehicles, buses, heavy road transport vehicles (lorries, tractors, trailers). Very preferably, the tyres of the invention are intended for passenger vehicles.

Advantageously, the tyre comprises a crown comprising a tread and a crown reinforcement, two sidewalls, two beads, each sidewall connecting each bead to the crown, the crown reinforcement extending in the crown in a circumferential direction of the tyre, the tyre comprising a carcass reinforcement that is anchored in each of the beads and extends in the sidewalls and in the crown, the crown reinforcement being radially interposed between the carcass reinforcement and the tread, the crown reinforcement comprising a filamentary reinforcing element obtained by embedding a cord as defined above in an elastomeric matrix.

Preferably, the crown reinforcement comprises a hoop reinforcement comprising at least one hooping ply and preferably a single hooping ply. The hoop reinforcement is formed preferably by a hooping ply. This embodiment is particularly appropriate for a tyre for passenger vehicles, two-wheel vehicles, industrial vehicles chosen from vans, heavy-duty vehicles, for example light rail vehicles, buses, heavy road transport vehicles (lorries, tractors, trailers), and preferably for passenger vehicles.

Preferably, the crown reinforcement comprises a working reinforcement comprising at least one working ply.

In one embodiment, the hoop reinforcement is radially interposed between the working reinforcement and the tread. Thus, by virtue of the use of metal cords, the hoop reinforcement has, in addition to its hooping function, a function of protecting against punctures and impacts that is much more effective than a hoop reinforcement comprising textile hooping filamentary reinforcing elements.

Advantageously, the hooping ply comprises at least one hooping filamentary reinforcing element obtained by embedding a cord as defined above in an elastomeric matrix.

By virtue of its reduced diameter, the cord makes it possible to reduce the thicknesses of the hooping ply, the weight of the latter, the hysteresis of the tyre, and therefore the rolling resistance of the tyre. Specifically, all other things being equal, the greater the thickness of the hooping ply, the greater the hysteresis thereof. By reducing the diameter, the total thickness of the ply is reduced, while the thickness present at the back of each cord is maintained, making it possible to maintain the decoupling thicknesses between the tread and the hooping ply, for the one part, and between the plies radially on the inside of the hooping ply and the hooping ply itself, for the other part. Moreover, by keeping the thickness at the back of each cord constant, the resistance to the passage of corrosive agents through the hooping ply is retained, making it possible for the working reinforcement to be protected, this protection being all the more important when the working reinforcement comprises only a single working ply.

In addition, by virtue of its excellent longitudinal compressibility, the cord makes it possible to give the tyre excellent endurance under compression, this being all the more advantageous in the case of the elimination of a working ply compared with a prior art tyre described in US2007006957. Moreover, compared with the textile hooping filamentary reinforcing elements of the prior art described in WO2016/166056, the hoop reinforcement is, on account of the use of metal filamentary elements, less expensive, more thermally stable and gives the tyre mechanical protection. In addition, the use of metal filamentary elements makes it easier to check the hoop reinforcement by radiography after it has been manufactured. Finally, compared with the prior art cord 3.26 described in WO2016/166056, the cord of the tyre according to the invention exhibits excellent longitudinal compressibility and therefore much better endurance under compression.

Finally, by virtue of the use of metal cords, the hoop reinforcement has, in addition to its hooping function, a function of protecting against punctures and impacts that is much more effective than a hoop reinforcement comprising textile hooping filamentary reinforcing elements.

Advantageously, the or each hooping filamentary reinforcing element makes an angle strictly less than 10°, preferably less than or equal to 7° and more preferably less than or equal to 5° with the circumferential direction of the tyre.

Advantageously, the or each working ply comprises a plurality of working filamentary reinforcing elements. Preferably, each working filamentary reinforcing element is a metal filamentary element.

Preferably, the working filamentary reinforcing elements of each ply are arranged side by side in a manner substantially parallel to one another. More preferably, each working filamentary reinforcing element extends axially from one axial end of the working reinforcement of the tyre to the other axial end of the working reinforcement of the tyre.

Preferably, the crown reinforcement comprises at least one carcass ply and more preferably a single carcass ply. Thus, and more preferably, the carcass reinforcement, apart from the carcass ply, does not have any ply reinforced by filamentary reinforcing elements. The filamentary reinforcing elements of such reinforced plies excluded from the carcass reinforcement of the tyre comprise the metal filamentary reinforcing elements and the textile filamentary reinforcing elements. Very preferably, the carcass reinforcement is formed by a carcass ply. This embodiment is particularly appropriate for a tyre for passenger vehicles, two-wheel vehicles, industrial vehicles chosen from vans, heavy-duty vehicles, for example light rail vehicles, buses, heavy road transport vehicles (lorries, tractors, trailers), and preferably for passenger vehicles.

Advantageously, the carcass ply comprises carcass filamentary reinforcing elements.

Preferably, each carcass filamentary reinforcing element is a textile filamentary element. By definition, textile means a non-metal filamentary element formed by one or more elementary textile monofilaments optionally coated with one or more layers of a coating based on an adhesive composition. Each elementary textile monofilament is obtained, for example, by melt spinning, solution spinning or gel spinning. Each elementary textile monofilament is made from an organic material, in particular a polymeric material, or an inorganic material, for example glass or carbon. The polymeric materials may be of the thermoplastic type, for instance aliphatic polyamides, notably polyamides 6,6, and polyesters, notably polyethylene terephthalate. The polymeric materials may be of the non-thermoplastic type, for instance aromatic polyamides, notably aramid, and cellulose, either natural or artificial, notably rayon.

Preferably, each carcass filamentary reinforcing element extends axially from one bead of the tyre to the other bead of the tyre.

Advantageously, at least the working filamentary reinforcing elements and the carcass filamentary reinforcing elements are arranged so as to define a triangle mesh in projection onto an equatorial circumferential plane in the radial direction of the tyre.

In an advantageous embodiment, the crown reinforcement is formed by the working reinforcement and the hoop reinforcement. Thus, the crown reinforcement, apart from the working reinforcement and the hoop reinforcement, does not have any ply reinforced by filamentary reinforcing elements arranged substantially parallel to one another and embedded in a matrix of rubber compound. The filamentary reinforcing elements of such reinforced plies excluded from the crown reinforcement of the tyre comprise the metal filamentary reinforcing elements and the textile filamentary reinforcing elements.

A ply means the assembly, on the one hand, of one or more filamentary reinforcing elements and, on the other hand, an elastomeric matrix, the one or more filamentary reinforcing elements being embedded in the elastomeric matrix.

Advantageously, the filamentary reinforcing elements of each ply are embedded in an elastomeric matrix. The different plies may comprise the same elastomeric matrix or different elastomeric matrices.

In the tyre described, the crown comprises the tread and the crown reinforcement. The tread is understood to be a strip of polymeric, preferably elastomeric, material delimited:
  radially towards the outside by a surface intended to be in contact with the ground and
  radially towards the inside by the crown reinforcement.

The strip of polymeric material is made up of a ply of a polymeric, preferably elastomeric, material or is made up of a stack of several plies, each ply being made up of a polymeric, preferably elastomeric, material.

Highly preferably, the crown reinforcement comprises a single hoop reinforcement and a single working reinforcement. Thus, the crown reinforcement, apart from the hoop reinforcement and the working reinforcement, does not have any reinforcement reinforced by reinforcing elements. The reinforcing elements of such reinforcements excluded from the crown reinforcement of the tyre comprise the filamentary reinforcing elements, the knits or the woven fabrics. Thus, as already describe, very preferably, the crown reinforcement is made up of the hoop reinforcement and the working reinforcement.

In a very preferred embodiment, the crown, apart from the crown reinforcement, does not have any reinforcement reinforced by reinforcing elements. The reinforcing elements of such reinforcements excluded from the crown of the tyre comprise the filamentary reinforcing elements, the knits or the woven fabrics. Very preferably, the crown is made up of the tread and the crown reinforcement.

In a very preferred embodiment, the carcass reinforcement is arranged so as to be directly radially in contact with the crown reinforcement and the crown reinforcement is arranged so as to be directly radially in contact with the tread. In this very preferred embodiment, in the case where the working reinforcement comprises a single working ply, the single hooping ply and the single working ply are advantageously arranged so as to be directly radially in contact with one another.

The expression directly radially in contact means that the objects in question that are directly radially in contact with one another, in this case the plies, reinforcements or the tread, are not separated radially by any object, for example by any ply, reinforcement or strip interposed radially between the objects in question that are directly radially in contact with one another.

In a first embodiment of the tyre according to the invention, the working reinforcement comprises two working plies and preferably the working reinforcement is made up of two working plies.

In this first embodiment, the working filamentary reinforcing elements and the carcass filamentary reinforcing elements are arranged so as to define a triangle mesh in projection onto an equatorial circumferential plane in the radial direction of the tyre. In this first embodiment, the hooping filamentary reinforcing elements are not necessary for defining the triangle mesh.

Advantageously, in this first embodiment, each working filamentary reinforcing element in each working ply forms an angle ranging from 10° to 40°, preferably ranging from 20° to 30°, with the circumferential direction of the tyre.

Advantageously, the orientation of the angle made by the working filamentary reinforcing elements with the circumferential direction of the tyre in one working ply is opposite to the orientation of the angle made by the working filamentary reinforcing elements with the circumferential direction of the tyre in the other working ply. In other words, the working filamentary reinforcing elements in one working ply are crossed with the working filamentary reinforcing elements in the other working ply.

Advantageously, each carcass filamentary reinforcing element makes an angle greater than or equal to 80°, preferably ranging from 80° to 90°, with the circumferential direction of the tyre in the median plane of the tyre, in other words in the crown of the tyre.

Advantageously, each carcass filamentary reinforcing element makes an angle greater than or equal to 80°, preferably ranging from 80° to 90°, with the circumferential direction of the tyre in the equatorial circumferential plane of the tyre, in other words in each sidewall.

In a second embodiment of the invention, the working reinforcement comprises a single working ply. Thus, the working reinforcement, apart from the working ply, does not have any ply reinforced by filamentary reinforcing elements. The filamentary reinforcing elements of such reinforced plies excluded from the working reinforcement of the tyre comprise the metal filamentary reinforcing elements and the textile filamentary reinforcing elements.

The working reinforcement is preferably formed by a working ply. This embodiment is particularly advantageous when the or each hooping filamentary reinforcing element is formed by a cord as defined above. The mechanical strength and endurance properties of the hoop reinforcement that are described above then make it possible to eliminate a working ply from the working reinforcement. A significantly lighter tyre is obtained.

In this second embodiment, the one or more hooping filamentary reinforcing elements, the working filamentary reinforcing elements and the carcass filamentary reinforcing elements are arranged so as to define a triangle mesh in projection onto an equatorial circumferential plane in the radial direction of the tyre. In this second embodiment, unlike the first embodiment, the hooping filamentary reinforcing elements are necessary for defining the triangle mesh.

Advantageously, each carcass reinforcing filamentary element makes an angle $A_{C1}$ greater than or equal to 55°, preferably ranging from 55° to 80° and more preferably ranging from 60° to 70°, with the circumferential direction of the tyre in the median plane of the tyre, in other words in the crown of the tyre. Thus, the carcass filamentary reinforcing elements, on account of the angle formed with the circumferential direction, are involved in the formation of the triangle mesh in the crown of the tyre.

In one embodiment, each carcass filamentary reinforcing element makes an angle $A_{C2}$ greater than or equal to 85° with the circumferential direction of the tyre in the equatorial circumferential plane of the tyre, in other words in each sidewall of the tyre. The carcass filamentary reinforcing elements are substantially radial in each sidewall, that is to say substantially perpendicular to the circumferential direction, making it possible for all the advantages of a radial tyre to be retained.

In one embodiment, each working filamentary reinforcing element makes an angle $A_T$ greater than or equal to 10°, preferably ranging from 30° to 50° and more preferably from 35° to 45°, with the circumferential direction of the tyre in the median plane of the tyre. Thus, the working filamentary reinforcing elements, on account of the angle formed with the circumferential direction, are involved in the formation of the triangle mesh in the crown of the tyre.

In order to form a triangular mesh that is as effective as possible, the orientation of the angle $A_T$ and the orientation of the angle $A_{C1}$ are preferably opposite with respect to the circumferential direction of the tyre.

Method for Manufacturing the Tyre According to the Invention

The tyre according to the invention is manufactured using the method described below.

First of all, each carcass ply, each working ply and each hooping ply is manufactured. Each ply is manufactured by embedding the filamentary reinforcing elements of each ply in a uncrosslinked elastomeric composition.

Then, the carcass reinforcement, the working reinforcement, the hoop reinforcement and the tread are arranged so as to form a green form of tyre.

Next, the green form of tyre is shaped so as to at least radially enlarge the green form of tyre. This step has the effect of circumferentially lengthening each ply of the green form of tyre. This step has the effect of lengthening the or each hooping filamentary reinforcing element in the circumferential direction of the tyre. Thus, the or each hooping filamentary reinforcing element has, before the shaping step, characteristics that are different from those after the shaping step.

As described above, the characteristics of the cord without filling material that are described above ensure that, upon completion of the method for manufacturing the tyre, given the shaping step, the tyre will have the advantages described above.

Finally, the compositions of the shaped green form of tyre are crosslinked, for example by curing or vulcanization, so as to obtain the tyre in which each composition exhibits a crosslinked state and forms an elastomeric matrix based on the composition.

BRIEF DESCRIPTION OF THE FIGURES

The invention will be understood better on reading the following description, which is given purely by way of non-limiting example and with reference to the drawings, in which.

TYRE ACCORDING TO A FIRST EMBODIMENT OF THE INVENTION

Figure 1:
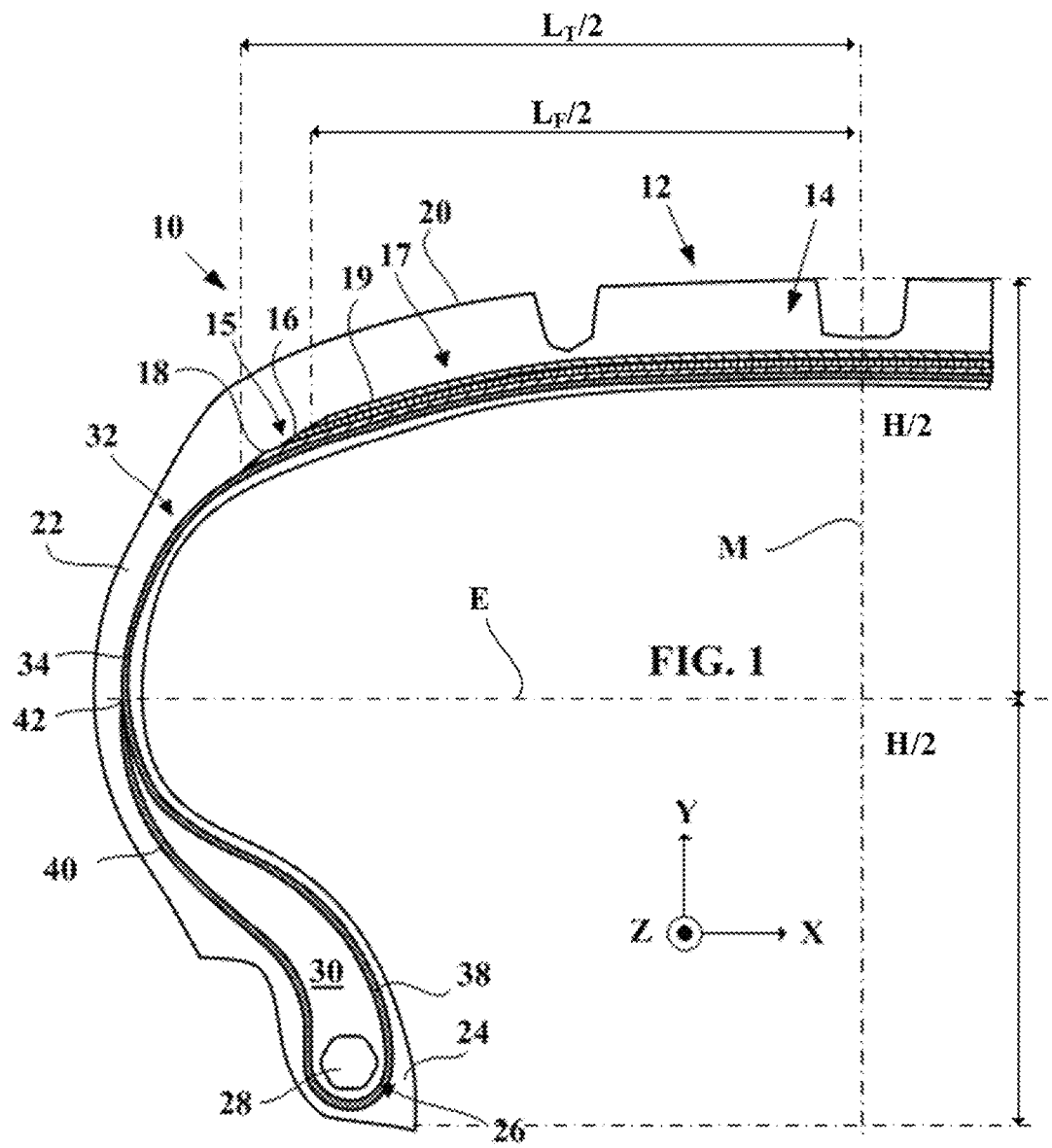
FIG. 1 is a view in radial section of a tyre according to a first embodiment of the invention.
Figure 2:
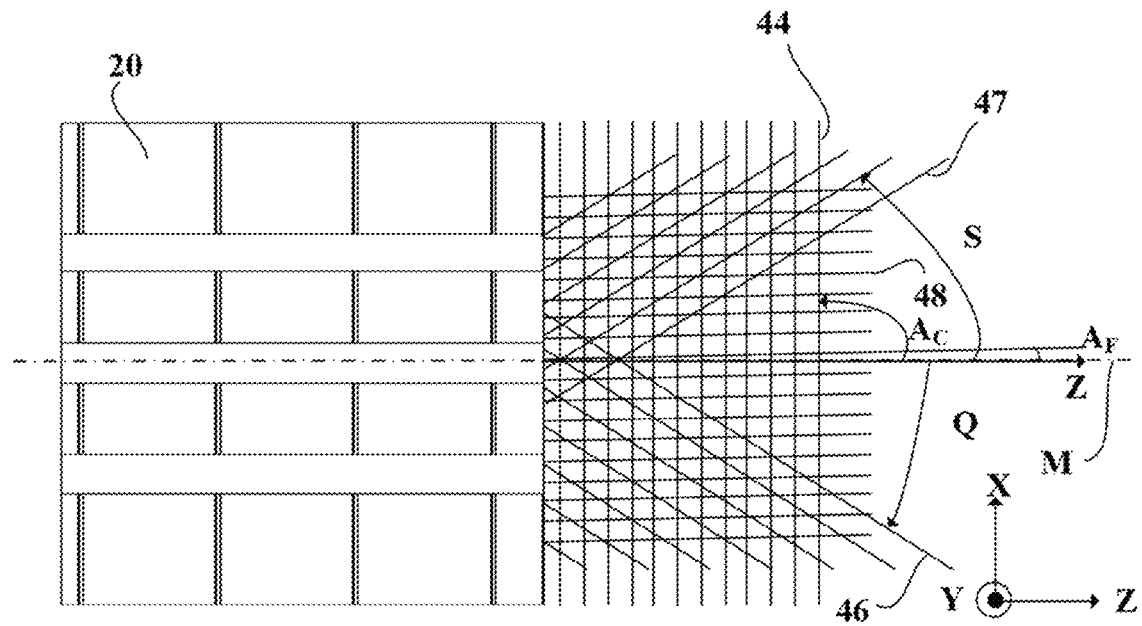
FIG. 2 is a cutaway view of the tyre in FIG. 1 illustrating the projection onto the equatorial circumferential plane E of the hooping filamentary reinforcing elements, of the working filamentary reinforcing elements and of the carcass filamentary reinforcing elements.

FIGS. 1 and 2 show a reference frame X, Y, Z corresponding to the usual axial (X), radial (Y) and circumferential (Z) directions, respectively, of a tyre.

FIG. 1 schematically shows a view in radial section of a tyre according to the invention denoted by the general reference 10. The tyre 10 substantially exhibits revolution about an axis substantially parallel to the axial direction X. The tyre 10 is in this case intended for a passenger vehicle.

With reference to FIGS. 1 and 2, the tyre 10 has a crown 12 comprising a crown reinforcement 14 comprising a working reinforcement 15 comprising two working plies 16, 18 comprising working filamentary reinforcing elements 46, 47, respectively, and a hoop reinforcement 17 comprising a single hooping ply 19 comprising at least one hooping filamentary reinforcing element 48. The crown reinforcement 14 is in this case made up of the working reinforcement 15 and the hoop reinforcement 17. The crown reinforcement 14 extends in the crown 12 in the circumferential direction Z of the tyre 10. The crown 12 comprises a tread 20 arranged radially on the outside of the crown reinforcement 14. In this case, the crown 12 is made up of the tread 20 and the crown reinforcement 14. In this case, the hoop reinforcement 17, in this case the hooping ply 19, is radially interposed between the working reinforcement 15 and the tread 20. In this case, the working reinforcement 15 comprises only two working plies 16, 18 and the hoop reinforcement 17 comprising a single hooping ply 19. In this case, the working reinforcement 15 is made up of the two working plies 16, 18 and the hoop reinforcement 17 is made up of the hooping ply 19. The crown reinforcement 14 is made up of the working reinforcement 15 and the hoop reinforcement 17. The crown 12 is in this case made up of the tread 20 and the crown reinforcement 14.

The tyre 10 also comprises two sidewalls 22 extending the crown 12 radially towards the inside. The tyre 10 also has two beads 24 radially on the inside of the sidewalls 22, each having an annular reinforcing structure 26, in this case a bead wire 28, surmounted by a mass of filling rubber 30 on the bead wire, and also a radial carcass reinforcement 32. Each sidewall 22 connects each bead 24 to the crown 12.

The carcass reinforcement 32 has a carcass ply 34 comprising a plurality of carcass filamentary reinforcing elements 44, the carcass ply 34 being anchored to each of the beads 24 by a turnup around the bead wire 28 so as to form, in each bead 24, a main strand 38 extending from the beads through the sidewalls towards the crown 12, and a turnup strand 40, the radially outer end 42 of the turnup strand 40 being radially on the outside of the annular reinforcing structure 26. The carcass reinforcement 32 thus extends from the beads 24 in and through the sidewalls 22, and into the crown 12. The carcass reinforcement 32 is arranged radially on the inside of the crown reinforcement 14 and the hoop reinforcement 17. The crown reinforcement 14 is therefore radially interposed between the carcass reinforcement 32 and the tread 20. The carcass reinforcement 32 comprises a single carcass ply 34. In this case, the carcass reinforcement 32 is formed by the carcass ply 34. The carcass reinforcement 32 is arranged so as to be directly radially in contact with the crown reinforcement 14 and the crown reinforcement 14 is arranged so as to be directly radially in contact with the tread 20.

The tyre 10 also comprises an airtight internal layer, preferably made of butyl, that is situated axially on the inside of the sidewalls 22 and radially on the inside of the crown reinforcement 14 and extends between the two beads 24.

Each working ply 16, 18, hooping ply 19 and carcass ply 34 comprises an elastomeric matrix in which reinforcing elements of the corresponding ply are embedded. Each elastomeric matrix of the working plies 16, 18, hooping ply 19 and carcass ply 34 is based on a conventional elastomeric composition for the skim coating of reinforcing elements conventionally comprising a diene elastomer, for example natural rubber, a reinforcing filler, for example carbon black and/or silica, a crosslinking system, for example a vulcanizing system, preferably comprising sulphur, stearic acid and zinc oxide, and possibly a vulcanization accelerant and/or retarder and/or various additives.

Figure 3:
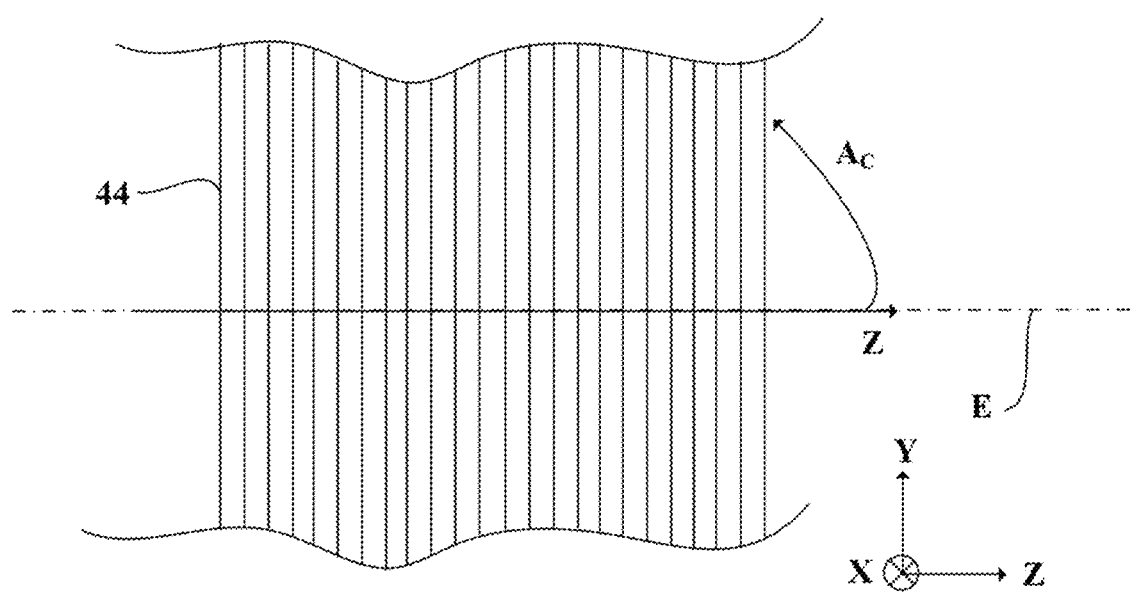
FIG. 3 is a view of the carcass filamentary reinforcing elements arranged in the sidewall of the tyre in FIG. 1 in projection onto the median plane M of the tyre.

With reference to FIGS. 2 and 3, each carcass filamentary reinforcing element 44 extends axially from one bead 24 of the tyre 10 to the other bead 24 of the tyre 10. Each carcass filamentary reinforcing element 44 makes an angle $A_C$ greater than or equal to 80°, preferably ranging from 80° to 90°, with the circumferential direction Z of the tyre 10 in the median plane M and equatorial circumferential plane E of the tyre 10, in other words in the crown 12 and in each sidewall 22.

With reference to FIG. 2, the working filamentary reinforcing elements 46, 47 of each working ply 16, 18 are arranged side by side in a manner substantially parallel to one another. Each working filamentary reinforcing element 46, 47 extends axially from one axial end of the working reinforcement 15 of the tyre 10 to the other axial end of the working reinforcement 15 of the tyre 10. Each working filamentary reinforcing element 46, 48 makes an angle ranging from 10° to 40°, preferably ranging from 20° to 30° and in this case equal to 26° with the circumferential direction Z of the tyre 10 in the median plane M. The orientation of the angle S made by the working filamentary reinforcing elements 46 with the circumferential direction Z of the tyre 10 in the working ply 16 is opposite to the orientation of the angle Q made by the working filamentary reinforcing elements 47 with the circumferential direction Z of the tyre 10 in the other working ply 18. In other words, the working filamentary reinforcing elements 46 in one working ply 16 are crossed with the working filamentary reinforcing elements 47 in the other working ply 18.

Figure 4:
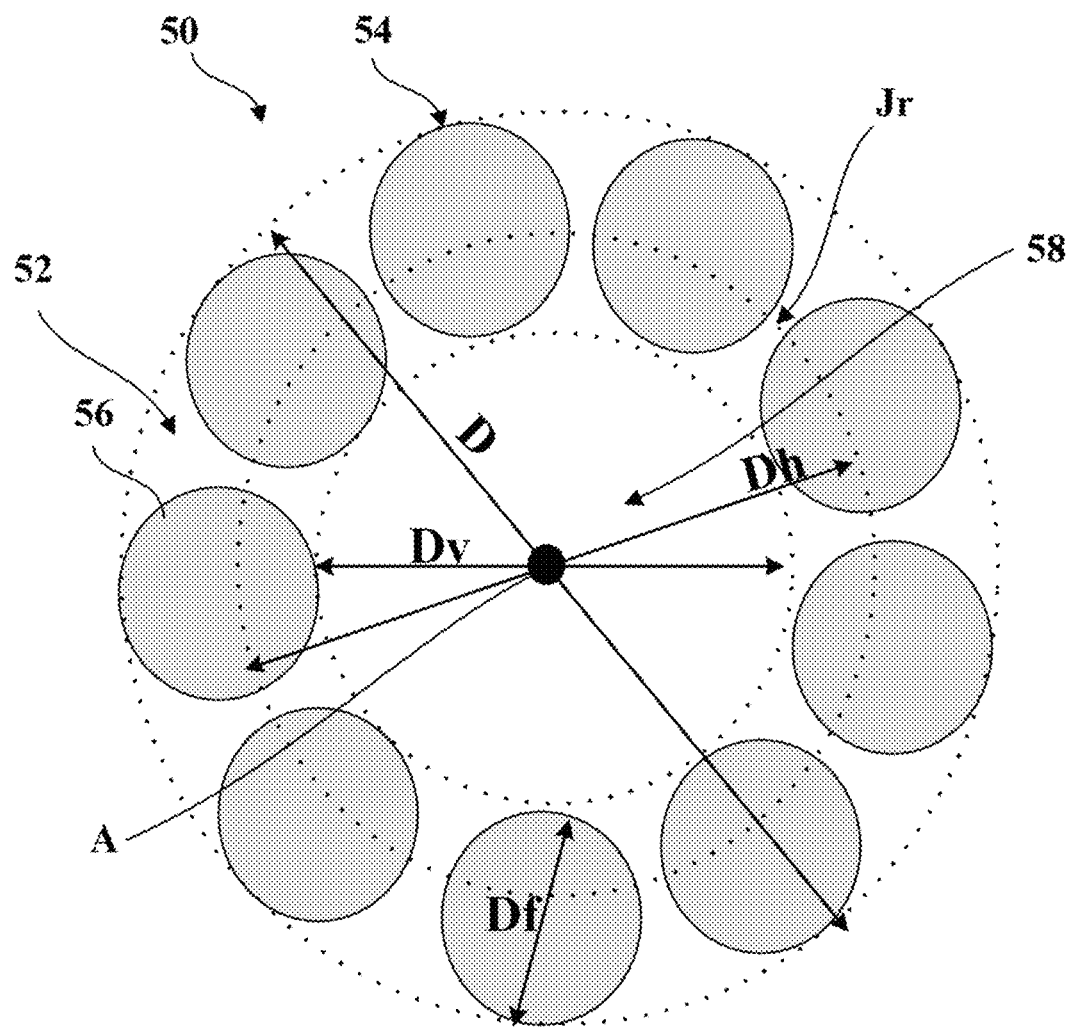
FIG. 4 is a view in cross section perpendicular to its axis of a cord according to a first embodiment of the invention (assumed to be rectilinear and at rest)

With reference to FIG. 2, the single hooping ply 19 comprises at least the hooping filamentary reinforcing element 48 obtained by embedding the cord 50 in an elastomeric matrix based on the elastomeric composition of the hooping ply 19 and as illustrated in FIG. 4 and described in more detail below. Being embedded in the matrix of the hooping ply 19, the cord 50 within the tyre 10 comprises a filling material for the internal enclosure 58 based on the elastomeric composition of the hooping ply 19, this filling material 53 being situated in the internal enclosure 58 of the cord 50. In this instance, the hooping ply 19 comprises a single hooping filamentary reinforcing element 48 wound continuously over an axial width $L_F$ of the crown 12 of the tyre 10. Advantageously, the axial width $L_F$ is less than the width $L_T$ of the working ply 18. The hooping filamentary reinforcing element 48 makes an angle $A_F$ strictly less than 10° with the circumferential direction Z of the tyre 10, preferably less than or equal to 7°, and more preferably less than or equal to 5°. In this instance, the angle is in this case equal to 5°.

The carcass filamentary reinforcing elements 44 and working filamentary reinforcing elements 46, 47 are arranged, in the crown 12, so as to define a triangle mesh in projection onto the equatorial circumferential plane E in the radial direction of the tyre.

Each carcass filamentary reinforcing element 44 is a textile filamentary element and conventionally comprises two multifilament strands, each multifilament strand being made up of a spun yarn of polyester, in this case PET, monofilaments, these two multifilament strands being individually overtwisted at 240 turns·m$^{-1}$ in one direction and then twisted together at 240 turns·m$^{-1}$ in the opposite direction. These two multifilament strands are wound in a helix around one another. Each of these multifilament strands has a count equal to 220 tex.

Each working filamentary reinforcing element 46, 47 is a metal filamentary element and in this case is an assembly of two steel monofilaments that each have a diameter equal to 0.30 mm, the two steel monofilaments being wound together at a pitch of 14 mm.

CORD ACCORDING TO A FIRST EMBODIMENT OF THE INVENTION

With reference to FIG. 4, the cord 50 according to the invention comprises a single layer 52 of helically wound metal filamentary elements 54. In this instance, the cord 50 is made up of the single layer 52, in other words the cord 50 does not comprise any other metal filamentary element than those of the layer 52. The layer 52 is made up of N helically wound metal filamentary elements, N ranging from 3 to 18, preferably from 5 to 12, more preferably from 6 to 9 and in this case N=9. The cord 50 has a main axis A extending substantially parallel to the direction in which the cord extends along its greatest length. Each metal filamentary element 54 of the layer 52 describes, when the cord 50 extends in a substantially rectilinear direction, a helical path about the main axis A substantially parallel to the substantially rectilinear direction, such that, in a section plane substantially perpendicular to the main axis A, the distance between the centre of each metal filamentary element 54 of the layer 52 and the main axis A is substantially constant and identical for all the metal filamentary elements 54 of the layer 52. This constant distance between the centre of each metal filamentary element 54 of the layer 52 and the main axis A is equal to half the helix diameter Dh.

In the embodiment illustrated, each metal filamentary element 54 comprises a single metal monofilament 56. Each metal filamentary element 54 also comprises a layer (not shown) of a metal coating comprising copper, zinc, tin, cobalt or an alloy of these metals, in this case brass. Each metal monofilament 56 is made of carbon steel and has a tensile strength in this case equal to 3200 MPa.

The diameter Df of each metal filamentary element 54 is such that $0.10 \leq Df \leq 0.50$ mm, preferably $0.15$ mm $\leq Df \leq 0.50$ mm and more preferably $0.15$ mm $\leq Df \leq 0.45$ mm, and, in this first embodiment such that $0.15$ mm $\leq Df \leq 0.35$ mm. In this instance, Df=0.20 mm for all the metal filamentary elements 54. Each metal filamentary element 54 is without preforming marks.

The cord 50 has a diameter D such that $D \leq 2.10$ mm, preferably $0.90$ mm $\leq D \leq 2.10$ mm and more preferably $0.95$ mm $\leq D \leq 2.05$ mm, and, in this first embodiment such that $0.95$ mm $\leq D \leq 1.20$ mm. In this instance, D=1.04 mm.

Advantageously, each metal filamentary element 54 is wound at a pitch P such that $3$ mm $\leq P \leq 15$ mm, preferably $5$ mm $\leq P \leq 13$ mm, more preferably $7$ mm $\leq P \leq 11$ mm, and, in this first embodiment $7$ mm $\leq P \leq 8.5$ mm. In this instance, P=7.8 mm.

The ratio K of the pitch P to the diameter Df of each metal filamentary element, P and Df being expressed in millimetres, is such that $19 \leq K \leq 44$, preferably $20 \leq K \leq 40$, more preferably $23 \leq K \leq 39$, and, in this first embodiment such that $23 \leq K \leq 40$ and preferably $25 \leq K \leq 39$. In this instance, K=39.

Figure 5:
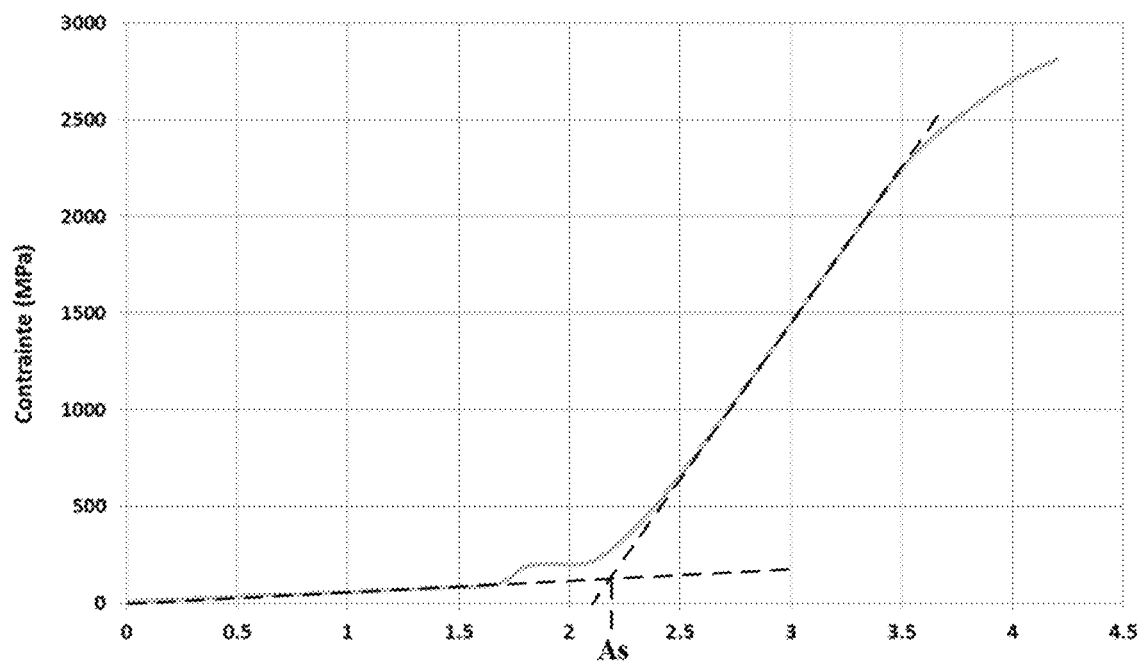
FIG. 5 shows a stress-elongation curve of the cord in FIG. 4.

The cord 50 according to the first embodiment has a structural elongation As such that $As \geq 1.5\%$, preferably $1.5\% \leq As \leq 5.0\%$, more preferably $1.9\% \leq As \leq 4.5\%$ and in this case equal to 2.2%. As described above, the value As is determined by plotting a force-elongation curve of the cord 50, applying the standard ASTM D2969-04 of 2014. The curve obtained is shown in FIG. 5. The structural elongation As is determined by determining the projection onto the elongation axis of the intersection between the tangent to the structural portion of the force-elongation curve and the tangent to the elastic portion of the force-elongation curve.

The helix angle α of each metal filamentary element is such that $13° \leq \alpha \leq 30°$, preferably $17° \leq \alpha \leq 26°$ and in this first embodiment such that $13° \leq \alpha \leq 19.5°$ and preferably 17°≤α≤19.5°. In this instance, as described above, with the characteristics of the cord 50, α(1)=17.76°, α(2)=18.23° and α(3)=α=18.26°.

Each metal filamentary element 54 has a helix radius of curvature Rf such that 4.10 mm≤Rf≤5.30 mm and in this first embodiment 4.10 mm≤Rf≤4.25 mm. The radius of curvature Rf is calculated using the relationship Rf=P/(π×Sin(2α)). Since in this case P=7.8 mm and α=18.26°, Rf=4.18 mm.

The helix diameter Dh of each metal filamentary element is such that 0.70 mm≤Dh≤1.60 mm, preferably 0.75 mm≤Dh≤1.60 mm, more preferably 0.80 mm≤Dh≤1.60 mm and in the first embodiment such that 0.70 mm≤Dh≤0.90 mm, preferably 0.75 mm≤Dh≤0.90 mm, more preferably 0.80 mm≤Dh≤0.90 mm. The helix diameter Dh is calculated using the relationship Dh=P×Tan(α)/π. Since in this case P=7.8 mm and α=18.26°, Dh=0.82 mm.

The metal filamentary elements 54 define an internal enclosure 58 of the cord 50 of diameter Dv. The enclosure diameter Dv is calculated using the relationship Dv=Dh−Df, in which Df is the diameter of each metal filamentary element and Dh is the helix diameter. Advantageously, Dv is such that Dv≥0.50 mm and preferably 0.50 mm≤Dv≤1.20 mm and in the first embodiment 0.50 mm≤Dv≤0.70 mm, preferably 0.50 mm≤Dv≤0.65 mm. In this case, since Dh=0.82 mm and Df=0.20 mm, Dv=0.62 mm.

According to the invention, 9≤Rf/Df≤30, preferably 9≤Rf/Df≤25, more preferably 9≤Rf/Df≤22 and in the first embodiment 12≤Rf/Df≤30, preferably 12≤Rf/Df≤25, more preferably 12≤Rf/Df≤22. In this case, Rf/Df=20.7. According to the invention, 1.60≤Dv/Df≤3.20, preferably 1.70≤Dv/Df≤3.20, and in this case Dv/Df=3.10.

Also, 0.10≤Jr≤0.25 where Jr=N/(π*(D−Df))×(Dh×Sin(π/N)−(Df/Cos(α×π/180))), preferably 0.14≤Jr≤0.25 and in this case Jr=0.24.

The cord 50 has a modulus of elasticity in extension of the structural portion of less than or equal to 15 GPa, preferably ranging from 2 GPa to 15 GPa, and in this case equal to 5 GPa. Furthermore, the cord 50 has a modulus of elasticity in extension of the elastic portion of greater than or equal to 50 GPa, preferably ranging from 50 GPa to 180 GPa. In the first embodiment, the modulus of elasticity in extension of the elastic portion ranges from 130 to 180 GPa, and is in this case equal to 160 GPa.

Figure 6:
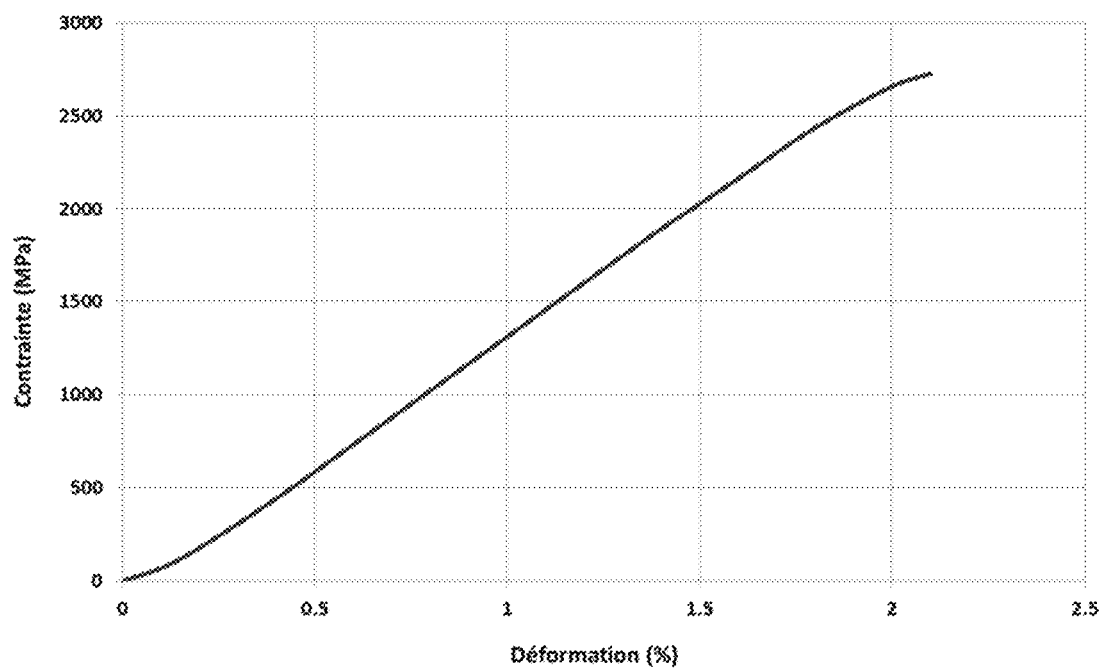
FIG. 6 shows a stress-elongation curve of the cord in FIG. 4, embedded in a crosslinked standard elastomeric matrix.

With reference to FIG. 6, the modulus of the cord 50, embedded in a crosslinked standard elastomeric matrix as described above and having a modulus in extension at 10% elongation ranging from 5 MPa to 10 MPa, has a modulus of elasticity in extension greater than or equal to 100 GPa, preferably ranging from 100 GPa to 180 GPa, more preferably from 110 GPa to 180 GPa, and in this case equal to 145 GPa.

METHOD FOR MANUFACTURING THE TYRE ACCORDING TO THE FIRST EMBODIMENT

The tyre 10 is manufactured using the method described below.

First of all, the working ply 18 and the carcass ply 34 are manufactured by arranging the filamentary reinforcing elements of each ply parallel to one another and embedding them, for example by skim coating, in an uncrosslinked composition comprising at least an elastomer, the composition being intended to form an elastomeric matrix once crosslinked. A ply known as a straight ply, in which the filamentary reinforcing elements of the ply are parallel to one another and are parallel to the main direction of the ply, is obtained. Then, if necessary, portions of each straight ply are cut at a cutting angle and these portions are butted against one another so as to obtain a ply known as an angled ply, in which the filamentary reinforcing elements of the ply are parallel to one another and form an angle with the main direction of the ply equal to the cutting angle.

Then, an assembly method is implemented, during which the hoop reinforcement 17, in this case the hooping ply 19, is arranged radially on the outside of the working reinforcement 15. In this instance, in a first variant, a strip with a width B significantly less than $L_F$ is manufactured, in which the hooping filamentary reinforcing element 48 formed by a cord 50 is embedded in the elastomeric matrix based on the uncrosslinked elastomeric composition of the strip, and the strip is wound helically through several turns so to obtain the axial width $L_F$. In a second variant, the hooping ply 19 having a width $L_F$ is manufactured in a similar manner to the carcass and working plies and the hooping ply 19 is wound through one turn over the working reinforcement 15. In a third variant, the hooping filamentary reinforcing element 48 formed by the cord 50 is wound radially on the outside of the working ply 18, and then a layer based on the uncrosslinked elastomeric composition of the hooping ply 19, in which the hooping filamentary reinforcing element 48 formed by the cord 50 will be embedded during the curing of the tyre, is deposited on top. In the three variants, the bonded filamentary reinforcing element 48 formed by the cord 50 is embedded in a composition in order to form, at the end of the method for manufacturing the tyre, the hooping ply 19 comprising the hooping filamentary reinforcing element 48 formed by the cord 50.

Then, the carcass reinforcement, the working reinforcement, the hoop reinforcement and the tread are arranged so as to form a green form of tyre in which the compositions of the elastomeric matrices have not yet been crosslinked and are in an uncured state.

Next, the green form of tyre is shaped so as to at least radially enlarge the green form of tyre. Finally, the compositions of the shaped green form of tyre are crosslinked, for example by curing or vulcanization, so as to obtain the tyre in which each composition exhibits a crosslinked state and forms an elastomeric matrix based on the composition.

INSTALLATION AND METHOD FOR MANUFACTURING THE CORD ACCORDING TO THE FIRST EMBODIMENT

Figure 7:
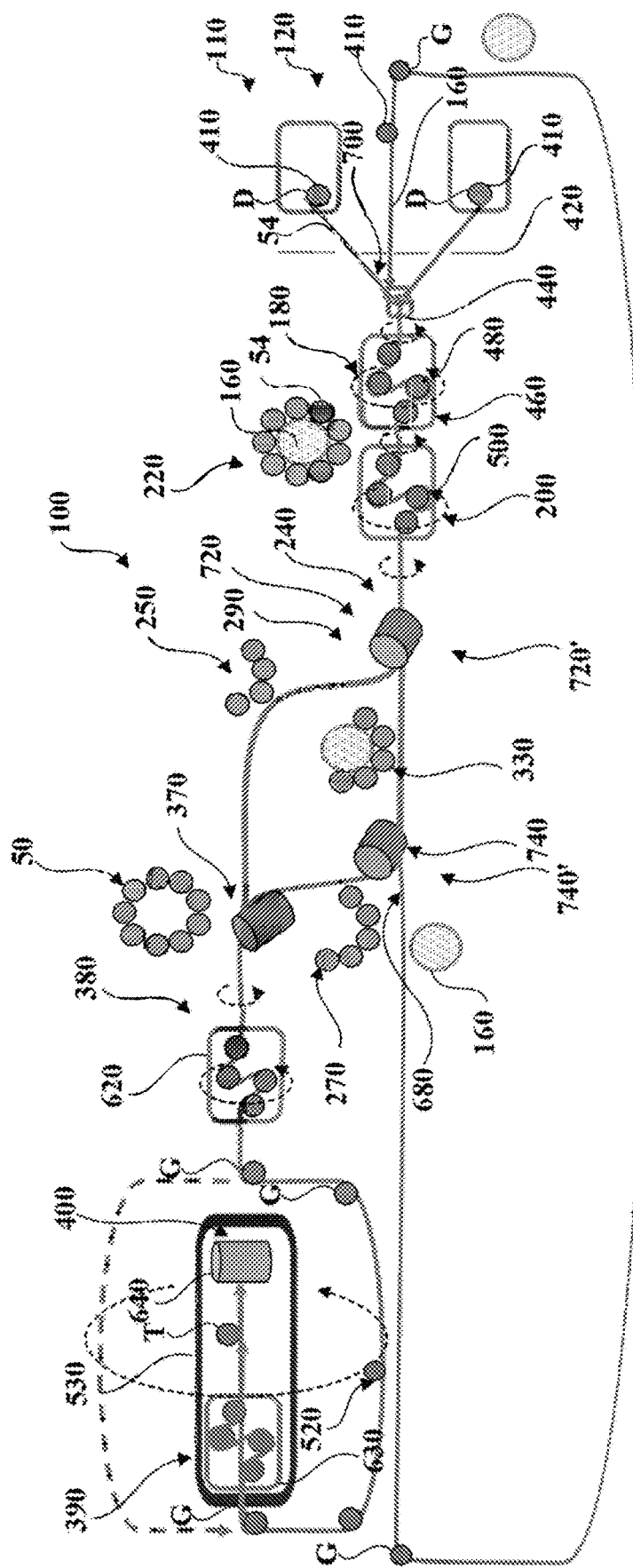
FIGS. 7 to 14 show an installation and a method for manufacturing the cord in FIG. 4.

FIG. 7 shows an installation for manufacturing the cord 50. The installation is denoted by the overall reference 100.

Figure 9:
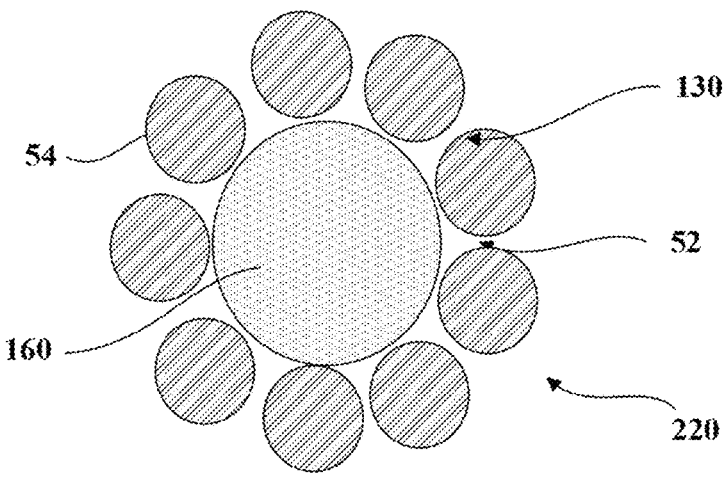

The installation 100 comprises first of all means for 110 supplying a transitory assembly 220 comprising at least one, and in this case consisting of a layer 130 made up of M'>1 metal filamentary elements 54 helically wound around a transitory core 160. The transitory assembly 220 shown in FIG. 9 comprises the layer 130 made up of the M' metal filamentary elements 54 and the transitory core 160, the M' metal filamentary elements 54 being helically wound around the transitory core 160. In this case, the transitory assembly 220 consists of the layer 130 made up of the M'=7 metal filamentary elements 54 and of the transitory core 160, the M' metal filamentary elements 54 being helically wound around the transitory core 160. The transitory core is in this case a textile filamentary element, more particularly in this case a polyester textile multifilament strand having a count of 334 tex and a diameter of approximately equal to 0.60 mm.

The supply means 110 comprise means 120 for feeding in the M' metal filamentary elements 54 and the transitory core 160. The supply means 110 also comprise means 180 for assembling, by twisting, the M' metal filamentary elements 54 together in the layer 130 of M' metal filamentary elements 54 around the transitory core 160 so as to form the transitory assembly 220. Furthermore, the supply means 110 comprise means 200 for twist-balancing the transitory assembly 220. On exiting the means 200, each metal filamentary element 54 of the transitory assembly 220 is, in this case, assembled at a transitory pitch of 5 mm. The transitory helix diameter of each metal filamentary element 54 of the transitory assembly 220 is, in this case, substantially equal to 0.80 mm.

Downstream of the supply means 110, considering the direction of travel of the metal filamentary elements, the installation 100 comprises means 240 for separating the transitory assembly 220 into a first split assembly 250, a second split assembly 270 and the transitory core 160 or one or more ensembles comprising the transitory core 160, in this case the transitory core 160.

Figure 10:
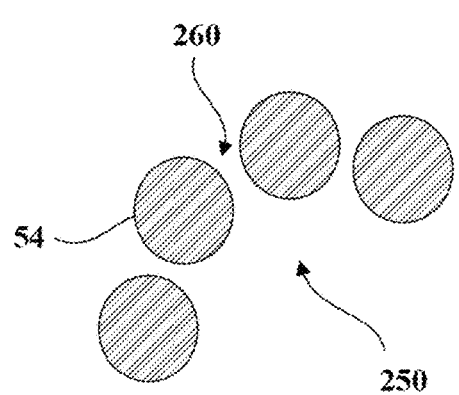
Figure 11:
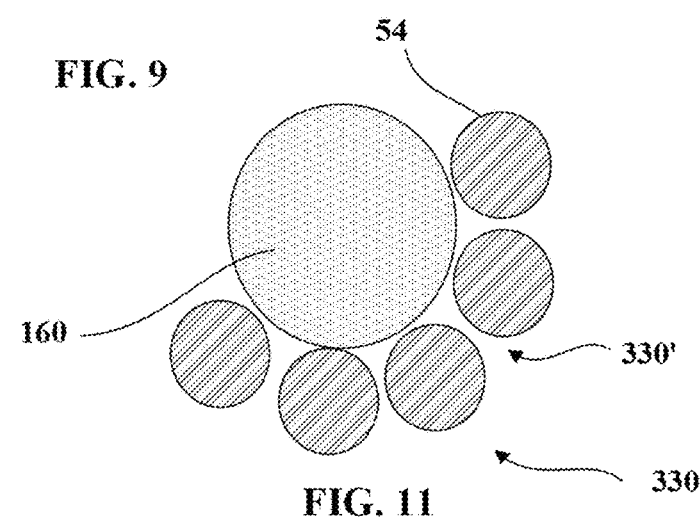

The first split assembly 250, shown in FIG. 10, consists of a layer 260 made up of M1'≥1 helically wound metal filamentary element(s) 54. In this case, M1'=4. The M1' metal filamentary elements originate from the layer 130 of the transitory assembly 220.

Figure 12:
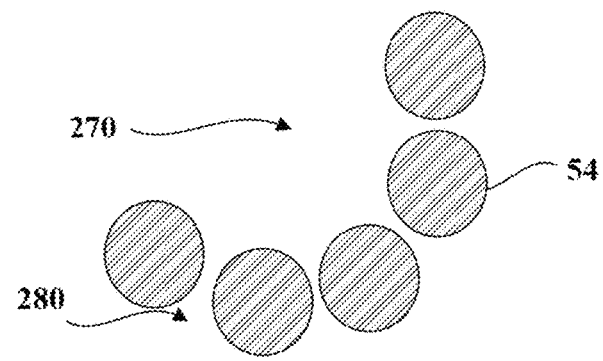

The second split assembly 270, shown in FIG. 12, consists of a layer 330' made up of M2'>1 helically wound metal filamentary elements 54. In this case, M2'=5. The M2' metal filamentary elements originate from the layer 130 of the transitory assembly 220.

Downstream of the supply means 110, the means 240 for separating the transitory assembly 220 into the first split assembly 250, the second split assembly 270 and the transitory core 160 comprise means 720 for separating the transitory assembly 220 into the first split assembly 250 and a split ensemble 330 comprising at least one layer 330' made up of M4'=3 metal filamentary elements 54 helically wound around the transitory core 160, the M4' metal filamentary elements 54 originating from the layer 52 made up of the M'>1 metal filamentary elements 54 of the transitory assembly 220. The split ensemble 330 thus comprises the layer 330' and the transitory core 160, the M4' metal filamentary elements 540 being helically wound around the transitory core 160. In this case, the split ensemble 330 is made up of the layer 330' and of the transitory core 160, the M'4 metal filamentary elements 54 being helically wound around the transitory core 160. In this case, the separation means 720 comprise means 720' for splitting the transitory assembly 220 into the first split assembly 250 and the split ensemble 330.

The means 240 for separating the transitory assembly 220 into the first split assembly 250, the second split assembly 270 and the transitory core 160 comprise means 740 for separating the split ensemble 330 into the second split assembly 270 and the transitory core 160. In this case, the separation means 740 comprise means 740' for splitting the split ensemble 330 into the second split assembly 270 and the transitory core 160.

In this embodiment, the separation means 720 are arranged upstream of the separation means 740.

Downstream of the separation means 240, the installation 100 comprises means 370 for reassembling the first split assembly 250 with the second split assembly 270 to form the layer 52 made up of N helically wound metal filamentary elements 54. The separation means 240 and the reassembly means 370 are arranged such that M1'+M2'=M'. In this particular instance, on account of the elastic springback of each metal filamentary element 54 in response to the twisting step, the pitch of each metal filamentary element 54 of the transitory assembly 220 passes from the transitory pitch equal to 5 mm to the pitch P in this case equal to 7.8 mm. A person skilled in the art knows how to determine what transitory pitch to apply in order to obtain the desired pitch P.

The helix diameter Dh of each metal filamentary element 54 in the cord 50 is in this case substantially greater than the transitory helix diameter of each filamentary element 54 in the transitory assembly 220, on account of the elastic springback. The greater the degree of twist, the greater the extent to which the helix diameter Dh of each metal filamentary element 54 in the cord 50 exceeds the transitory helix diameter of each filamentary element 54 in the transitory assembly 220. A person skilled in the art knows how to determine the transitory helix diameter to be applied in order to obtain the desired helix diameter Dh, depending on the degree of twist and on the nature of the transitory core. The same goes for the enclosure diameter.

The supply means 110, the separation means 240 and the reassembly means 370 are arranged such that all the N metal filamentary elements 54 have the same diameter Df=0.20 mm, are helically wound at the same pitch P=7.8 mm and have the same helix diameter Dh=0.82 mm.

Downstream of the reassembly means 370, when considering the direction of travel of the metal filamentary elements 54, the installation 100 comprises means 380 for maintaining the rotation of the cord 50 about their direction of travel.

Downstream of the rotation-maintaining means 380, when considering the direction of travel of the metal filamentary elements 54, the installation 100 comprises means 390 for twist-balancing the cord 50.

Downstream of the twist-balancing means 390, when considering the direction of travel of the metal filamentary elements 54, the installation 100 comprises means 400 for storing the cord 50.

The installation 100 also comprises means G for guiding, D for paying out, and T for applying tension to the filamentary elements and assemblies, as are conventionally used by those skilled in the art, for example pulleys and capstans.

The feed means 120 in this case comprise nine spools 410 for storing each filamentary element 54 and one spool 410 for storing the transitory core 160. In FIG. 7, for the sake of clarity, only two of the nine spools 410 have been depicted.

The assembly means 180 comprise a distributor 420 and an assembly guide 440. The assembly means 180 comprise means 460 for twisting the M' metal filamentary elements 54 and the transitory core 160. The twisting means 460 comprise a twisting device 480, also more commonly known to those skilled in the art as a "twister", for example a four-pulley twister. Downstream of these twisting means 460, the twist-balancing means 200 comprise a twister 500, for example a four-pulley twister. Finally, downstream of the twister 480, the assembly means 180 comprise a bow 520 and a pod 530 bearing the final twist-balancing means 390 and the storage means 400. The bow 520 and the pod 530 are mounted with the ability to rotate so as to retain the pitch of assembly of the cord 50.

Figure 13:
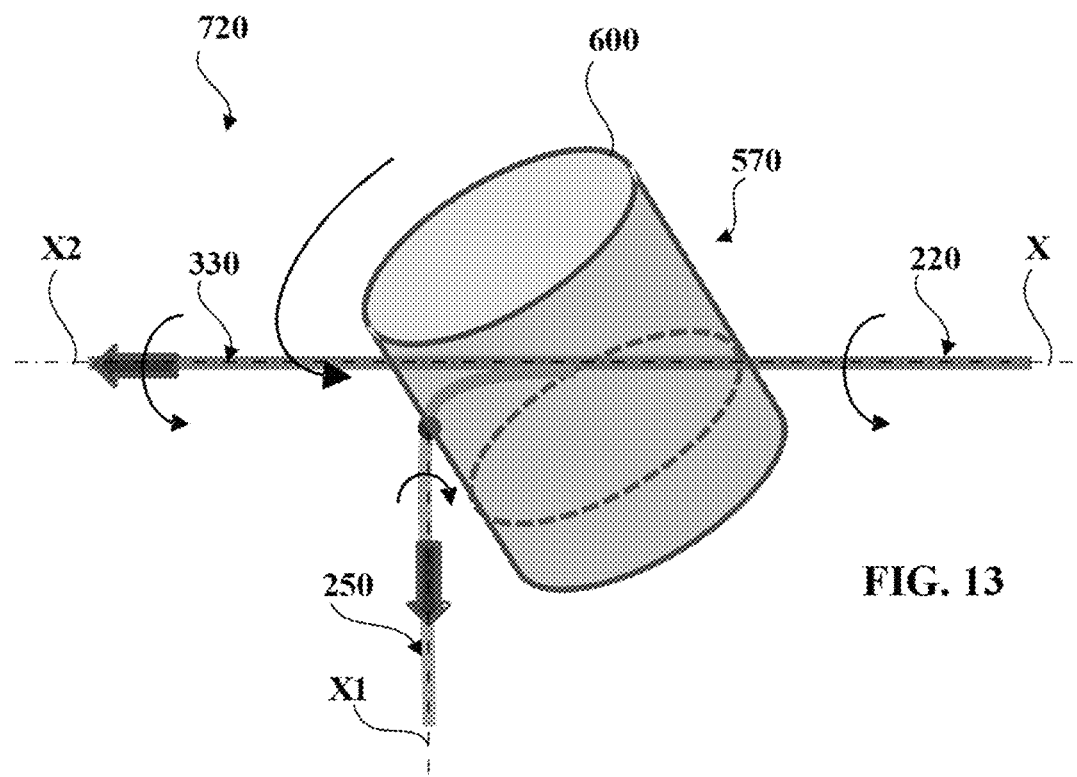

FIG. 13 depicts the splitting means 720. The transitory assembly 220 progresses in an upstream direction of travel X. After passing through the splitting means 720, the split ensemble 330 progresses in a downstream direction of travel X2 and the first split assembly 250 progresses in a downstream direction X1. The splitting means 720 comprise guide means 570 allowing, on the one hand, translational movement of the split ensemble 330 and of the first split assembly 250 in the downstream directions X2, X1, respectively, and, on the other hand, rotation of the split ensemble 330 and of the first split assembly 250 about the downstream directions X2, X1, respectively. In this particular instance, the means 570 comprise an inclined rotary roller 600. The splitting means 740 are analogous to the splitting means 720 described hereinabove. During the method, the first split assembly 250 comes into contact with the roller 600 downstream of the point of splitting into the split ensemble 330 and the first split assembly 250.

Figure 14:
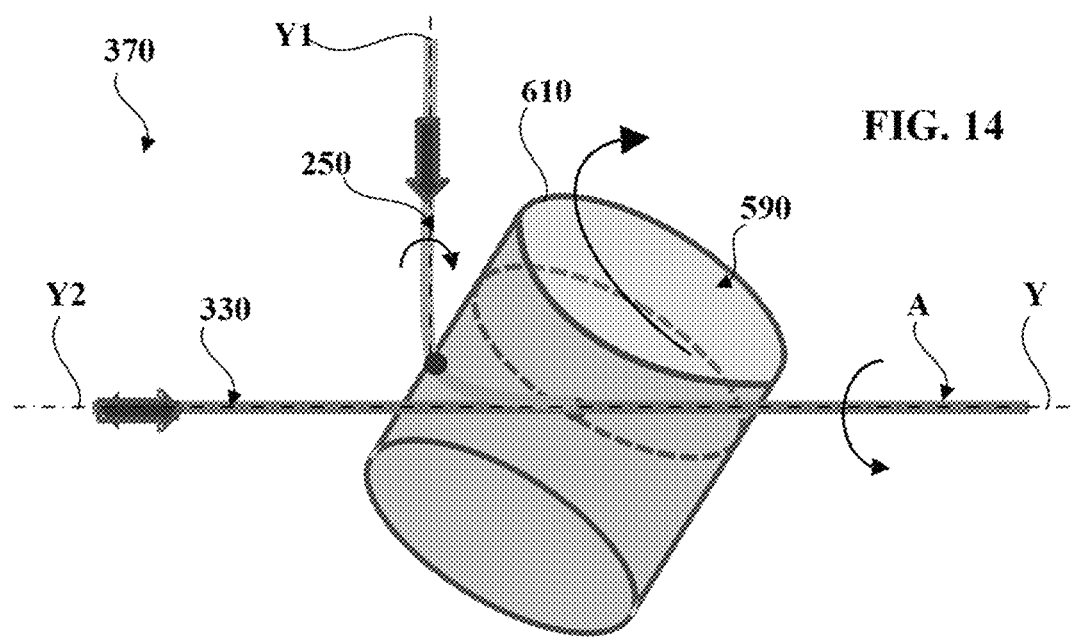

FIG. 14 depicts the reassembly means 370. The first split assembly 250 progresses in an upstream direction of travel Y1. The second split assembly 270 progresses in an upstream direction of travel Y2. The cord 50 progresses in a downstream direction of travel Y. The reassembly means 370 comprise guide means 590 allowing, on the one hand, translational movement of the first and second split assemblies 250, 270 in the downstream directions Y1, Y2, respectively, and, on the other hand, rotation of the first and second split assemblies 250, 270 about the downstream directions Y1, Y2, respectively. In this particular instance, the means 590 comprise an inclined rotary roller 610. During the method, the first split assembly 250 comes into contact with the roller 610 upstream of the point of reassembly of the first and second split assemblies 250, 270.

The rotation-maintaining means 380 comprise a twister 620, for example a four-pulley twister, for maintaining the rotation of the cord 50 about the downstream direction Y respectively. The final twist-balancing means 390 also comprise a twister 630, for example a four-pulley twister. The storage means 400 in this case comprise a spool 640 for storing the cord 50.

In order to recycle the transitory core 160, the installation 100 comprises guide means G for guiding the transitory core 160 between, on the one hand, an exit 680 from the separation means 240, in this instance downstream of the splitting means 740 and, on the other hand, an entry 700 into the assembly means 180.

It will be noted that the installation 100 has no preforming means, particularly means for individually preforming the filamentary elements 54, arranged upstream of the assembly means 180.

Figure 8:
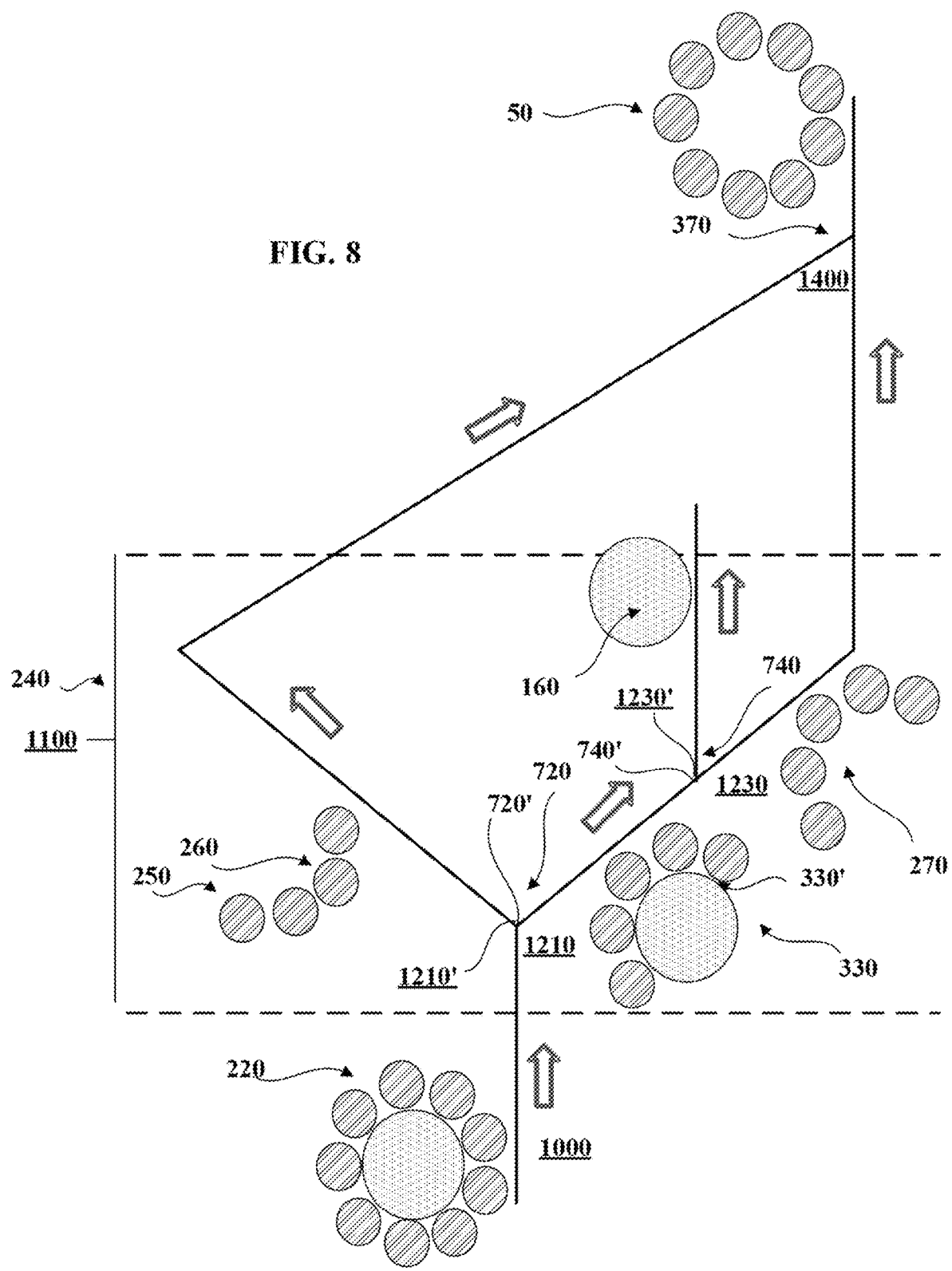

The various means 240, 720, 740, 370 and the various assemblies and ensembles 220, 250, 270, 330 are depicted schematically in FIG. 8 in which the arrows indicate the direction of travel of these assemblies and ensembles from downstream towards upstream.

The method for implementation of the installation 100 described hereinabove will now be described. The method allows the manufacture of the cord 50 described hereinabove.

First of all, the filamentary elements 54 and the transitory core 160 are paid out from the feed means 120, in this instance the spools 410.

Next, the method comprises a step 1000 of supplying the transitory assembly 220 comprising, on the one hand, a step of assembly by twisting the M' metal filamentary elements 54 in a single layer of M' metal filamentary elements 54 around the transitory core 160 and, on the other hand, a step of twist-balancing the transitory assembly 220 carried to out by means of the twister 500.

The method comprises a step 1100 of separating the transitory assembly 220 into the first split assembly 250, the second split assembly 270 and the transitory core 160 or one or more ensembles comprising the transitory core 160, in this case the transitory core 160.

Downstream of the supply step 1000, the step 1100 of separating the transitory assembly 220 into the first split assembly 250, the second split assembly 270 and the transitory core 160 comprises a step 1210 of separating the transitory assembly 220 into the first split assembly 250 and the split ensemble 330. In this case, the separation step 1210 comprises a step 1210' of splitting the transitory assembly 220 into the first split assembly 250 and the split ensemble 330.

The step 1100 of separating the transitory assembly 220 into the first split assembly 250, the second split assembly 270 and the transitory core 160 comprises a step 1230 of separating the split ensemble 330 into the second split assembly 250 and the transitory core 160. In this case, the separation step 1230 comprises a step 1230' of splitting the split ensemble 330 into the second split assembly 270 and the transitory core 160.

The separation step 1210 takes place upstream of the separation step 1230.

Downstream of the separation step 1100 and the splitting steps 1210 and 1230, the method comprises a step 1400 of reassembling the first split assembly 250 with the second split assembly 270 to form the layer 52. The separation step 1100 and the reassembly step 1400 are carried out such that M1'+M2'=M'.

Note also that M'=6, M'=M4'+M1', M4'=M2', N=6, M1'=3, M2'=3.

The method also comprises steps of maintaining the rotation of the cord 50 about its direction of travel. These rotation-maintaining steps are carried out downstream of the step of separating the transitory assembly 220 by the means 380. A final twist-balancing step is performed, using the means 390. Finally, the cord 50 is stored on the storage spools 640.

As regards the transitory core 160, the method comprises a step of recycling the transitory core 160. During this recycling step, the transitory core 160 is recovered downstream of the separation step 1100, in this case downstream of the splitting step 1230, and the transitory core 160 previously recovered is reintroduced upstream of the assembly step 180. This recycling step is continuous.

It will be noted that the method thus described does not have steps of individually preforming each of the metal filamentary elements 54.

CORD ACCORDING TO A SECOND EMBODIMENT OF THE INVENTION

Figure 15:
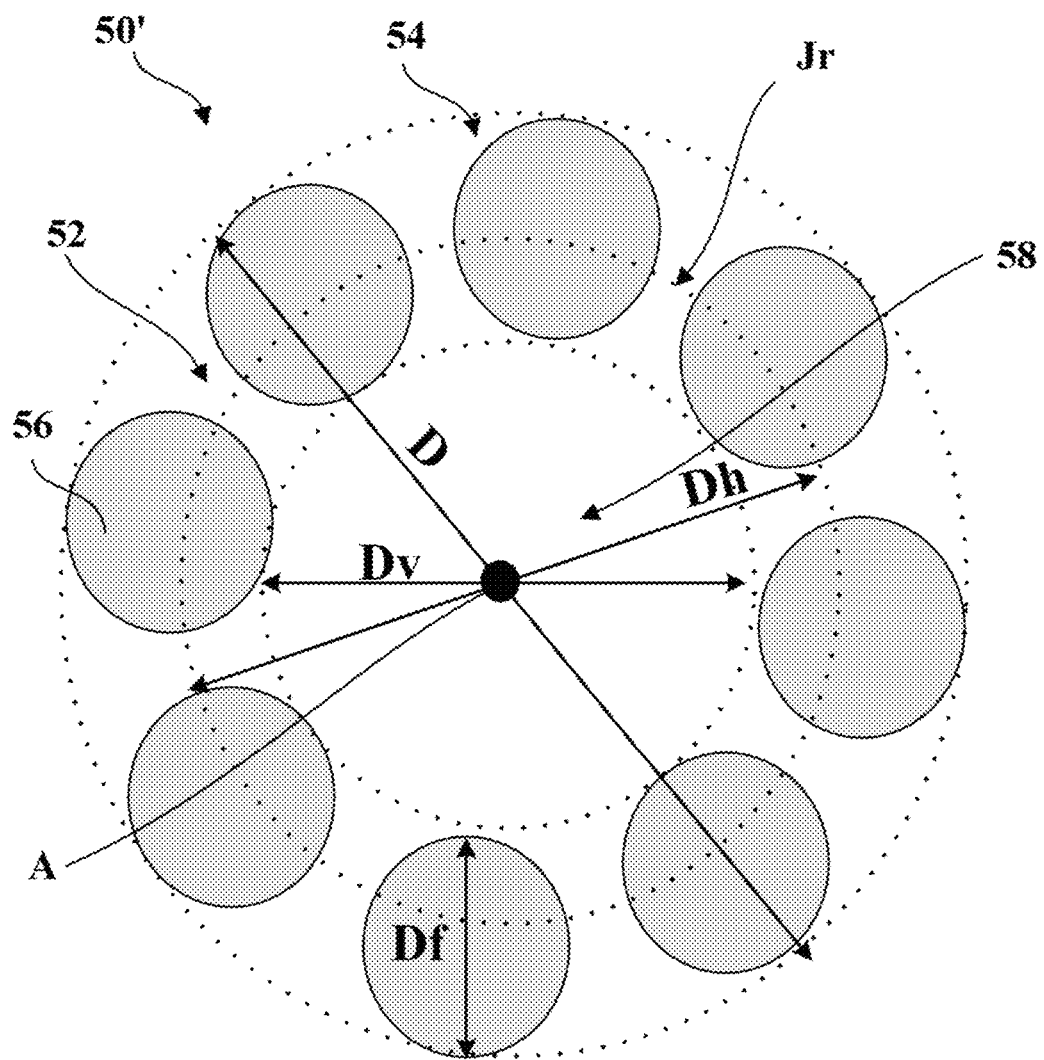
FIG. 15 is figure similar to FIG. 4 of a cord according to a second embodiment.

A second embodiment of a cord of the tyre according to the invention will now be described. This cord, denoted by the reference 50', is shown in FIG. 15. Elements similar to those of the first embodiment that are shown in the previous figures are denoted by identical references.

The cord 50' comprises a single layer 52 of helically wound metal filamentary elements 54. The layer 52 is made up of N=8 helically wound metal filamentary elements. The cord 50' is intended to reinforce a tyre for industrial vehicles chosen from vans, heavy-duty vehicles, for example light rail vehicles, buses, heavy road transport vehicles (lorries, tractors, trailers).

In the embodiment illustrated, each metal filamentary element 54 comprises a single metal monofilament 56. Each metal filamentary element 54 also comprises a layer (not shown) of a metal coating comprising copper, zinc, tin, cobalt or an alloy of these metals, in this case brass.

The diameter Df of each metal filamentary element 54 is such that 0.10 mm≤Df≤0.50 mm, preferably 0.15 mm≤Df≤0.50 mm and more preferably 0.15 mm≤Df≤0.45 mm, and, in this second embodiment such that 0.22 mm≤Df≤0.50 mm, preferably 0.22 mm≤Df≤0.45 mm, more preferably 0.30 mm≤Df≤0.45 mm. In this instance, Df=0.35 mm for all the metal filamentary elements 54. Each metal filamentary element 54 is without preforming marks.

The cord 50' has a diameter D such that D 2.10 mm, preferably 0.90 mm≤D≤2.10 mm and more preferably 0.95 mm≤D≤2.05 mm, and, in this second embodiment such that 1.15 mm≤D≤2.10 mm and preferably 1.15 mm≤D≤2.05 mm. In this instance, D=1.55 mm.

Advantageously, each metal filamentary element 54 is wound at a pitch P such that 3 mm≤P≤15 mm, preferably 5 mm≤P≤13 mm, more preferably 7 mm≤P≤11 mm, and, in this second embodiment, 7.5 mm≤P≤11 mm. In this instance, P=10.5 mm.

The ratio K of the pitch P to the diameter Df is such that 19≤K≤44, preferably 20≤K≤40, more preferably 23≤K≤39, and, in this second embodiment such that 19≤K≤35 and preferably 23≤K≤30. In this instance, K=30.

Figure 16:
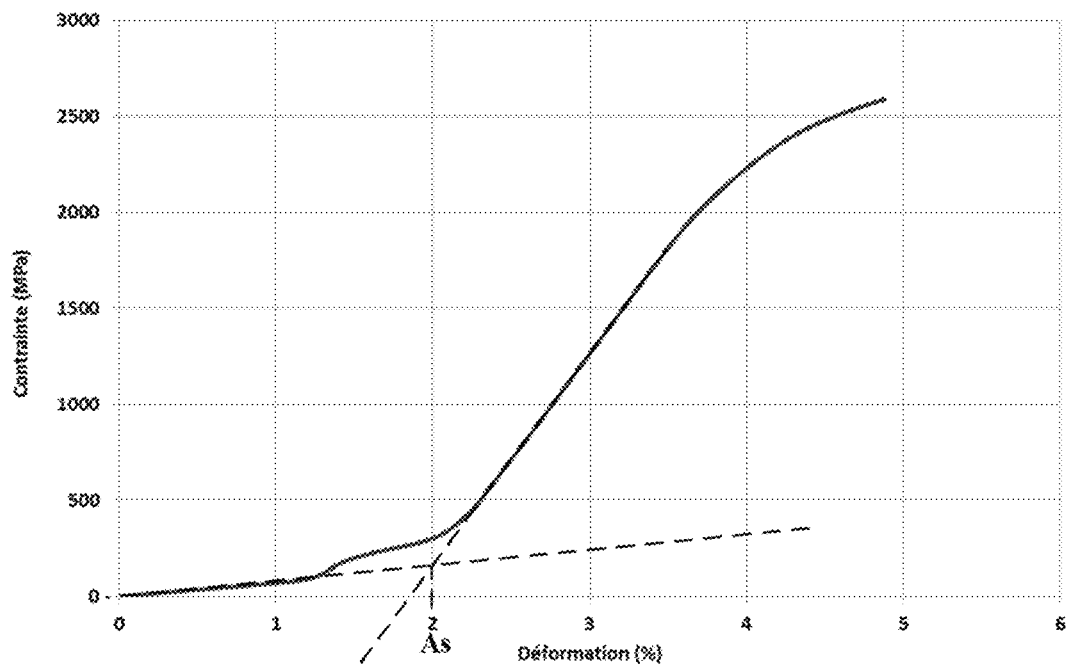
FIGS. 16 and 17 are curves similar to those in FIGS. 5 and 6 of the cord according to the second embodiment.

The cord 50' according to the second embodiment has a structural elongation As such that As≤1.5%, preferably 1.5%≤As≤5.0%, more preferably 1.9%≤As≤4.5% and in this case equal to 2.0%. As described above, the value As is determined by plotting a force-elongation curve of the cord 50', applying the standard ASTM D2969-04 of 2014. The curve obtained is shown in FIG. 16.

The helix angle α of each metal filamentary element is such that 13°≤α≤30°, preferably 17°≤α≤26° and, in this second embodiment such that 18.5°≤α≤30° and preferably 18.5°≤α≤26°. In this instance, as described above, with the characteristics of the cord 50', α(1)=18.99°, α(2)=19.66° and α(3)=α=19.71°.

Each metal filamentary element 54 has a helix radius of curvature Rf such that 4.10 mm≤Rf≤5.30 mm. Since in this case P=10.5 mm and α=19.71°, Rf=5.27 mm.

The helix diameter Dh of each metal filamentary element is such that 0.70 mm≤Dh≤1.60 mm, preferably 0.75 mm≤Dh≤1.60 mm, more preferably 0.80 mm≤Dh≤1.60 mm and in the second embodiment such that 0.85 mm≤Dh≤1.60 mm, preferably 1.15 mm≤Dh≤1.60 mm, more preferably 1.20 mm≤Dh≤1.60 mm. Since in this case P=10.5 mm and α=19.71°, Dh=1.20 mm.

Advantageously, Dv is such that Dv≥0.50 mm and preferably 0.50 mm≤Dv≤1.20 mm and in the second embodiment 0.50 mm≤Dv≤1.20 mm, preferably 0.65 mm≤Dv≤1.20 mm. In this case, since Dh=1.20 mm and Df=0.35 mm, Dv=0.85 mm.

According to the invention, 9≤Rf/Df≤30, preferably 9≤Rf/Df≤25, more preferably 9≤Rf/Df≤22 and in the second embodiment 9≤Rf/Df≤15. In this case, Rf/Df=15. Likewise, according to the invention, 1.60≤Dv/Df≤3.20, preferably 1.70≤Dv/Df≤3.20 and more preferably 1.70≤Dv/Df≤3.05, and in this case Dv/Df=2.42.

Likewise, 0.10≤Jr≤0.25, preferably 0.14≤Jr≤0.25 and in this case, Jr=0.18.

The cord 50' has a modulus of elasticity in extension of the structural portion of less than or equal to 15 GPa, preferably ranging from 2 GPa to 15 GPa, and in this case equal to 7 GPa. Furthermore, the cord 50' has a modulus of elasticity in extension of the elastic portion of greater than or equal to 50 GPa, preferably ranging from 50 GPa to 180 GPa. In the second embodiment, the modulus of elasticity in extension of the elastic portion ranges from 80 to 130 GPa, and is in this case equal to 109 GPa.

Figure 17:
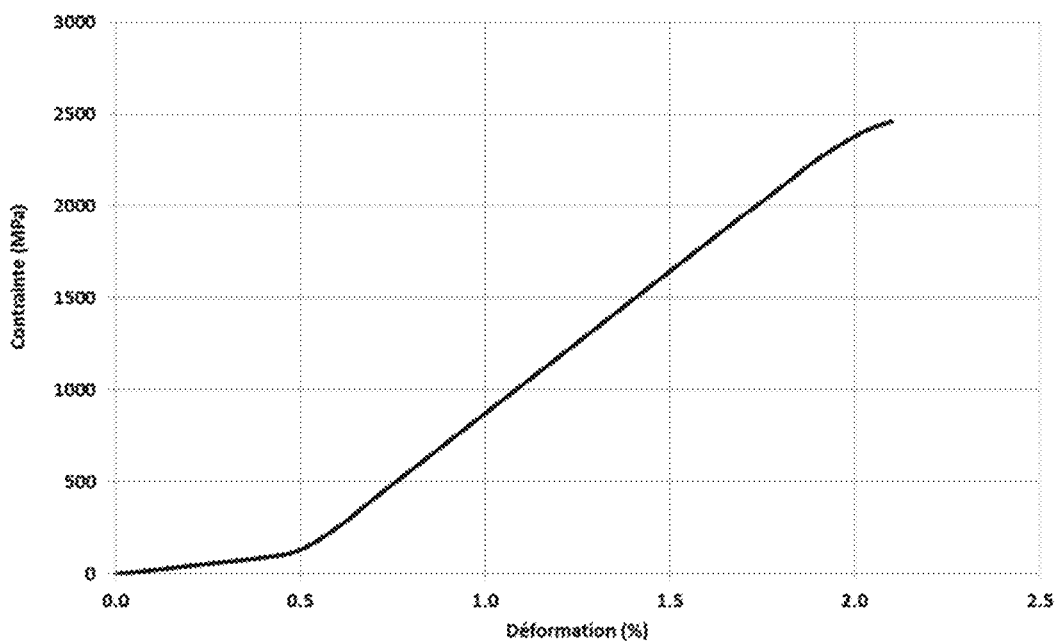

With reference to FIG. 17, the cord 50', embedded in a crosslinked standard elastomeric matrix as described above and having a modulus in extension at 10% elongation ranging from 5 MPa to 10 MPa, has a modulus of elasticity in extension greater than or equal to 100 GPa, preferably ranging from 100 GPa to 180 GPa, more preferably 110 GPa to 180 GPa, and even more preferably 120 GPa to 180 GPa. In this embodiment, the cord 50' has a modulus of elasticity in extension equal to 140 GPa.

The cord 50' is manufactured using, mutatis mutandis, an installation and a method similar to those used for the manufacture of the cord 50.

TYRE ACCORDING TO A SECOND EMBODIMENT OF THE INVENTION

Figure 18:
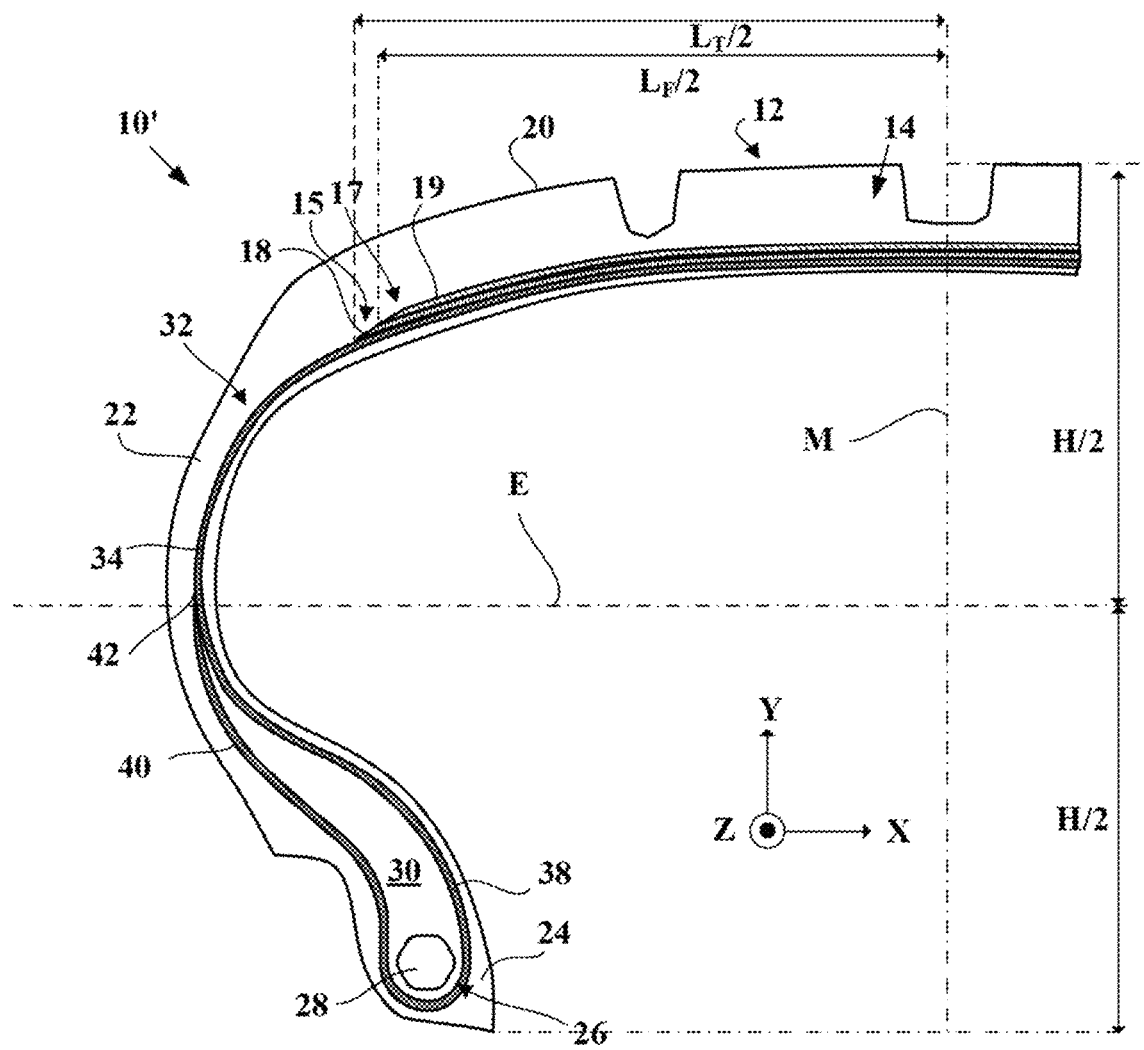
FIG. 18 is a view similar to the one in FIG. 1 of a tyre according to a second embodiment of the invention.
Figure 19:
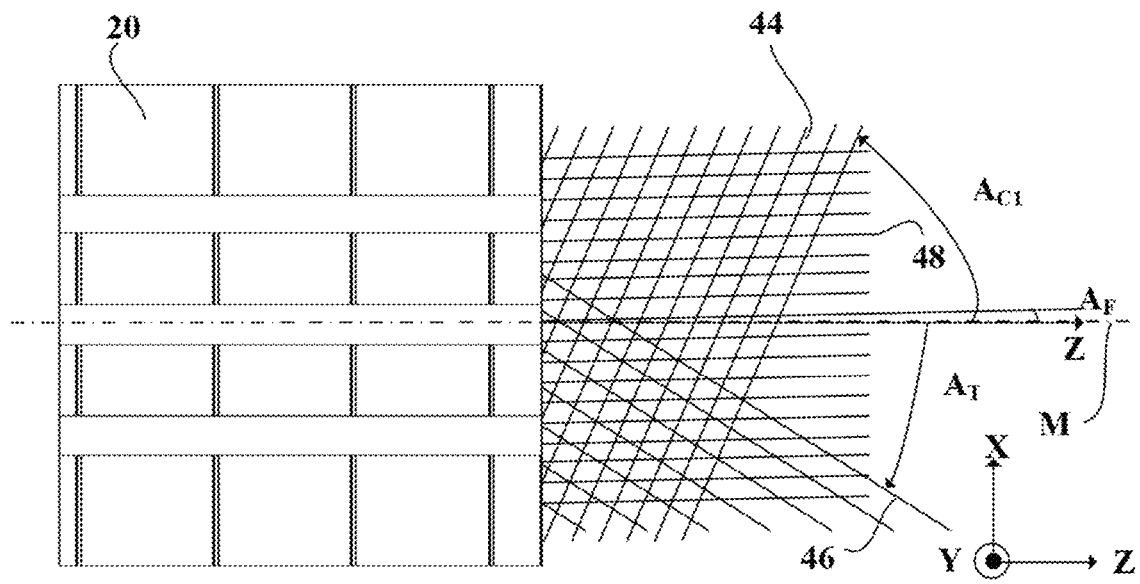
FIGS. 19 and 20 are views similar to those in FIGS. 2 and 3 of the tyre in FIG. 18 according to the second embodiment of the invention.
Figure 20:
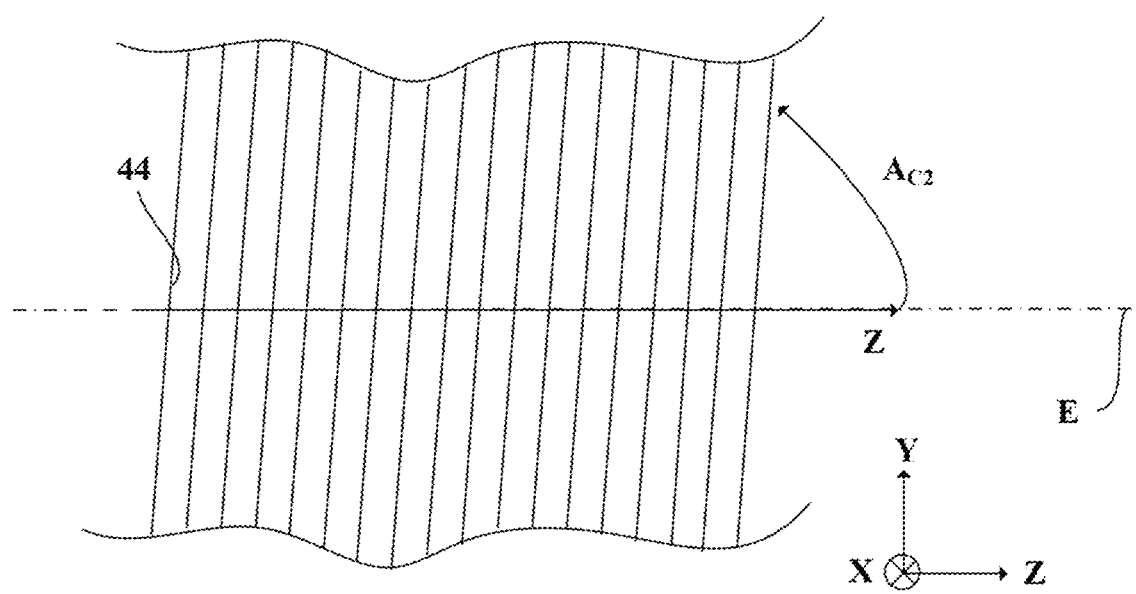

FIGS. 18 to 20 show a tyre 10' according to a second embodiment of the invention. In these figures, elements similar to those of the tyre 10 according to the first embodiment are denoted by identical references.

The tyre 10' substantially exhibits revolution about an axis substantially parallel to the axial direction X. The tyre 10' is in this case intended for a passenger vehicle.

The tyre 10' has a crown 12 comprising a tread 20 and a crown reinforcement 14 extending in the crown 12 in the circumferential direction Z.

The crown reinforcement 14 comprises a working reinforcement 15 comprising a single working ply 18 and a hoop reinforcement 17 comprising a single hooping ply 19. In this case, the working reinforcement 15 is made up of the working ply 18 and the hoop reinforcement 17 is made up of the hooping ply 19. The crown reinforcement 14 is made up of the working reinforcement 15 and the hoop reinforcement 17.

The crown reinforcement 14 is surmounted by the tread 20. In this case, the hoop reinforcement 17, in this case the hooping ply 19, is radially interposed between the working reinforcement 15 and the tread 20. The crown 12 is in this case made up of the tread 20 and the crown reinforcement 14.

The tyre 10' comprises two sidewalls 22 extending the crown 12 radially towards the inside. The tyre 10' also has two beads 24 that are radially on the inside of the sidewalls 22 and each have an annular reinforcing structure 26, in this instance a bead wire 28, surmounted by a mass of filling rubber 30, and also a radial carcass reinforcement 32. The crown reinforcement 14 is situated radially between the carcass reinforcement 32 and the tread 20. Each sidewall 22 connects each bead 24 to the crown 12.

The carcass reinforcement 32 has a single carcass ply 34. In this case, the carcass reinforcement 32 is formed by the carcass ply 34. The carcass reinforcement 32 is anchored in each of the beads 24 by being turned up around the bead wire 28 so as to form, within each bead 24, a main strand 38 extending from the beads 24 through the sidewalls 22 and into the crown 12, and a turnup strand 40, the radially outer end 42 of the turnup strand 40 being radially on the outside of the annular reinforcing structure 26. The carcass reinforcement 32 thus extends from the beads 24 through the sidewalls 22 and into the crown 12. In this embodiment, the carcass reinforcement 32 also extends axially through the crown 12. The crown reinforcement 14 is radially interposed between the carcass reinforcement 32 and the tread 20. The carcass reinforcement 32 is arranged so as to be directly radially in contact with the crown reinforcement 14 and the crown reinforcement 14 is arranged so as to be directly radially in contact with the tread 20. More particularly, the single hooping ply 19 and the single working ply 18 are advantageously arranged so as to be directly radially in contact with one another.

Each working ply 18, hooping ply 19 and carcass ply 34 comprises an elastomeric matrix in which one or more reinforcing elements of the corresponding ply are embedded.

With reference to FIG. 19, the single carcass ply 34 comprises carcass filamentary reinforcing elements 44. Each carcass filamentary reinforcing element 44 extends axially from one bead 24 of the tyre 10 to the other bead 24 of the tyre 10. Each carcass filamentary reinforcing element 44 makes an angle $A_{C1}$ greater than or equal to 55°, preferably ranging from 55° to 80° and more preferably from 60° to 70°, with the circumferential direction Z of the tyre 10 in the median plane M of the tyre 10', in other words in the crown 12. With reference to FIG. 20, which is a simplified view in which, given the scale, all the carcass filamentary reinforcing elements 44 are shown parallel to one another, each carcass filamentary reinforcing element 44 makes an angle $A_{C2}$ greater than or equal to 85° with the circumferential direction Z of the tyre 10' in the equatorial circumferential plane E of the tyre 10', in other words in each sidewall 22.

In this example, it is adopted by convention that an angle oriented in the anticlockwise direction from the reference straight line, in this case the circumferential direction Z, has a positive sign and that an angle oriented in the clockwise direction from the reference straight line, in this case the circumferential direction Z, has a negative sign. In this instance, $A_{C1}=+67°$ and $A_{C2}=+90°$.

With reference to FIG. 19, the single working ply 18 comprises a plurality of working filamentary reinforcing elements 46. The working filamentary reinforcing elements 46 are arranged side by side in a manner substantially parallel to one another. Each working filamentary reinforcing element 46 extends axially from one axial end of the working reinforcement 15 of the tyre 10 to the other axial end of the working reinforcement 15 of the tyre 10. Each working filamentary reinforcing element 46 makes an angle $A_T$ greater than or equal to 10°, preferably ranging from 30° to 50° and more preferably from 35° to 45°, with the circumferential direction Z of the tyre 10' in the median plane M. Given the orientation defined above, $A_T=-40°$.

The single hooping ply 19 comprises at least one hooping filamentary reinforcing element 48. In this instance, the hooping ply 19 comprises a single hooping filamentary reinforcing element 48 wound continuously over an axial width $L_F$ of the crown 12 of the tyre 10' such that the axial distance between two adjacent windings is equal to 1.3 mm. Advantageously, the axial width $L_F$ is less than the width $L_T$ of the working ply 18. The hooping filamentary reinforcing element 48 makes an angle $A_F$ strictly less than 10° with the circumferential direction Z of the tyre 10', preferably less than or equal to 7°, and more preferably less than or equal to 5°. In this instance, $A_F=+5°$.

It will be noted that the carcass filamentary reinforcing elements 44, working filamentary reinforcing elements 46 and hooping filamentary reinforcing elements 48 are arranged, in the crown 12, so as to define a triangle mesh in projection onto the equatorial circumferential plane E in the radial direction of the tyre. In this case, the angle $A_F$ and the fact that the orientation of the angle $A_T$ and the orientation of the angle $A_{C1}$ are opposite with respect to the circumferential direction Z of the tyre 10' make it possible to obtain this triangle mesh.

Each carcass filamentary reinforcing element 44 is a textile filamentary element and conventionally comprises two multifilament strands, each multifilament strand being made up of a spun yarn of polyester, in this case PET, monofilaments, these two multifilament strands being individually overtwisted at 240 turns·m$^{-1}$ in one direction and then twisted together at 240 turns·m$^{-1}$ in the opposite direction. These two multifilament strands are wound in a helix around one another. Each of these multifilament strands has a count equal to 220 tex.

Each working filamentary reinforcing element 46 is a metal filamentary element and in this case is an assembly of two steel monofilaments that each have a diameter equal to 0.30 mm, the two steel monofilaments being wound together at a pitch of 14 mm.

The hooping filamentary reinforcing element 48 is obtained by embedding the cord 50 in an elastomeric matrix based on the elastomeric composition of the hooping ply 19.

The tyre 10' is manufactured by implementing a method similar to the method for manufacturing the tyre 10. In order to form the triangle mesh of the tyre 10', a specific assembly method is implemented, as described in EP1623819 or in FR1413102.

Comparative Tests

We tested various cords A to W intended to reinforce a tyre for passenger vehicles, cords A to L preferably being intended to reinforce tyres for passenger vehicles, but also for two-wheel vehicles, and cords K to W preferably being intended to reinforce a tyre for industrial vehicles.

Among cords A to W, the following are distinguished:
- cords A, which are not in accordance with the invention and were obtained by implementing a conventional cabling assembly method of the prior art,
- cords D to I and M, which are not in accordance with the invention and were obtained by implementing the prior art method described in WO2016083265 and WO2016083267,
- cords J, K, N, T, U and V, which are not in accordance with the invention and were obtained by implementing the method comprising a reassembly step described hereinabove,
- cords B, C, L, O, P, Q, R, S and W, which are in accordance with the invention and were obtained by implementing the method comprising a reassembly step described hereinabove, Each cord C and W forms the cord 50, 50' described above, respectively.

For each metal cord, the following were measured: the diameter Df of each metal filamentary element, expressed in millimetres, the number N of metal filamentary elements, the pitch factor K equal to the ratio of the pitch P to Df, the helix angle α expressed in degrees, the pitch P of each metal filamentary element, expressed in millimetres, the helix diameter Dh, expressed in millimetres, the enclosure diameter Dv, expressed in millimetres, the helix radius of curvature Rf, expressed in millimetres, the ratio Rf/Df, the ratio Dv/Df, the structural elongation As, expressed in %, the diameter D of the cord, expressed in millimetres, the linear density expressed in grammes per metre, the relative radial clearance Jr and a compressibility indicator $\varepsilon_c$ determined as follows.

The compressibility indicator $\varepsilon_c$ is measured on a test specimen with a rectangular section with an area of 12 mm×8 mm and with a height equal to 20 mm. The test specimen comprises an elastomeric matrix which has, in the cured state, a modulus equal to 10 MPa (in this case a modulus representative of the modulus of the compositions used in tyres—in other fields, other moduli could be envisaged) and in which the metal cord to be tested is embedded such that the axis of the cord is coincident with the axis of symmetry of the test specimen. Two support plates with an area of 20 mm×20 mm are adhesively bonded to each face of the rectangular section of the test specimen, each face having been carefully ground beforehand. Each support plate is then connected to a test machine having a movable crosshead usable in tension or in compression (machine from Zwick or Instron for example). The test specimen (resting on one of the 20 mm×20 mm plates) is placed on a support with a diameter of 30 mm having a horizontal support face, the support itself being fastened to a lower crosshead of the test machine. Positioned under the movable crosshead of the machine is a load sensor carrying a second support with a diameter equal to 30 mm, the support face of which, which is also horizontal, is positioned facing the first support face. The distance that separates the two horizontal supports is therefore variable as per the movement of the movable crosshead. This distance takes, as first value, a value such that the test specimen can fit without load between the two supports with a diameter of 30 mm, then takes a second value for exerting a preload of 0.1 N, and will then decrease to a speed of 3 mm/mn until the end of the test, which is stopped after the test specimen has been squashed by 10% of its initial height. The force-compression curve is obtained at 20° C. The contribution of the load of the matrix to the corresponding deformations is subtracted from the value of the load of the test specimen (starting from a force-compression curve of a single block made only of matrix). The value of maximum deformation at which buckling takes place, this being a critical deformation beyond which the load decreases when the test specimen bends, corresponds to the value of the maximum load, of this new curve. The compressibility indicator $\varepsilon_c$ is equal to the value of this recorded critical deformation.

The results of all these measurements are collated in Table 1 below. As regards the compressibility indicator $\varepsilon_c$, it is estimated that satisfactory longitudinal compressibility is obtained for values of $\varepsilon_c \geq 3.5$. The longitudinal compressibility is favoured all the more, the higher the value of $\varepsilon_c$. The indication NT indicates that the cord was not tested.

On comparing cords A, B and C, is noted that cord A has a relative radial clearance that is too large on account of a linear density that is too low relative to its diameter. The relative radial clearance of cord C is greater than that of cord B, which results in a diameter greater than that of cord B for identical linear densities. Cords B and C have excellent longitudinal compressibility.

On comparing cords D to L, it is noted that cord L has the best compromise between linear density, outer diameter and longitudinal compressibility. To be specific, even though cords D, E and F have a longitudinal compressibility greater than that of cord L, cords D, E and F have much lower linear densities for outer diameters of the same order of magnitude as cord L. Cords G, H, J and K have a longitudinal compressibility lower than that of cord L on account of an enclosure diameter which is much too small, causing the filamentary elements to move closer to the axis of the cord and thus making them more sensitive to buckling. Although cords G and H have satisfactory longitudinal compressibility and a diameter smaller than that of cord L, their linear density is largely insufficient to provide sufficient reinforcement. Cords J and K have diameters of the same order of magnitude as cord L but linear densities significantly lower than cord L and therefore offer insufficient reinforcement. As for cord I, this has a linear density less than that of cord L and a significantly greater diameter.

On comparing cords M to W, it is noted that cords O to S and W have the best compromise between linear density, outer diameter and longitudinal compressibility. Cords M, N, T and U have a linear density that is too low for their diameter compared to cords O to S and W. As for cord V, this has insufficient longitudinal compressibility on account of a helix radius of curvature and a relative radial clearance that are too small, making cord V too sensitive to buckling.

It will be noted that, on comparing cords P and Q and S, cords P and S have a longitudinal compressibility greater than that of cord Q on account of a greater enclosure diameter and therefore a relative radial clearance that is also greater.

It will be noted that, on comparing cords R and S, cord R has a linear density significantly greater than that of cord S, an identical diameter and a barely lower longitudinal compressibility.

TABLE 1

| | Df | N | K | α | P | Dh | Dv | Rf | Rf/Df | Dv/Df | As | D | Ml | Jr | $\varepsilon_c$ |
|---|---|---|---|---|---|---|---|---|---|---|---|---|---|---|---|
| A | 0.2 | 5 | 25 | 20.1 | 5 | 0.58 | 0.38 | 2.47 | 12.4 | 1.91 | 3.8 | 0.78 | 1.3 | 0.35 | <5 |
| B | 0.2 | 9 | 39 | 17.9 | 7.8 | 0.80 | 0.60 | 4.25 | 21.2 | 3.01 | 2 | 1 | 2.3 | 0.23 | 4.5 |
| C | 0.2 | 9 | 39 | 18.3 | 7.8 | 0.82 | 0.62 | 4.18 | 20.9 | 3.10 | 2.2 | 1.04 | 2.3 | 0.24 | 5 |
| D | 0.3 | 3 | 27 | 18.5 | 8.1 | 0.86 | 0.56 | 4.29 | 14.3 | 1.88 | 4.4 | 1.15 | 1.74 | 0.48 | >10 |
| E | 0.32 | 3 | 25 | 17.9 | 8 | 0.82 | 0.50 | 4.35 | 13.6 | 1.58 | 3.9 | 1.15 | 2 | 0.43 | 9 |
| F | 0.32 | 4 | 25 | 19.3 | 8 | 0.89 | 0.57 | 4.09 | 12.8 | 1.78 | 4.1 | 1.15 | 2.66 | 0.45 | 7 |
| G | 0.32 | 4 | 25 | 16.4 | 8 | 0.75 | 0.43 | 4.70 | 14.7 | 1.34 | 2.5 | 1.07 | 2.61 | 0.33 | 5.5 |
| H | 0.32 | 4 | 25 | 15.2 | 8 | 0.69 | 0.37 | 5.04 | 15.8 | 1.16 | 1.9 | 1.01 | 2.6 | 0.29 | 3.5 |
| I | 0.32 | 4 | 25 | 21.0 | 8 | 0.98 | 0.66 | 3.81 | 11.9 | 2.05 | 5.2 | 1.29 | 2.69 | 0.46 | NT |
| J | 0.32 | 5 | 25 | 18.0 | 8 | 0.83 | 0.51 | 4.33 | 13.5 | 1.59 | 2.6 | 1.15 | 3.34 | 0.29 | 6 |
| K | 0.32 | 6 | 25 | 17.9 | 8 | 0.82 | 0.50 | 4.36 | 13.6 | 1.57 | 1.6 | 1.15 | 4.01 | 0.17 | 5.2 |
| L | 0.32 | 6 | 25 | 19.0 | 8 | 0.88 | 0.56 | 4.14 | 12.9 | 1.74 | 2.2 | 1.2 | 4.04 | 0.22 | 7 |
| M | 0.38 | 5 | 25 | 19.9 | 9.5 | 1.09 | 0.71 | 4.73 | 12.4 | 1.88 | 3.7 | 1.47 | 4.71 | 0.35 | NT |
| N | 0.45 | 5 | 25 | 20.1 | 11.25 | 1.31 | 0.86 | 5.56 | 12.4 | 1.91 | 3.8 | 1.78 | 6.75 | 0.35 | 5 |
| O | 0.45 | 6 | 23 | 21.3 | 10.35 | 1.29 | 0.84 | 4.87 | 10.8 | 1.86 | 3 | 1.75 | 8.17 | 0.23 | 4.5 |
| P | 0.45 | 7 | 23 | 23.3 | 10.35 | 1.42 | 0.97 | 4.54 | 10.1 | 2.15 | 3 | 1.88 | 9.67 | 0.20 | 4.2 |
| Q | 0.45 | 7 | 23 | 21.7 | 10.35 | 1.31 | 0.86 | 4.81 | 10.7 | 1.91 | 1.9 | 1.77 | 9.55 | 0.14 | 3.5 |
| R | 0.45 | 8 | 23 | 25.5 | 10.35 | 1.57 | 1.12 | 4.25 | 9.4 | 2.49 | 3 | 2.03 | 11.23 | 0.16 | 4.7 |
| S | 0.45 | 7 | 23 | 25.4 | 10.35 | 1.56 | 1.11 | 4.26 | 9.5 | 2.47 | 4.5 | 2.03 | 9.83 | 0.25 | 5 |
| T | 0.45 | 6 | 23 | 25.5 | 10.35 | 1.57 | 1.12 | 4.25 | 9.4 | 2.49 | 6 | 2.03 | 8.42 | 0.35 | 5.3 |
| U | 0.45 | 5 | 23 | 25.8 | 10.35 | 1.59 | 1.14 | 4.21 | 9.4 | 2.53 | 7.5 | 2.03 | 7.02 | 0.44 | 5.7 |
| V | 0.45 | 8 | 18 | 29.7 | 8.1 | 1.47 | 1.02 | 3.00 | 6.7 | 2.26 | 1.9 | 1.88 | 11.7 | 0.08 | 3 |
| W | 0.35 | 8 | 30 | 19.7 | 10.5 | 1.20 | 0.85 | 5.27 | 15.0 | 2.42 | 2 | 1.55 | 6.37 | 0.18 | >4 |

The invention claimed is:

1. A cord comprising a single layer made up of N helically wound metal filamentary elements having an outer diameter D, each metal filamentary element describing, when the cord extends in a substantially rectilinear direction, a helical path about a main axis substantially parallel to the substantially rectilinear direction, such that, in a section plane substantially perpendicular to the main axis, a distance between a center of each metal filamentary element and the main axis is equal to half a helix diameter Dh and is substantially constant and identical for all the metal filamentary elements, the metal filamentary elements defining an internal enclosure of a cord of diameter Dv, each metal filamentary element having a diameter Df and a helix radius of curvature Rf defined by Rf=P/(π×Sin(2α)), where P is a pitch of each metal filamentary element expressed in millimeters and α is a helix angle of each metal filamentary element, wherein, with Dh, D, Dv, Df and Rf being expressed in millimeters:

$$0.10 \leq Jr \leq 0.25$$

$$9 \leq Rf/Df \leq 30, \text{ and}$$

$$1.60 \leq Dv/Df \leq 3.20,$$

where Jr=N/(π*(D−Df))×(Dh×Sin(π/N)−(Df/Cos(α×π/180))), α is the helix angle, expressed in degrees, of each metal filamentary element and Dv=Dh−Df.

2. The cord according to claim 1, wherein 0.14≤Jr≤0.25.

3. The cord according to claim 1, wherein 9≤Rf/Df≤25.

4. The cord according to claim 1, wherein 1.70≤Dv/Df≤3.20.

5. The cord according to claim 1, wherein the helix radius of curvature Rf is such that 4.10 mm≤Rf≤5.30 mm.

6. The cord according to claim 1, wherein the helix diameter Dh of each metal filamentary element is such that 0.70 mm≤Dh≤1.60 mm.

7. The cord according to claim 1, wherein Df is such that 0.10 mm≤Df≤0.50 mm.

8. The cord according to claim 1, wherein Dv is such that Dv≥0.50 mm.

9. The cord according to claim 1, wherein each metal filamentary element is wound at a pitch P such that 3 mm≤P≤15 mm.

10. The cord according to claim 1, wherein D≤2.10 mm.

11. The cord according to claim 1, wherein a ratio K of the pitch P to the diameter Df of each metal filamentary element, P and Df being expressed in millimeters, is such that 19≤K≤44.

12. The cord according to claim 1, wherein the helix angle α is such that 13°≤α≤30°.

13. The cord according to claim 1, wherein the cord has a structural elongation As such that As≥1.5%, the structural elongation As being determined by applying the standard ASTM D2969-04 of 2014 to the cord so as to obtain a force-elongation curve, the structural elongation As being equal to elongation, in %, corresponding to a projection onto an elongation axis of intersection between a tangent to a structural portion of the force-elongation curve and a tangent to an elastic portion of the force-elongation curve.

14. The cord according to claim 1, wherein the cord has, once embedded in a crosslinked standard elastomeric matrix having a modulus in extension at 10% elongation ranging from 5 MPa to 10 MPa, a modulus of elasticity in extension greater than or equal to 100 GPa, the modulus of elasticity in extension at 10% elongation being determined according to the standard ASTM D2969-04 of 2014.

15. A tire comprising the cord according to claim 1, the cord embedded in an elastomeric matrix.

* * * * *